April 1, 1969   D. R. BIEGEL ET AL   3,436,526
DATA SCANNING, INDICATING AND CONTROL APPARATUS
Filed Aug. 13, 1964

INVENTORS.
DONALD R. BIEGEL
JOHN W. WILLIS
BY Edward B. Negg
ATTORNEY.

INVENTORS.
DONALD R. BIEGEL
JOHN W. WILLIS
BY

ATTORNEY.

April 1, 1969 D. R. BIEGEL ET AL 3,436,526
DATA SCANNING, INDICATING AND CONTROL APPARATUS
Filed Aug. 13, 1964 Sheet 4 of 18
FIG. 8.
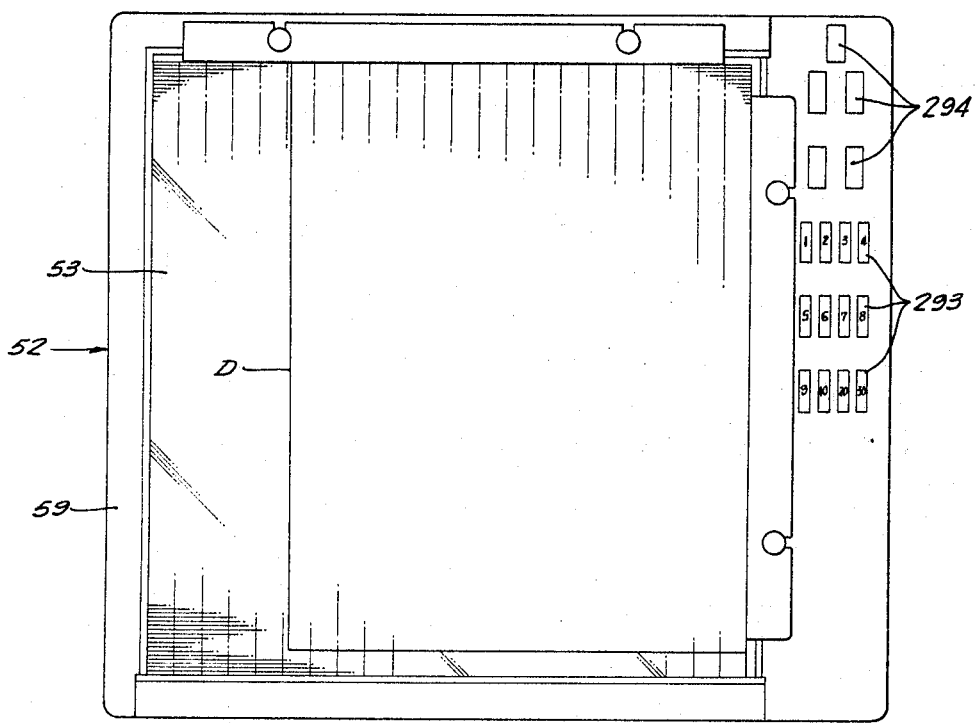
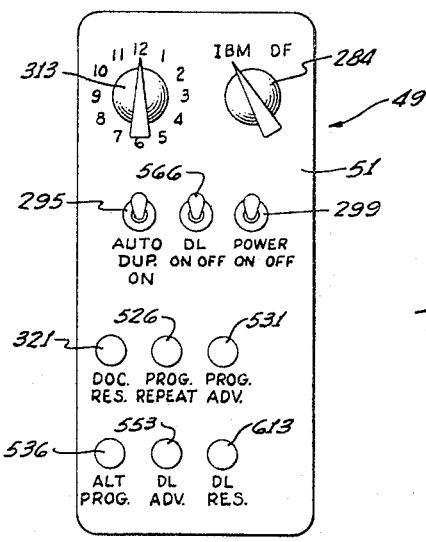
FIG. 9.
INVENTORS.
DONALD R. BIEGEL
JOHN W. WILLIS
BY
Edward B. Gregg
ATTORNEY.

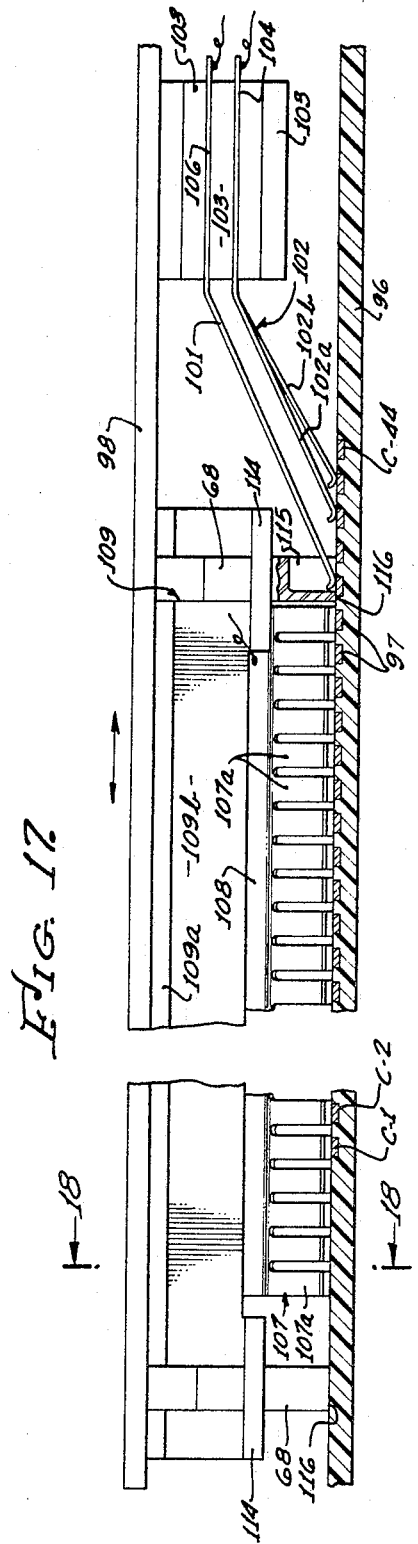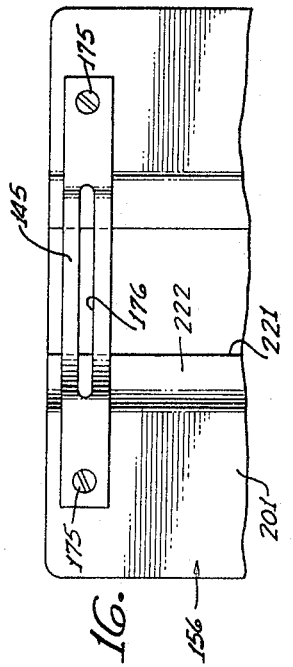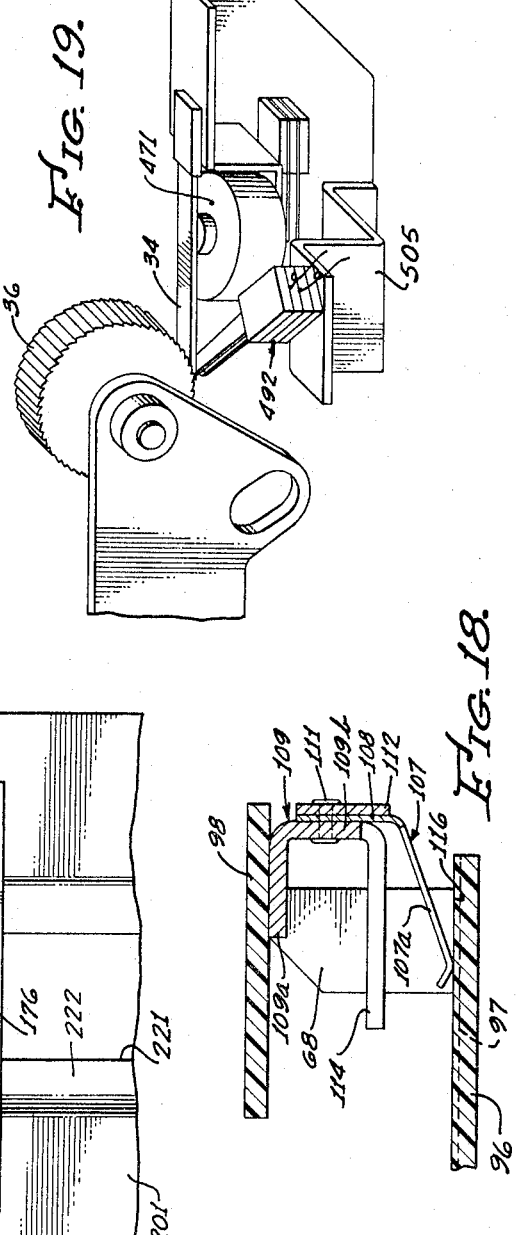

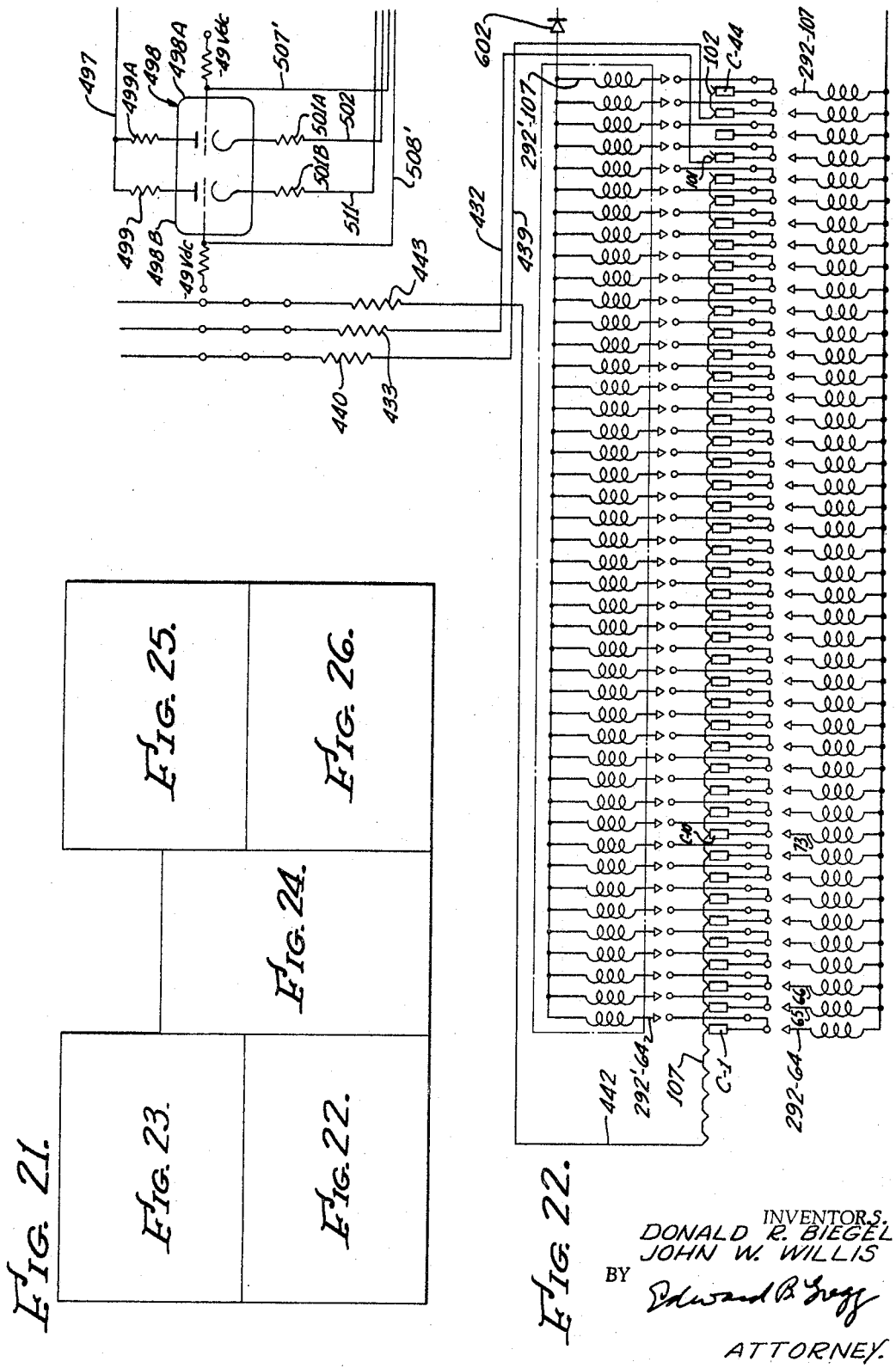

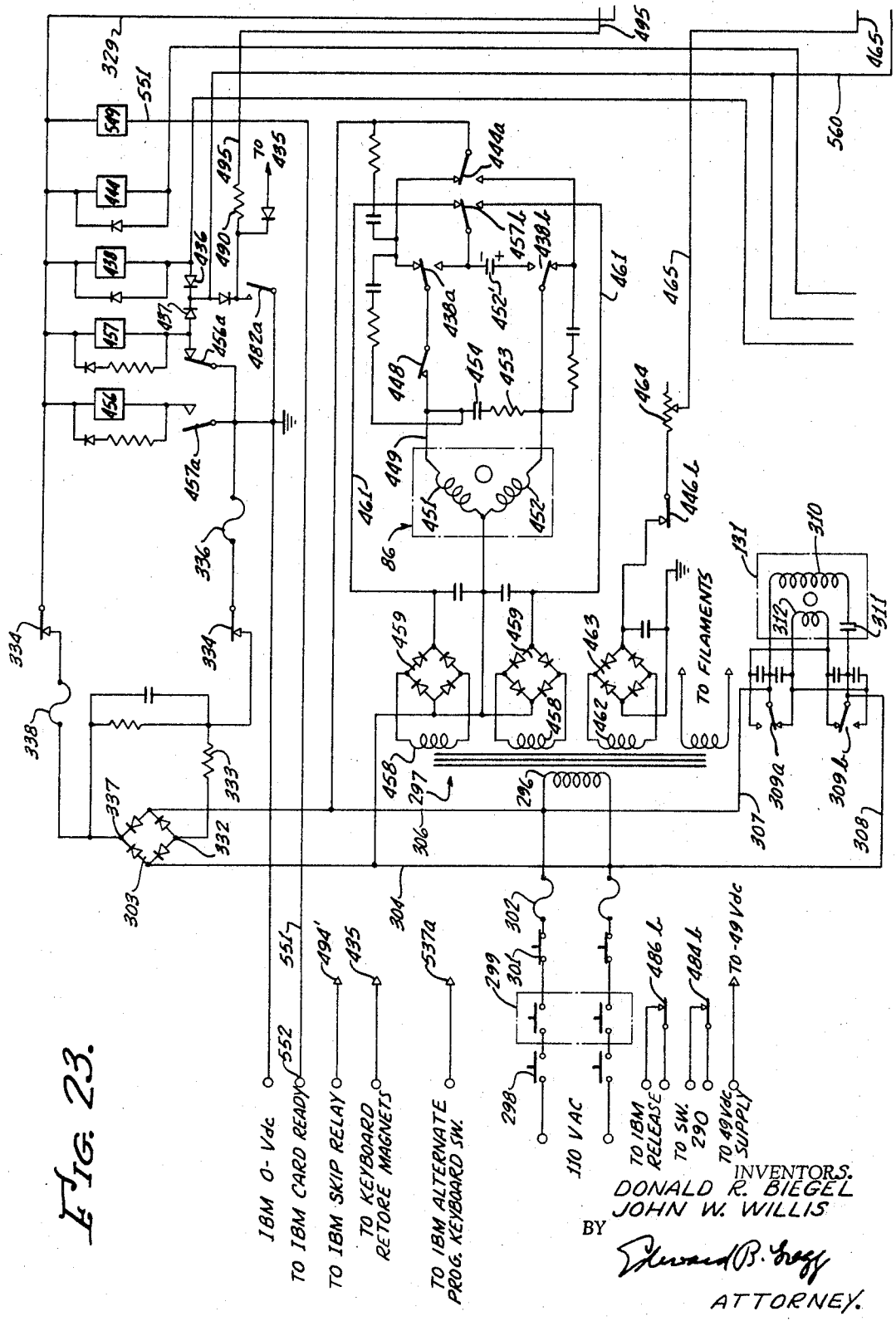

INVENTORS.
DONALD R. BIEGEL
JOHN W. WILLIS
BY
ATTORNEY.

United States Patent Office 3,436,526
Patented Apr. 1, 1969

3,436,526
DATA SCANNING, INDICATING AND CONTROL APPARATUS
Donald R. Biegel and John W. Willis, Cupertino, Calif., assignors to Tab Products Co., San Francisco, Calif., a corporation of California
Continuation-in-part of application Ser. No. 222,842, Sept. 11, 1962. This application Aug. 13, 1964, Ser. No. 389,417
Int. Cl. G06f 3/10
U.S. Cl. 235—61.6                25 Claims

ABSTRACT OF THE DISCLOSURE

There is shown a data processing apparatus which includes a machine operated by a keyboard and adapted to record data on a data recording element in response to operation of the keyboard. Information on a source document is read by a human operator who operates the keyboard in accordance with such information, the document reading and keyboard operation being carried out in accordance with a predetermined program requiring a plurality of steps. A programming apparatus is included which comprises a rotary drive member and a flexible belt formed in a closed loop around the drive member. The belt is provided with a pattern of programming perforations, and a plurality of sensing means are provided which contact the surface of the belt and drop into the perforations as the sensing members are brought into registry therewith. Visual signal means under control of belt perforations and associated sensing means are provided to visually signal the operator concerning the alpha-numeric condition of the keyboard, the length of field on the data recording element and the like. Additionally, automatic skip, automatic duplicate, automatic alpha-numeric shifting of the keyboard, and like functions of the data processing apparatus are controlled by the flexible belt.

DESCRIPTION

This is a continuation-in-part of our copending application Ser. No. 222,842, filed Sept. 11, 1962, now Patent No. 3,303,331, dated Feb. 7, 1967.

This invention relates to data scanning, indicating and control apparatus for use in conjunction with and control of the data recording device and also to the combination of such scanning, indicating and control apparatus with a data recording device.

Information contained on source documents such as sales invoices, change orders and the like must be converted into a more readily usable form for use with computers and other data processing equipment. Commonly, the information is recorded on punch cards. The data scanning, indicating and control apparatus of this invention is particularly useful with the well-known IBM card punch machine such as that described in Gardinor and Crowell, U.S. Patent No. 2,647,581 entitled "A Record Card Punching Machine," issued on Aug. 4, 1953, or with a verifier machine. It will here be understood that although the apparatus of this invention will be described in use with a key punch machine, the invention is not limited to such use. For example, as will become apparent in the detailed description hereinbelow, the apparatus of this invention includes a novel program control system which is readily adapted for use in a wide variety of systems and apparatus outside of the field of data scanning and control. It could be employed in a programmed control arrangement for control of a typewriter, teletypewriter, calculator or other key operated machines. However, for purposes of illustration, the apparatus of this invention will be described with reference to use with a well known IBM card punch machine of the type disclosed in the above mentioned patent.

In the drawings wherein like reference characters refer to the same parts in the several views:

FIGURE 8 is a top plan view of the reading station of the apparatus of the invention, showing the reading panel and a source document placed thereon for scanning;

FIGURE 9 is a top plan view of the auxiliary control panel;

FIGURE 16 is an enlarged fragmentary view taken substantially along the line 16—16 of FIGURE 10 showing one of the resilient belt engaging members for maintaining the belt on the drum;

FIGURE 17 is an enlarged view taken along the line 17—17 of FIGURE 5 showing the commutator assembly which is associated with the light carriage;

FIGURE 18 is a cross sectional view taken on line 18—18 of FIGURE 17;

FIGURE 19 is a perspective view of the escapement included in the key punch machine for control of the program drum and showing the addition of a switch thereto;

FIGURE 21 is a diagram showing the relative arrangement of FIGURES 22 through 26;

Figure 27:
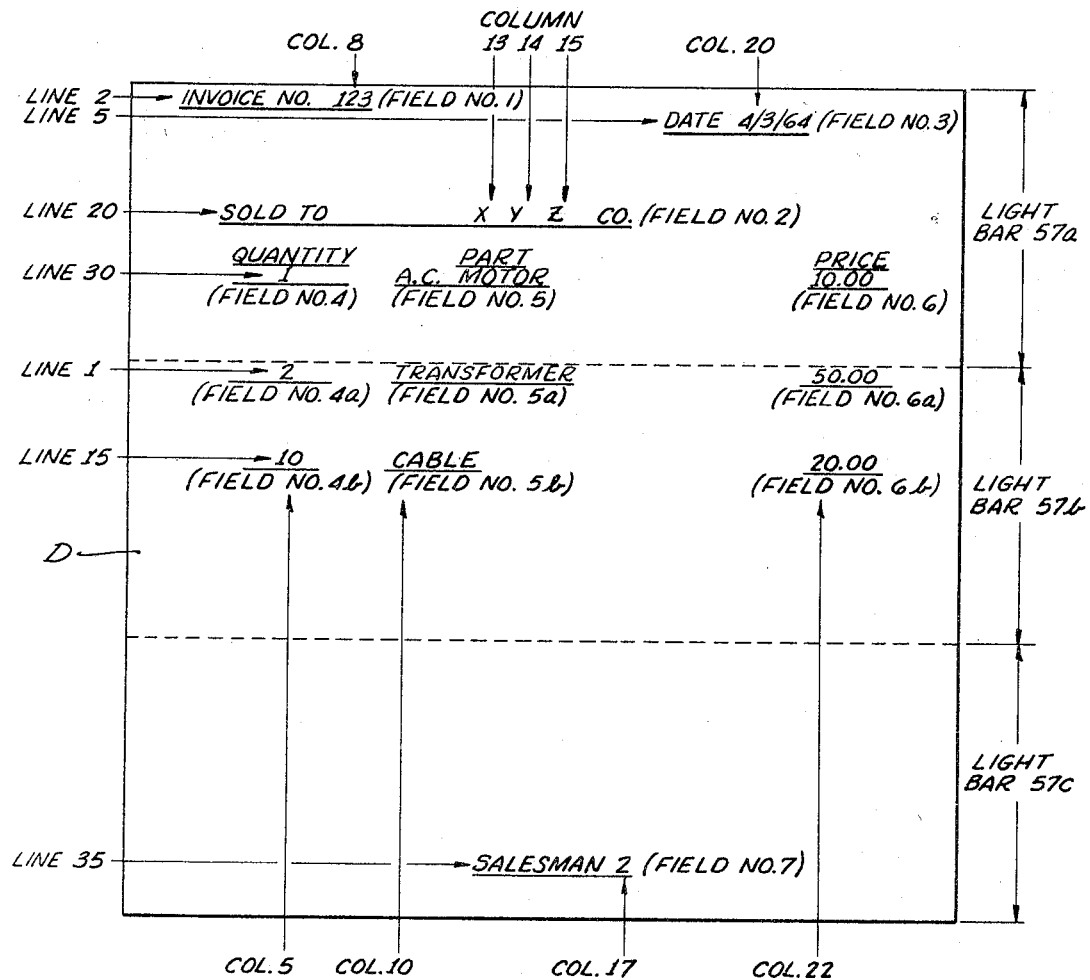
Figure 30:
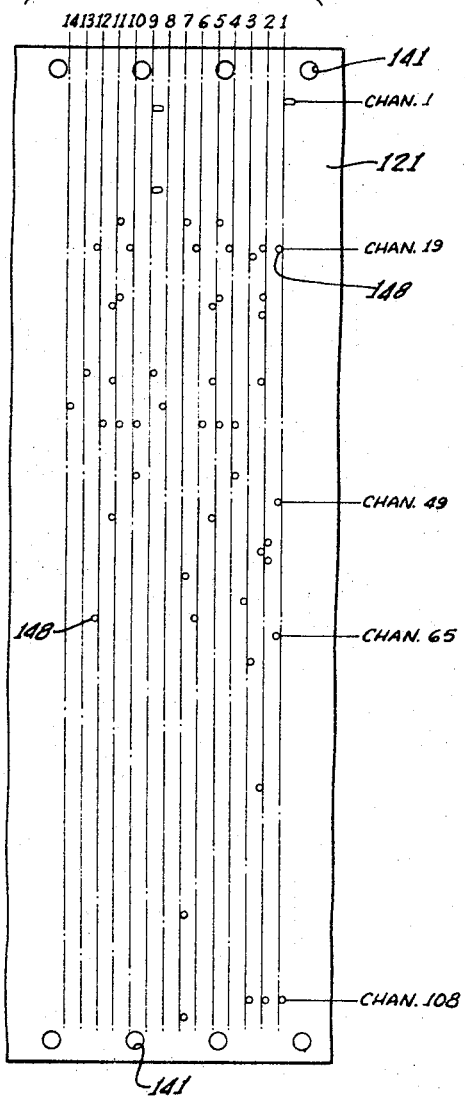
Figure 31:
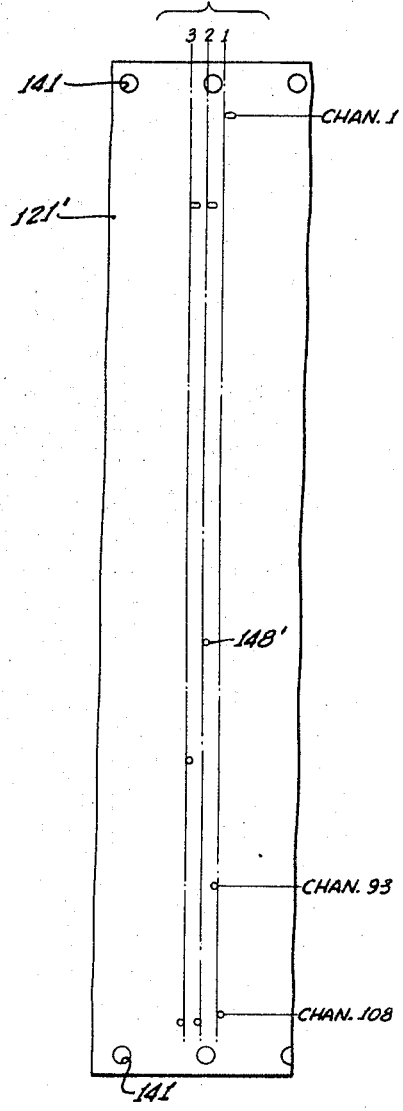
Figure 32:
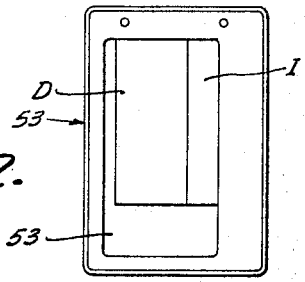

FIGURES 22 through 26, when taken together as shown in FIGURE 21, show a schematic circuit diagram of this invention;

FIGURE 27 is a diagrammatic representation of a document which contains data to be punched in punch cards;

Figures 28, 29:
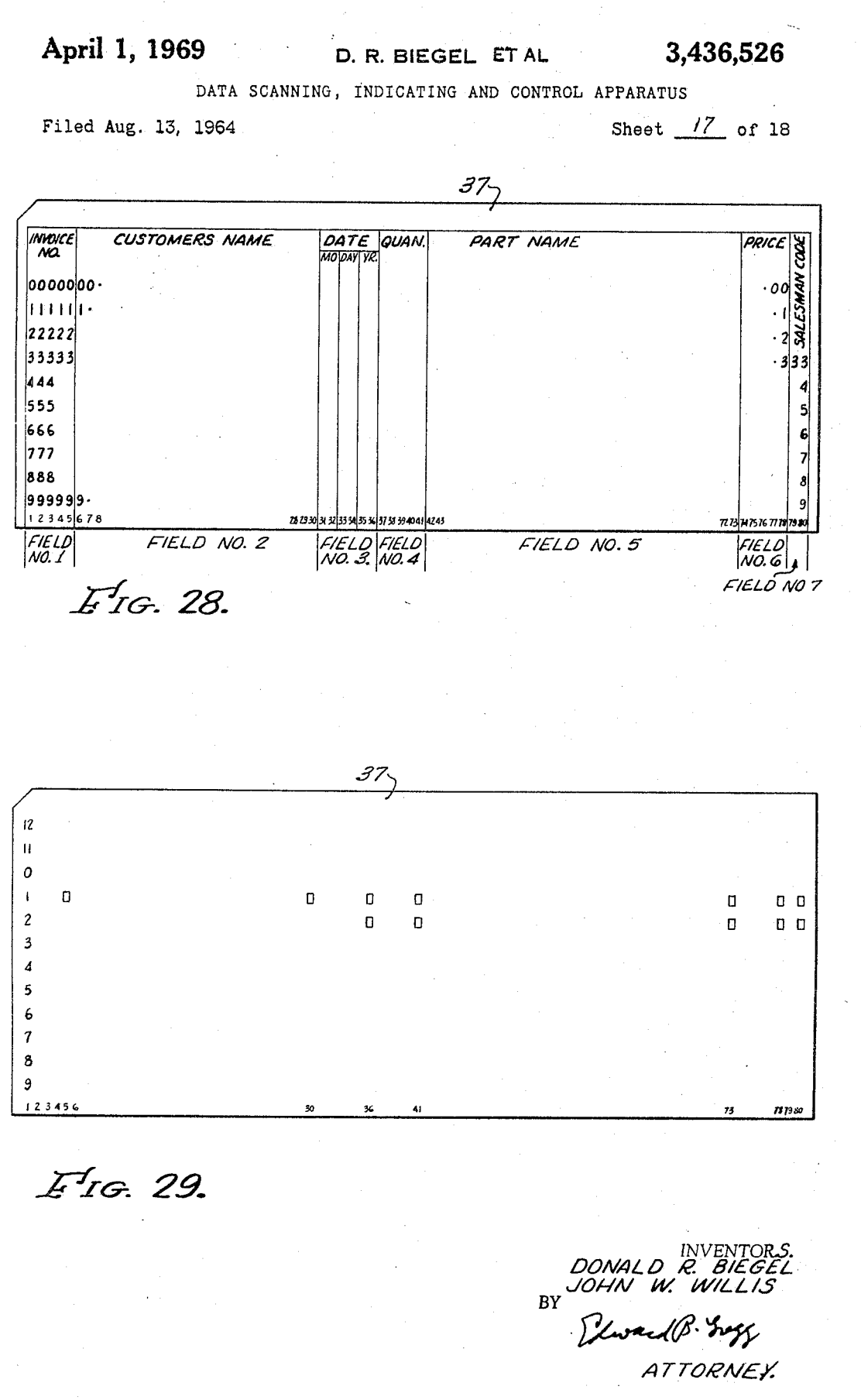

FIGURE 28 is a plan view of a punch card of the type to be punched using data from the source document shown in FIGURE 27;

FIGURE 29 is a plan view of a program card which is suitably punched for use on the program drum of the card punch machine when punching the cards shown in FIGURE 28;

FIGURES 30 and 31 are fragmentary plan views of main and auxiliary program belts, respectively, which are suitably punched for use on the apparatus of this invention when punching the cards shown in FIGURE 28 with information obtained from the source document shown in FIGURE 27; and FIGURE 32 is a top plan view of a source document and a key punching instruction sheet positioned side-by-side on the reading panel of the apparatus of this invention.

Figure 1:
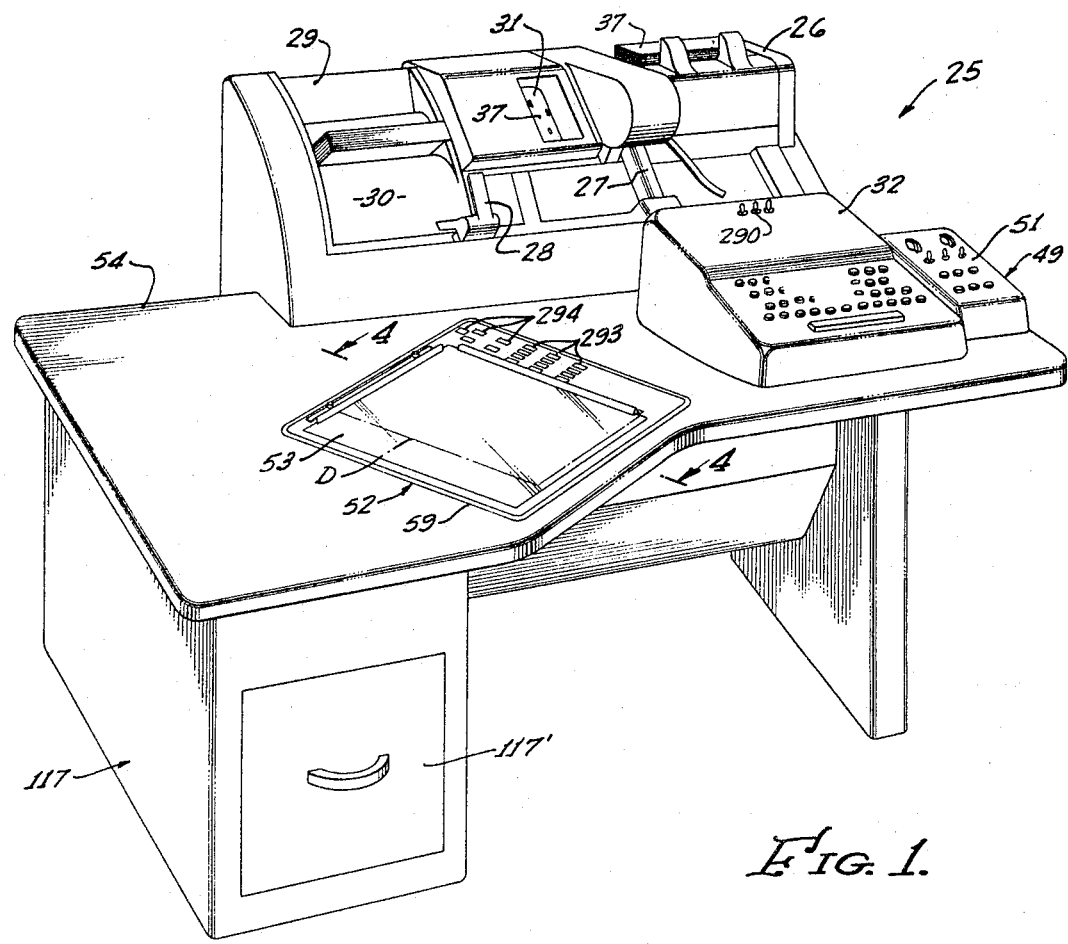
FIGURE 1 is a perspective view of a key punch machine of the well known type and showing also a portion of the apparatus of the resent invention installed in operative relation thereto.

Referring now to FIGURE 1, a key punch machine 25 is there shown which includes a hopper 26, a punching station 27, a reading station 28, a card receiving station 29 and a receiving hopper 30 for punched cards. A program drum is shown at 31 which is described more particularly hereinbelow. Also shown is a keyboard 32. For further details concerning this key punch machine one may consult the various IBM manuals, for example, the IBM manual entitled "Reference IBM Operator's Guide," No. A24–1010 dated July 1959. One may also consult the aforesaid Gardinor and Crowell Patent No. 2,647,581.

Figure 2:
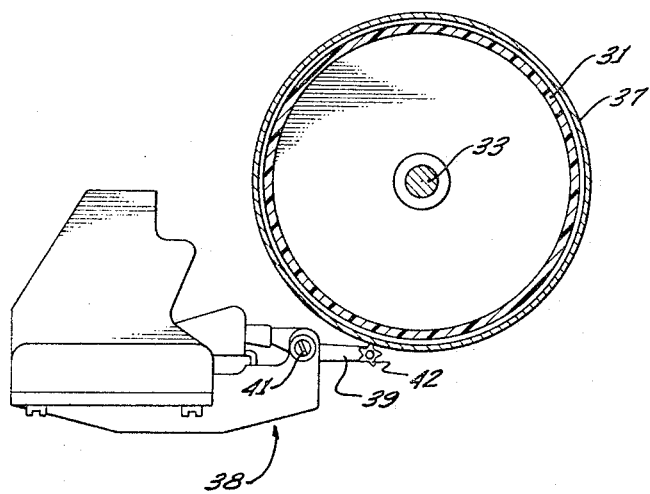
FIGURE 2 is a transverse sectional view through the program drum which forms a part of the machine of FIGURE 1 and showing one of the star wheel assemblies used in conjunction with a program card strapped to the drum.
Figure 3:
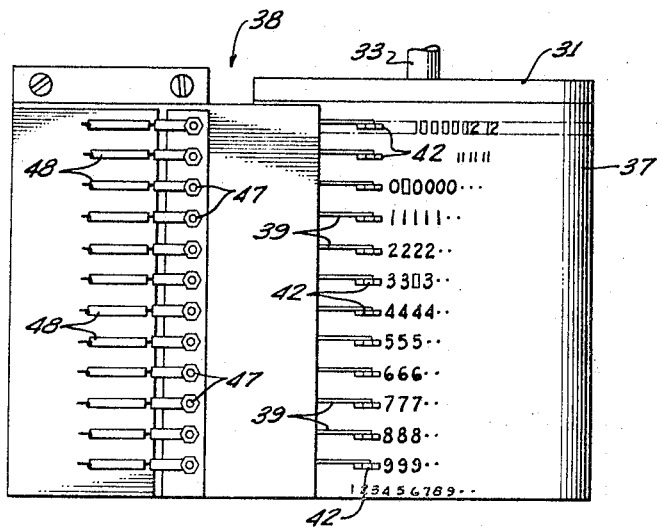
FIGURE 3 is a fragmentary top plan view of the program drum of FIGURE 2 and showing twelve star wheel assemblies which coact with twelve rows of end of field information punched in the card.

The program drum 31, as shown in FIGURES 2 and 3 is fixed to a shaft 33. This shaft and the drum are driven step by step in a manner which is well known in this art, under control of a pawl 34 and ratchet 36 mechanism (shown in FIGURE 19) in the key punch machine. An IBM punch card is shown at 37. The particular card shown in FIGURE 2 is a program card but its format is like punch cards in general and like the cards 37 shown in the hopper 26, which are waiting to be punched.

Referring to FIGURES 2 and 3, a well known star wheel sensing mechanism 38 is there shown which operates in conjunction with the program card. In accordance with this invention a total of twelve such mechanisms is preferably included, each of which comprises a lever or switch operating member 39 which is pivotally mounted at 41 and carries a five pointed star wheel 42 rotatably mounted at the end of the lever 39. The lever 39 controls a switch 43, (shown in FIGURE 24) the fixed contacts 44 of which are connected together and to a ground terminal 46. The movable contacts of the switches 43 are connected to terminals 47 (shown in FIGURE 3) which terminals in turn connect through the lead wires 48 to a relay matrix included in the control circuit of the device of the present invention.

The switch contacts of the star wheel controlled switches 43 remain open as long as the corresponding star wheel is in contact with a program card on the drum 31 at a point where the card is not punched or perforated. But when a point of the star wheel registers with a punch or perforation in the program card it drops into the punch or perforation and thereby closes the switch contacts. If two or more slots are punched in successive columns of a horizontal row, for example, in the third and fourth columns of No. 12 row, the corresponding star wheel will continue to engage a perforation and its switch contacts will remain closed. But if one or more columns are not punched, the corresponding star wheel will move out of the preceding perforation and its switch contacts will be opened and will remain open until the next perforation is encountered.

Ordinarily, when the key punch machine is used without the data scanning and indicating apparatus of the present invention, the closing and opening of the contacts controlled by the star wheels 42 energizes and deenergizes circuits of the machine to control numerous functions of the machine, such as alpha shift, left zero print control, print zero suppress, automatic duplication, automatic skip, field definition and the like, which functions are well known. However, when the data scanning and indicating apparatus is used in conjunction with the key punch machine, the star wheel controlled contacts are used only for end of field control, that is, to indicate the end of a field and the commencement of a new field. The other key punch machine functions which are normally controlled by the card 37 on the program drum are controlled by a punched belt and associated circuitry included in the novel data scanning and indicating apparatus of this invention. Since there is a total of 12 horizontal rows on the normal program card (numbered from top to bottom, as 12, 11, 0, 1, 2, 3, 4, 5, 6, 7, 8, and 9) it will be readily apparent that twelve different field patterns are available with any given program card on the drum.

Considerable skill, intelligence and experience are required by a key punch operator to readily spot items of data on a source document in the proper order, and to know in each instance how many columns or digits are in the respective field so that the necessary zeros may be punched in to the left of the first significant digit. For example, invoice numbers in field No. 1 may run from 1 to 999,999 in which case a field of at least six digits would be required. One document in a group may have invoice No. 219 and will require the punching of three zeros in the first three columns of the field; the next document may have invoice No. 49,682 and will require one zero, etc. Also data may be, and frequently is, distributed randomly with respect to the sequence of field, hence will require the operator to shift her attention in a sequence which is contrary to the normal reading sequence.

It will be apparent that a considerable degree of intelligence, skill and attention are required; that the possibilities of error are great; and that considerable training time is required to learn the program to be punched. Where the trained operator shifts from one type of document to another (for example, from sales invoices to bill of ladings) or where two or more different programs are required from a single source document, the operator must learn each such program.

The data scanning and indicating apparatus of the present invention serves to guide the operator by means of lights to direct her attention to successive fields in the proper order and also to indicate the number of columns or digits in each field. Actuation of the apparatus is under control of the following: the above mentioned star wheel control switches which are included in the key punch machine; certain control switches included on the control panel 51 of an auxiliary control box 49 which may be conveniently located adjacent the keyboard 32; and one or two punched program belts included in the apparatus. Numerous different key punching procedures or routines may be programmed on the belt. The apparatus may be made to automatically repeat, advance to a subsequent routine, or reset to a header or initial routine. Also as mentioned above, key punch machine functions (other than end of field function) which are normally controlled by the drum program card 37 on the key punch machine are under control of the apparatus of the present invention, and may be programmed on the above mentioned punched program belts. Other useful functions of the apparatus will be apparent from the following description.

Referring now to FIGURES 1 and 8, a document D is there shown in position on apparatus 52 for reading by the operator of the key punch machine 25. The apparatus 52 has a translucent panel 53 which may, for example, be of glass or of translucent plastic construction, which holds the document D in proper position and which permits light to shine through the document. The apparatus 52 is of substantially the same construction as a corresponding apparatus employed in the data scanning and indicating apparatus of the above mentioned copending patent application Ser. No. 222,842. In the present application a novel lubricating means is employed for a brush and commutator assembly included in the apparatus, which lubricating means is shown in the drawings and described in detail hereinbelow.

Figure 4:
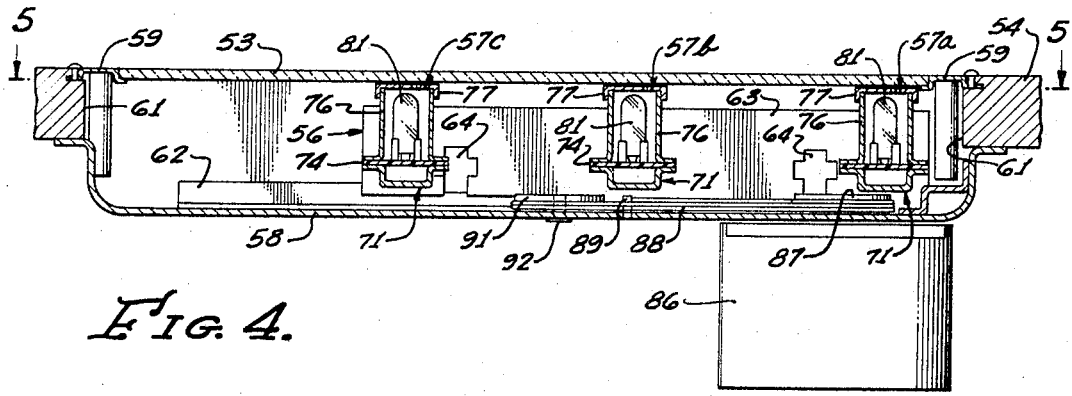
FIGURE 4 is a cross sectional view taken along the line 4—4 of FIGURE 1 through the light carriage assembly.
Figure 5:
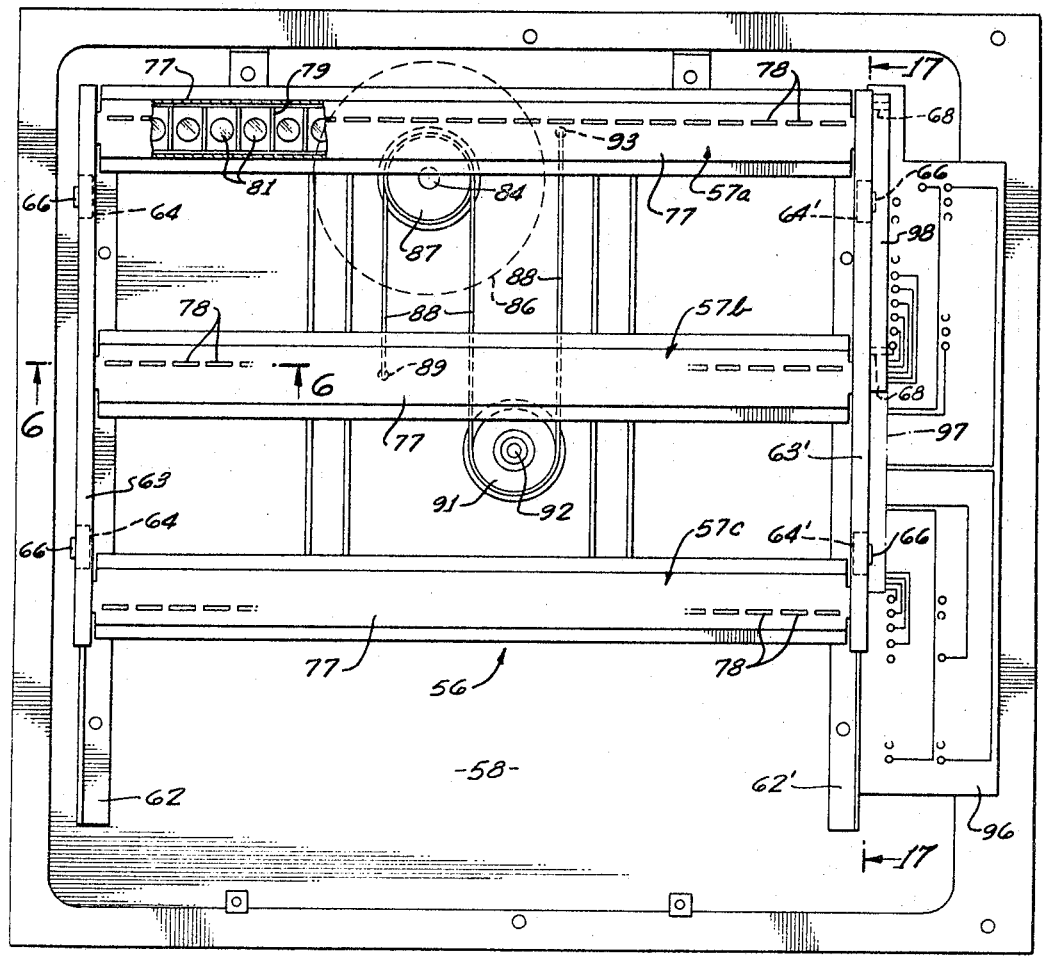
FIGURE 5 is a view taken along the line 5—5 of FIGURE 4 which is in effect a top plan view of the carriage assembly with the reading panel removed.

The apparatus 52 is carried by a table 54 (see FIGURE 1) which is cut away appropriately to receive the apparatus. The mechanical parts of the apparatus will now be described in reference to FIGURES 4 through 7. Referring now to FIGURES 4 and 5, a sliding framework or carriage 56 is provided which comprises three light bars, 57a, 57b and 57c, which are intended to scan the top third (as viewed in FIGURE 1) of document D, the middle third and the bottom third respectively thereof. A pan 58 (see FIGURE 4) is affixed to the under surface of the table 54 and a rim 59 is affixed to the upper surface surrounding an opening 61 formed in the table 54. A pair of parallel angles 62 and 62′ are affixed to the pan 58 on opposite sides thereof, and the vertical portions of these angles serve as tracks for the carriage 56. Carriage side members 63 and 63′ (see FIGURE 5) are provided with slide members 64 and 64′ of nylon or other suitable low friction self-lubricating, noiseless bearing material which are notched as shown to slidably fit over the respective tracks. The carriage side members 63 and 63′ (see FIGURE 6) are notched, cut away and bent suitably to form retaining ears 66 and 67 which bear against the outer and side edges, respectively, of each slide member 64 and 64′ to hold the same in place. The bottom of the notch in the slide members 64 carried by the side member 63 rests on the top of the track 62 for both vertical and lateral support of the side member 63. At the other side of the carriage the slide members 64′ are notched in a manner such that they provide only lateral support for the carriage, and not vertical support. Vertical support for the carriage side member 63′ is provided by "Teflon" supporting and lubricating pads 68 included in a brush and commutator assembly adjacent the side member 63′. Details of the brush and commutator assembly together with the "Teflon" supporting pads 68 are shown in FIGURES 17 and 18 and described in detail hereinbelow. It will here be noted, however, that "Teflon" is the trademark of E. I. du Pont de Nemours and Company, Wilmington, Del., for thermoplastic material comprising polytetrafluoroethylene.

Figure 7:
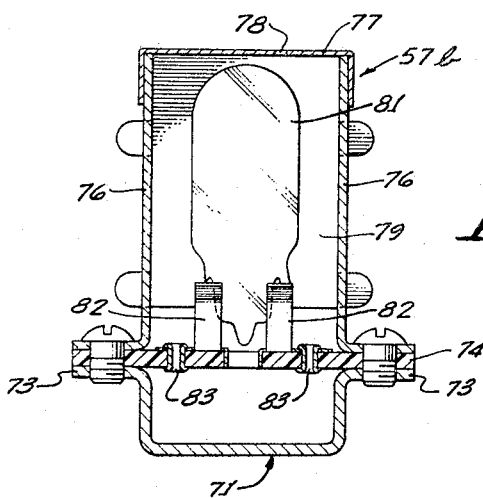
FIGURE 7 is a sectional view taken along the line 7—7 of FIGURE 6.
Figure 6:
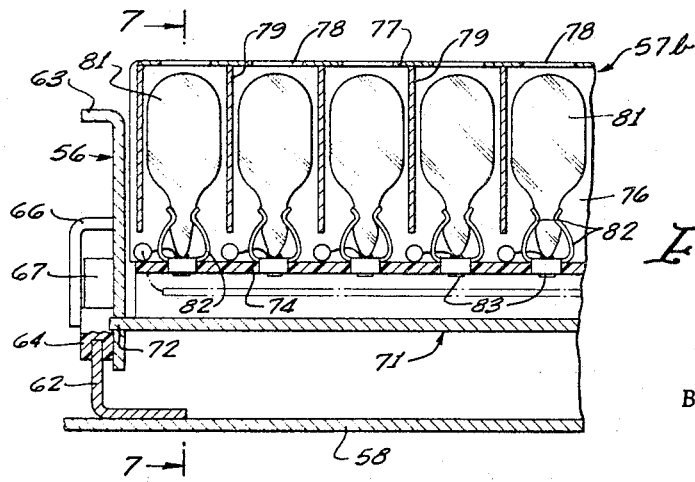
FIGURE 6 is a fragmentary vertical sectional view taken along the line 6—6 of FIGURE 5 showing on an enlarged scale a part of one of the light bars employed to illuminate a source document sequentially.

The light bars 57a, 57b and 57c are formed indentically, hence, a detailed description of one of them (57b) will suffice. Referring to FIGURES 6 and 7, a channel 71 is provided whose bottom portion has an extension 72 at each end which is anchored to carriage side members 63 and 63′. Top flanges 73 of channel 71 are secured by means of screws to a layer of insulating material 74 and to opaque wall members 76. The wall members 76 are covered by an opaque cover 77 which is slit at intervals 78 (see also FIGURE 5). Opaque dividers 79 are provided which divide each light bar into separate compartments, one for each slit 78. Each compartment has therein a lamp 81 which is held by a conductive clip 82 on each side, and each clip is electrically connected to a terminal 83 to which wires are connected.

Referring to FIGURE 5 the motive means for the carriage 56 is provided as follows: a motor shaft 84 is rotated by a motor 86 (see also FIGURE 4). A pulley 87 is fixed to the motor shaft 84. A cable 88 is affixed at one end 89 to the middle light bar 57b and is wrapped twice around the pulley; it then passes about a guide pulley 91, free on a shaft 92 which is mounted on the pan 58; and at its other end the cable is fixed to the light bar 57a at 93.

The carriage 56 is shown in FIGURE 5 at its highest or uppermost position. During movement from such position to its lowermost position, the upper light bar 57a will scan the upper third of document D, the middle light bar 57b will scan the middle third thereof, and the bottom light bar 57c will scan the bottom third of the document. (Actually, the thirds refer to thirds of a document of a specific length, but for purposes of explanation herein it may be assumed that the thirds relate to any given document.)

This arrangement of the bars limits the degree of travel required by a complete scanning operaiton, and the bars 57a, 57b and 57c are selectively activated in the manner described hereinafter so that, when data to be indicated lies in the portion of a document corresponding to any one of the light bars, that light bar (and only that light bar) will be activated.

Referring now to FIGURES 5, 17 and 18, a brush and commutator assembly is there illustrated. A board 96 of suitable insulating material is supported beneath the carriage 56 and to the right thereof as viewed in FIGURE 5. This board is also shown in FIGURES 17 and 18. A commutator 97 is formed thereon, for example, by means of printed circuit technique. There are 44 individual commutator contacts which will be indicated as C–1, C–2, etc., on to C–44. These forty-four contacts correspond to forty-four horizontal lines in the upper third of the document D, or to forty-four such lines on the middle third of document D, or to forty-four such lines on the bottom third of document D. Such lines will be described more fully hereinafter. Mounted on and carried by carriage 56 above the commutator board 96, and its contacts C–1, etc., is a board 98 of insulating material to which three brush elements 101, 102a and 102b are attached through a stack of plates 103 of insulating material. The brush elements 102a and 102b extend from a common terminal portion 104 and together are identified as brush 102. The terminal 104 for the brush 102 is electrically isolated from the terminal portion 106 of the other brush 101 by one of the insulating plates 103. It will be seen that the brushes 102a and 102b are spaced apart a distance equal to the spacing of two adjacent contacts C–1, C–2, etc. Also a brush 107 having 44 resilient contact members or brush elements 107a with a common terminal portion 108 is attached to the board 98 through an inverted L-shaped bracket 109. The upper horizontal leg portion 109a of the bracket 109 is attached to the bottom of the board 98 by means not shown, and the terminal portion 108 of the brush 107 is secured by rivets 111 to the downwardly extending leg portion 109b of the bracket, as best seen in FIGURE 18; the terminal portion 108 being shown sandwiched between a flat plate 112 and the bracket leg 109b for the rigid support thereof, along the said terminal portion. Each contact member 107a can contact a single commutator contact C–1, C–2, etc., and they are spaced apart a distance equal to the spacing of the contacts, C–1, C–2, etc. The brush 101 is spaced from the adjacent brush 107 by the distance between two adjacent contacts C–1, C–2, etc., and the brush 102 is spaced from the brush 101 by twice the distance between adjacent contacts C–1, C–2, etc. For reasons which will become apparent, brush 107 will be referred to as the reverse brush; brush 101 as the prime brush and brush 102 as the AC-DC brush.

As mentioned above, the board 98 with the brushes 101, 102 and 107 is attached to the carriage 56, while the commutator board 96 is fixed to the pan 58. The brushes move along the commutator contact C–1, C–2, etc. during travel of the carriage, and the right hand side of the carriage, as viewed in FIGURE 5, is supported on the "Teflon" pads 68. As best seen in FIGURES 17 and 18, the mounting for the "Teflon" pads includes horizontal arms 114 formed at opposite ends of the bracket 109 and extending over the commutator contacts C–1, C–2, etc. Slots are cut through the arms 114 and in the horizontal leg portion 109a of the bracket directly thereabove, within which slots the "Teflon" pads 68 snugly fit for the support thereof. The pads 68 are provided with a flat bottom surface 116 which rests on the commutator board 96 and slides therealong as the carriage 56 is moved. A recess 115 is formed in the side of one of the pads to accommodate the brush 101 and prevent interference therewith.

Not only do the pads 68 support the carriage 56 at one side thereof, but they also serve to lubricate the commutator thereby greatly prolonging the useful life thereof. The pads 68 and commutator brushes follow the same path (i.e., they track) across the commutator board whereby the commutator board is lubricated by the "Teflon" pads whenever the carriage is moved. It has been found that the useful life of the brush and commutator is greatly extended by the use of such lubricating "Teflon" members.

It is a common practice to form the brushes of beryllium-copper alloy and the commutator contacts of copper plated with rhodium. The invention, however, is not limited to any particular brush and commutator contact materials. Further, it will be apparent that the "Teflon" members may be employed in switching devices other than the illustrated arrangement without departing from the invention. For example, "Teflon" lubricating members may be used wherever one contact member is adapted to wipe across another as in rotary switches and the like.

As explained hereinafter, to scan a document in a predetermined sequence, then repeat the sequence or advance to another sequence, and to automatically control the automatic skip, automatic duplicate, alpha shift and other functions of the key punch machine, the circuit is programmed by means of punched belts and associated sensing heads. Since a total of twelve end of field programs are available through the twelve star wheel zones on the program card 37, at least 12 different programs may be included on the punched belt. If, however, the field location of two or more programs coincide, the one end of field program may be used with different belt programming. Thus, it will be understood any number of programs may be stored on the belts for use with the 12 end of field programs on the program card 37. (As described hereinbelow, the apparatus is also adapted for use in punching variable field length cards by providing for manual control of the end of field function rather than depending upon the program card 37 for this function.)

The main circuit components for the apparatus of this invention are mounted on a chassis within a cabinet 117 at the key punch machine as shown in FIGURE 1, a schematic of which circuit is shown in FIGURES 22 through 26 when taken together as shown in FIGURE 21. The above mentioned punched program belts and associated sensing heads are included in a drawer 117' in the cabinet, which drawer may be pulled open for ready access of the program belts for changing the same when desired. The auxiliary control box 49 is located adjacent the keyboard of the key punch machine for easy access by the operator. The light panel apparatus 52, control box 49, main circuit chassis, punched belt programming apparatus and the key punch machine are all interconnected through cables, not shown in FIGURE 1.

Figure 10:
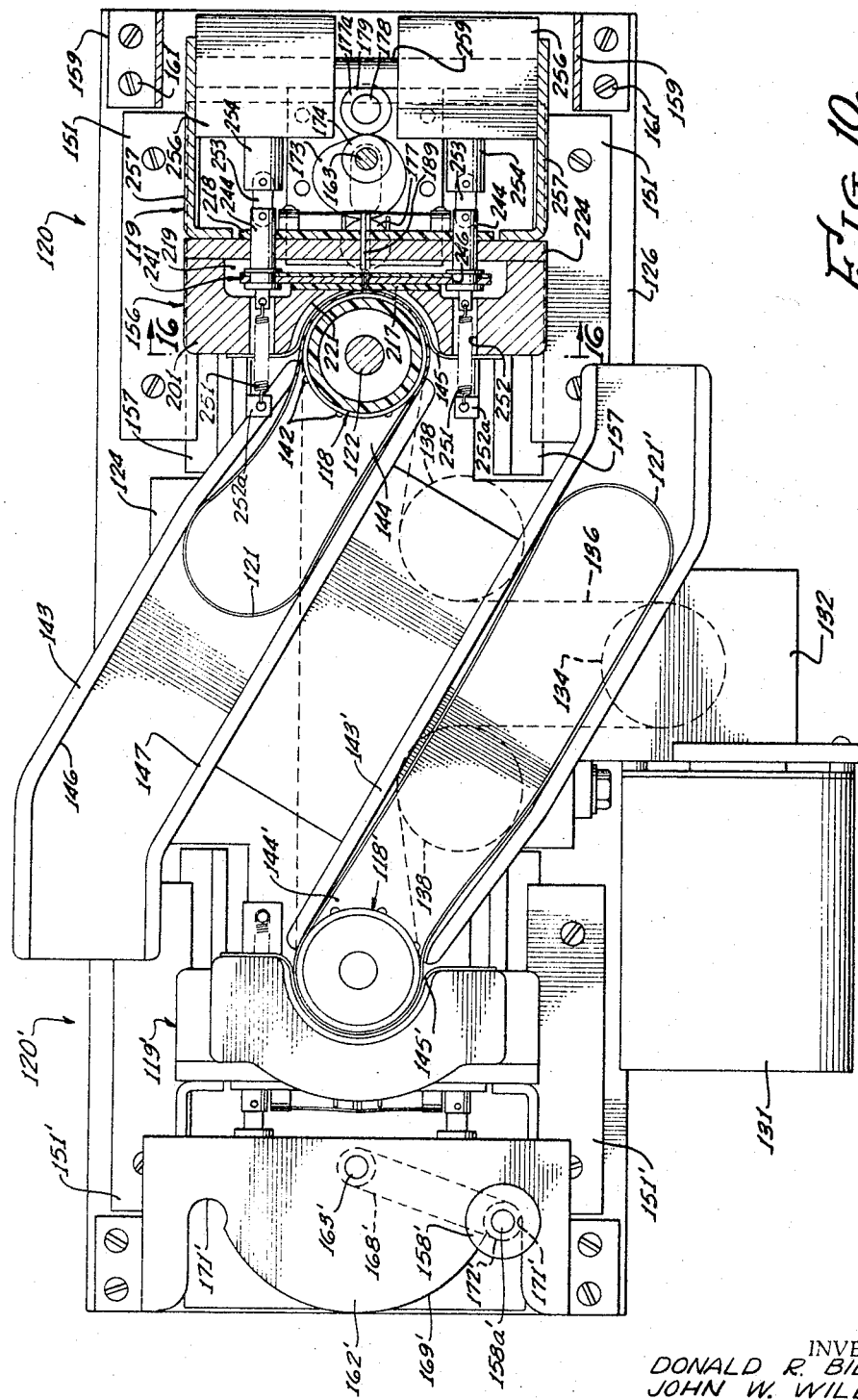
FIGURE 10 is a top plan view, with parts broken away for clarity, of a programming apparatus which includes a main and a secondary drive drum for drive actuation of punched program belts which coact with main and secondary reading or sensing heads for control of the apparatus of the present invention and the key punch machine.
Figure 11:
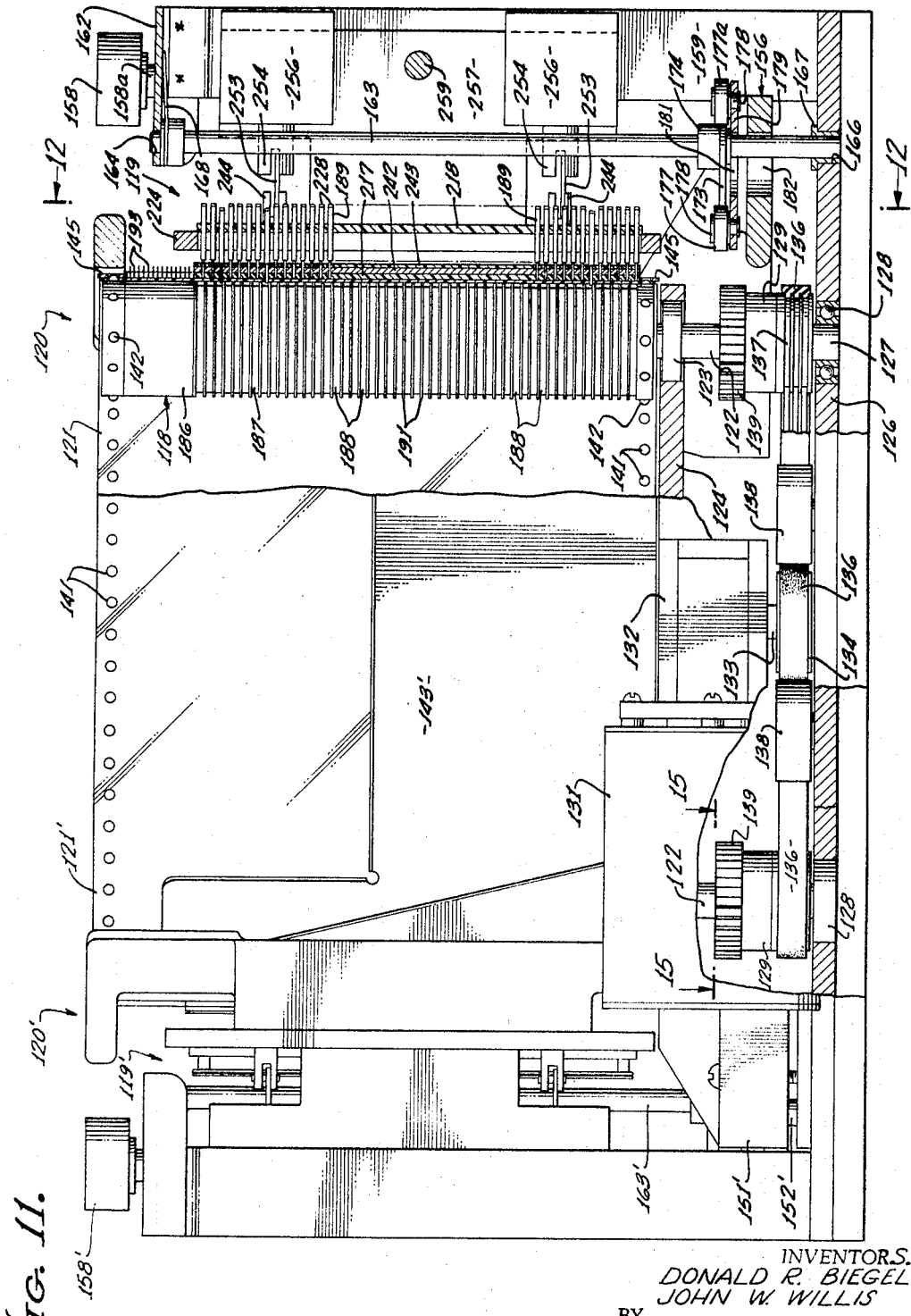
FIGURE 11 is a front elevational view of the programming apparatus with parts being shown broken away for clarity.

The mechanical construction of the punched belt programming apparatus is shown in FIGURES 10 and 11 to which reference is now made. In the illustrated embodiment of the invention, the programming apparatus includes main and secondary programming units designated 120 ad 120', which units include main and secondary drive rolls or drums 118 and 118', respectively, and associated main and secondary reading, or sensing heads, 119 and 119'. Main and secondary punched program belts 121 ad 121' are adapted to be driven by the drive rolls 118 and 118', and the information in the form of punched holes in the belts is sensed by the reading heads. It will here be understood that the main and secondary drive rolls and reading heads of the program assembly are of substantially identical construction. For this reason, only one of the program units is described in detail hereinbelow, and where corresponding elements in the two units are shown in the drawings or mentioned herein the elements are generally identified by the same reference numeral. However, where it is desired to distinguish between elements in the main and secondary units, the reference characters which identify elements in the secondary unit are primed whereas those elements in the main unit are not. It will be further understood that the invention may be used with only the main reading unit 120 without the secondary unit 120', and that the secondary unit may be eliminated from the construction. The function of the units will become apparent following a detailed description of the apparatus.

The drive rolls 118 and 118' (only one of which is seen in FIGURE 11) are fixedly secured to the shafts 122 extending downwardly from the lower end thereof, which shafts are rotatably supported in bearings 123 carried in a bracket 124 fixedly secured to the base plate 126 of the assembly through posts not shown. As seen in FIGURE 11, a second shaft 127 in axial alignment with the first shaft 122 is rotatably mounted by ball bearings 128 in the base plate 126, and the aligned shafts are interconnected through a friction drive mechanism 129. The friction drive permits rotation of the shaft 127 while the shaft 122 is locked against rotation, and when the shaft 122 is released it is rotated by the rotating shaft 127 through the friction drive mechanism. Such mechanisms are well known and require no further showing or description.

Both of the drive drums or rolls 118 and 118' are driven by a single reversible motor 131 through a gear box 132 having an output shaft 133 (see FIGURE 11) to which a drive pulley 134 is attached. A drive belt 136 connects the drive pulley 134 with pulleys 137 fixed to the shaft 127. As seen in FIGURE 10, the drive belt rides on idler pulleys 138 rotatably carried on the base plate, which idler pulleys are located to provide adequate circumferential engagement (of about 180°) of the belt with the driving and driven pulleys 134 and 137, respectively. It will here be noted that although the belt 136 is continuously driven by the motor 131, the drive rolls 118 and 118' are locked against rotation by releasable latching mechanisms which include ratchet wheels 139. Each drive roll is provided with its own latching mechanism, and the latching mechanisms may be controlled independently for individual control of the drive rotation of the rolls. A detailed description of the latching mechanism and their operation is included hereinbelow.

Continuing now the description of the program assembly, the punched program belts 121 and 121' are each in the form of a continuous loop of any desired length. They are of sufficient length to accommodate the required programming thereon, and are not limited to any particular length. Circular spaced holes 141 (see also FIGURE 20) are formed along opposite edges of the belt, which holes are engaged by radially extending cylindrical drive pins 142 at opposite ends of the rolls for drive actuation of the belt upon rotation of the drive rolls. Open ended troughs 143 and 143' with spaced vertical side walls 146 and 147 extend from the side of the drive rolls for the support of the program belts. The belts enter one end 144 of the troughs and, in the illustrated arrangement, they terminate within the troughs. It will be apparent however, that where longer belts are required they may extend completely through the troughs and out the opposite ends thereof. In the illustrated operative position of the sensing heads the belts are pressed against the drive drums by arcuate pressure members 145 located at opposite ends of the drive drums adjacent the drive pins 142. With the belts firmly pressed against the drive drums at the drive pins, it will be apparent that when a drive drum is rotated by the motor 131, the associated program belt will be driven thereby. Further description of the pressure members and the means for mounting the same on the sensing heads is included hereinbelow.

Figure 20:
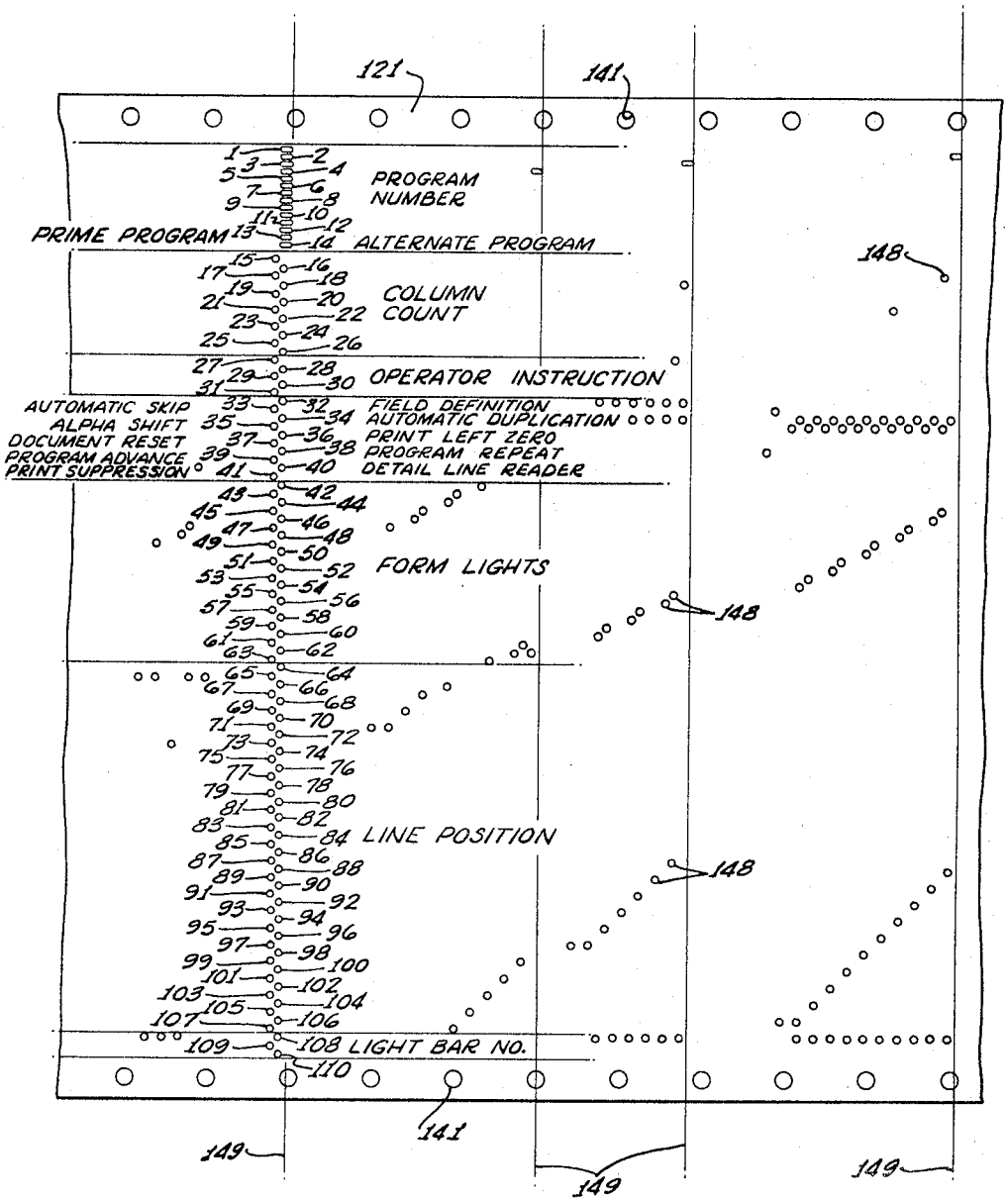
FIGURE 20 is a plan view of a fragmentary portion of a program belt in which the channels have been labeled for purposes of illustration.

The belts 121 and 121' may be made of any suitable material desired. One such suitable material is a saturated polyester plastic film of poly (ethylene terephthalate) available under the trademark "Mylar." "Mylar" film belts are very tough and possess the required dimensional stability with environmental changes in temperature, humidity, etc. The desired programs are entered on the belts by punching holes 148 therethrough, which holes are sensed by the reading or sensing heads 119 and 119'. For purposes of description, the belt may be considered as divided into vertical columns, any number of which may be included on the belt since, as mentioned above, the belt may be made of any desired length. The belt also has 110 horizontal positions or channels. The upper 14 positions lie in a vertical straight line while the lower 96 hole positions are alternately located on opposite sides of a vertical straight line. The lower positions have been staggered to permit an increased number of sensing elements over a decreased belt width. If all of the positions were in-line, the vertical distance between adjacent holes of the lower ninety-six positions would have to be increased (to provide space for the sensing elements associated therewith and described below) thereby necessitating an increase in the width of the belt. In FIGURE 20 the hole positions for an entire column of holes is shown and their functions are labeled. In practice, of course, not all of the positions for any one column are punched, and the belt is not labeled. Information for a complete program (or alternate program) is contained between the vertical lines 149.

Figure 12:
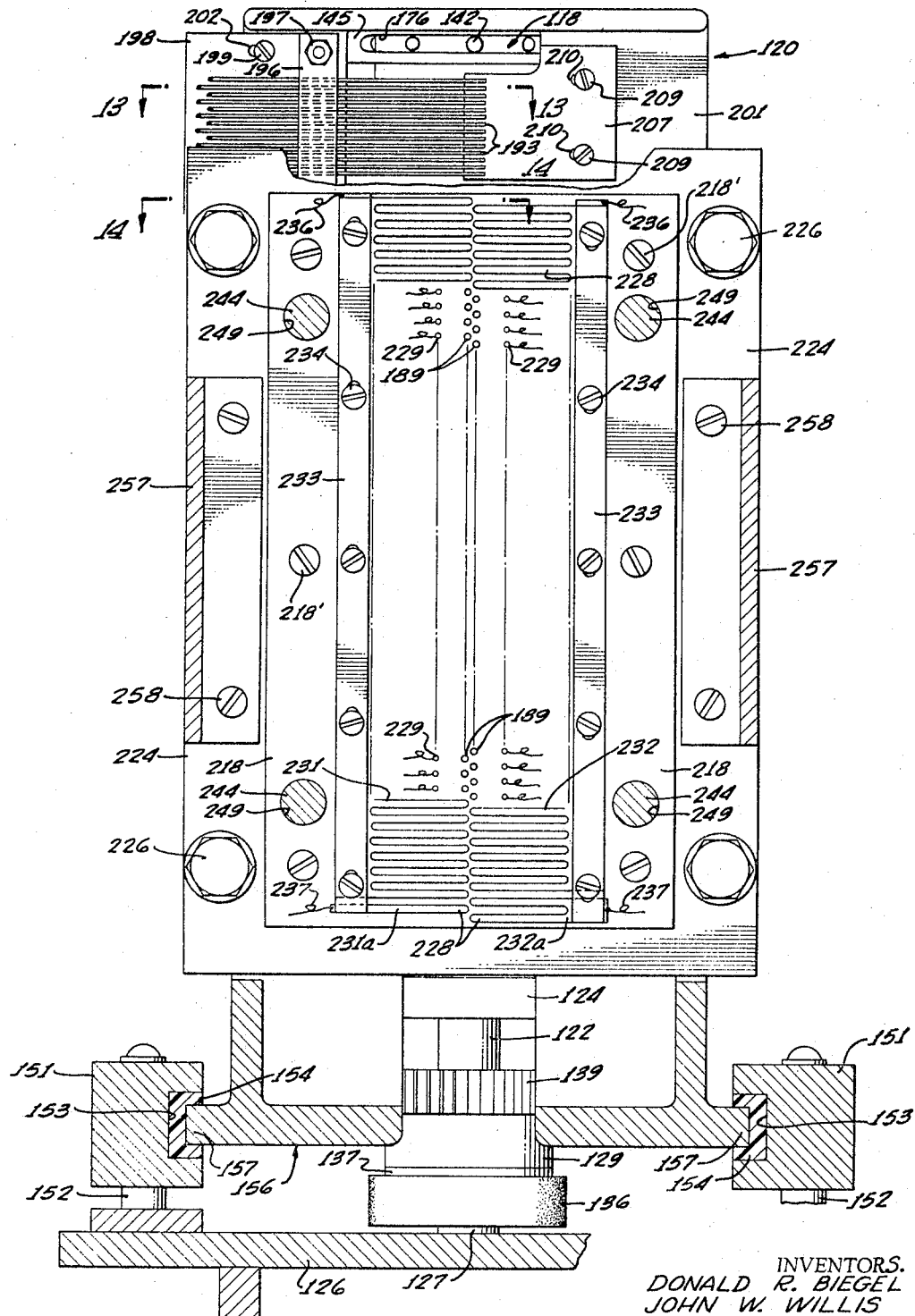
FIGURE 12 is an enlarged cross sectional view taken on line 12—12 of FIGURE 11.

Returning now to FIGURES 10 and 11, the sensing heads 119 and 119' are slidably mounted on the base plate 126 whereby the heads may be moved from the operative sensing position illustrated in the drawings, to a spaced position from the drive roll and program belt. In such withdrawn position the program belt may easily be released from the drive pins 142, lifted vertically from the drive rolls, and replaced with another program belt. Referring now also to FIGURE 12, a pair of parallel rails 151 are mounted on posts 152 extending from the base plate 126 of the assembly. The rails are formed with inwardly directed elongated grooves 153 in which are located channel shaped plastic inserts 154 of nylon or the like material. A cast frame 156 is provided with outwardly extending flanges 157 which extend into the grooves 153 and slidably engage the plastic inserts 154. The casting 156 with the attached sensing mechanisms is therefore slidable along the rails directly toward and away from the associated drive drum 118.

Actuation of the frame 156 of the sensing head along the rails 151 is manually controlled by means of a handle 158 at each of the sensing heads (see FIGURE 11). As seen in FIGURES 10 and 11, a pair of upright legs 159 is secured by screws 161 to the base plate 126 on opposite sides thereof. A cap or bridging member 162 extends between the upper end of each pair of legs and is attached to the legs by welding or other suitable means not shown. A vertical shaft 163 extends between the cap 162 and base plate 126 and is rotatably supported thereby. Apertures 164 and 166 are formed in the cap and base plate into which the shaft ends extend; the lower end of the shaft being rotatably supported in a sleeve bearing 167 in the base plate. The handle 158' is connected by a pin 158a' to a resilient crank arm 168' which in turn is connected to the shaft 163'. As seen in FIGURE 10, the cap 162' is provided with a convex arcuate edge 169' having indentations 171' at the opposite ends thereof, and a detent 172' is mounted on the pin 158a' for engagement with the indentations at the opposite ends of travel of the handle. The resilient crank arm 168' normally biases the detent 172' upwardly into the indentations when the crank is at either end of travel. To turn the crank (and attached shaft 163') the handle 158' is first pushed downwardly to disengage the detent 172' from the identation 171', at which time the crank may then be swung about the axis of the shaft 163' to the other end of travel.

Figure 14:
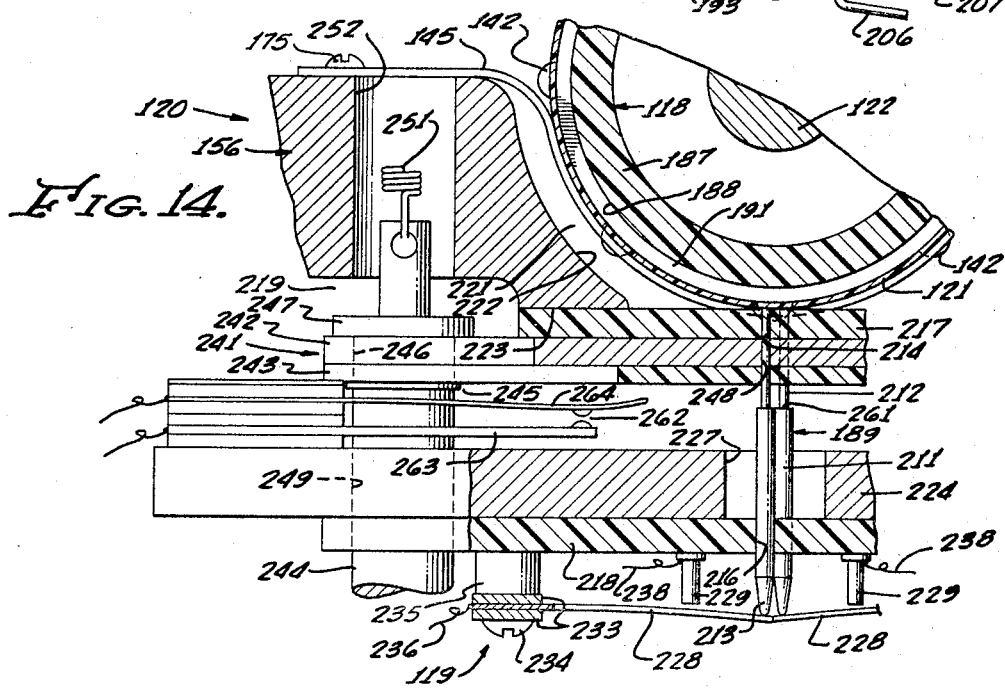
FIGURE 14 is an enlarged fragmentary sectional view taken on line 14—14 of FIGURE 12.

Manual rotation of the shaft 163 by the crank 158 functions to move the sensing head 119 into and out of operative reading position with the program belt through the following mechanism. Referring to FIGURES 10 and 11, more particularly FIGURE 11, a cam 173 is fixed to the shaft 163 through a hub 174, and a pair of rotatable cam followers 177 and 177a engage the cam at diametrically opposite points thereon. The cam followers are carried on pins 178 extending upwardly from a plate 179 fixedly secured to the frame 156 of the sensing head. Elongated holes 181 and 182 are formed in the plate 179 and frame 156 through which the shaft 163 extends. As mentioned above the sensing head is shown in the closed condition, that is, in a reading position adjacent the program belt. In order to open the apparatus, the handle 158 is first depressed and then swung to the opposite end of its travel along the arcuate edge 169. As the shaft 163 is rotated, the cam 173 urges the follower 177a to the right, as viewed in FIGURE 11, thereby sliding the attached sensing head along the rails 151 away from the drive drum. When the handle is returned to the illustrated position the cam urges the cam follower 177 to the left, as viewed in FIGURE 11, to slide the sensing head back into the illustrated reading condition with the drive roll and the program belt. As best seen in FIGURES 14 and 16 flat end leg portions of the pressure members 145 are attached by screws 175 to the frame 156 of the sensing head. The pressure members are thereby movable toward and away from the drive roll as the sensing head is moved. As mentioned above, the members 145 are positioned adjacent the drive pins 142 adjacent the upper and lower ends of the drive drum and as best seen in FIGURE 16, an elongated slot 176 is formed in the members into which the drive pins 142 may protrude when the sensing head is in the closed condition. The members 145 thereby bear against the belt adjacent the drive pins 142 to snugly press the belt against the drum and maintain the belt in drive relation with the pins. When the sensing head with the attached pressure members is moved away from the drive drum in the manner described above the belt may be removed from the apparatus by disengaging the same from the drive pins and then lifting it vertically off the drum.

The drive drums or rolls 118 and 118' are of a cylindrical tubular shape (see FIGURE 10) and each comprises an upper metallic conducting section 186 (see FIGURE 11) and a lower section 187 of non-conducting material. The metallic upper section 186 has a smooth exterior surface while the lower insulating section is formed with a plurality of annular grooves 188 into which sensing pins 189 may extend in a manner described hereinbelow. The annular rings 191 formed by the grooves are sufficiently close together to support the program belt without the belt entering the grooves.

Figure 13:
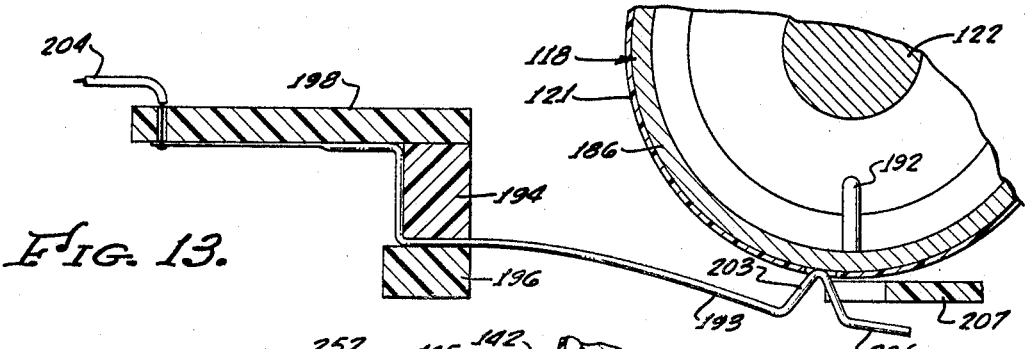
FIGURE 13 is an enlarged fragmentary sectional view taken on line 13—13 of FIGURE 12.

A lead wire 192 (as seen in FIGURE 13) is attached to the upper conducting section 186 and extends downwardly through the drive roll. It is connected through a brush and contact ring, not shown, to a ground connection 46 in the electrical circuit described hereinbelow. The conducting section 186 of the drive drum comprises one contact of a switch mechanism which includes a total of fourteen (14) resilient movable contacts 193 adapted to contact the section 186 through elongated holes punched in the program belt. As best seen in FIGURES 12 and 13, the switch contacts 193 are mounted in spaced relation along a block of insulating material 194 and clamped in position by a cap 196 which is secured thereto by nut and studs 197. The block 194 is fixed to a board 198 by means not shown, which board, in turn, is attached by screws 199 to an upright portion 201 of the sensing head frame 156. The screws 199 extend through elongated holes 202 in the board 198 for lateral adjustment of the board and attached contact arms 193.

As best seen in FIGURE 13, each movable contact arm 193 is formed with a V-shaped portion 203 which is biased by the resiliency of the arm itself into contact with the program belt 121. As long as the arm 193 rides on the belt 121 no electrical connection is made between the arm and metallic section 186 of the roll. When the portion 203 of the arm registers with a punch or perforation in the program belt, as seen in FIGURE 13, the movable arm 193 contacts the cylindrical conducting portion 186 of the drive drum for closure of the switch contacts. Lead wires 204 from the switch arm 193 connect to circuits described below for control thereof.

An extension 206 is formed at the free end of each of the resilient switch arms 193 which extensions are adapted for engagement with a stop plate 207 when the sensing head is opened to permit the removal and replacement of belts on the drive roll (see FIGURE 13). The stop plate 207 (as seen in FIGURE 12) is secured to the upright portion 201 of the casting 156 by screws 209 which extend through elongated holes 210 in the board. The stop plate is thereby also laterally adjustable. When the sensing head 119 is slid back away from the drive roll in the manner described above, the extensions 206 on the switch arms 193 engage the stop plate and prevent the arms from assuming an unflexed condition. The switch arms are thereby withdrawn from the drive roll when the sensing head is moved to the open position. It will be noted that the switch arms 193 are in operative condition for contact with the conducting section 186 of the drive drum through the program belt at all times that the head is in the closed condition illustrated in the drawings.

The fourteen switch arms 193 are in vertical alignment and are adapted for cooperation with the fourteen vertically aligned hole positions on the program belt, at the upper end thereof. The ninety-six staggered positions below the in-line upper 14 positions are adapted for sensing by a sensing mechanism which includes the sensing pins 189. Referring also to FIGURE 14, the pins 189 are shown including a cylindrical shaped body portion 211 having a reduced diameter portion 212 at one end and a tapered section 213 at the other end. The pins are axially slidable in aligned through holes 214 and 216 in spaced guide plates 217 and 218, respectively, included in the sensing head. As seen in FIGURE 10, the upright portion 201 of the frame casting 156 is formed with a cavity 219, and an elongated slot or opening 221 opens into said cavity, which slot is formed with arcuate vertical edge surfaces 222 which are radially spaced from the drive roll 118. The guide plate 217 is located within the cavity and covers the lower end of the opening 221 opposite the grooved portion 187 of the drive drum. It is attached to spaced flush surfaces 223 along the opposite edges of the opening 221 by attachment screws or other means, not shown. A rectangularly shaped cover plate 224 is fixed to the upright portion 201 of the casting by cap screws 226 as seen in FIGURE 12 and partially covers the cavity 219. The other guide plate 218 is attached to the outer surface of the cover plate 224 by screw fasteners 218' or other suitable means, and an elongated vertical slot 227 is formed in the cover plate 224 through which the sensing pins 189 extend. The sensing pins 189 are staggered (as seen in FIGURE 12) to conform to the staggered location of the lower 96 hole positions in each column of the program belt.

In the operation of the apparatus, the drive roll is rotated and the program belt 121 driven only when the pins 189 are retracted by a retracting mechanism described forthwith. When the belt 121 is stopped and the pins 189 are unretracted, resilient fingers 228 comprising switch arms urge the pins axially in the direction of the drive roll. A series of posts 229 are mounted on the insulated guide plate 218 directly opposite the resilient fingers 228 and together with the fingers comprise switch contacts. When the program belt is not punched or perforated, the pins are in contact with the belt on the drum and the switch contacts remain open. When the pins register with holes or perforations in the belts, such pins are resiliently biased by the resilient switch arms 228 through the perforations and into a groove 188 in the drive drum, it being understood that the grooves 188 in the drive drum are located directly adjacent the holes 148 punched in the belt. The depth of the grooves is greater than the spacing between the contacts 228 and 229 in the open condition to permit closing thereof when the pins 189 enter a groove.

As seen in FIGURE 12, the fingers 228 are included in four comb structures; the individual comb structures at one side of the head being identified by the reference characters 231 and 231a and those at the other side by the reference characters 232 and 232a. The base portions of the comb structures are clamped between strips 233 (FIGURE 14) of insulating material and attached by screws 234 to posts 235 carried by the guide plate 218. The upper two combs 231 and 232 are electrically insulated from the lower two 231a and 232a. Lead wires 236 are attached to the upper two combs and connect to electrical ground 46. The lower combs 231a and 232a are connected through lead wires 237 to a positive D-C voltage source in a manner described below. The fixed switch contacts 229 are connected through lead wires 238 to individual circuits also described below. It will here be apparent that when a movable contact finger 228 in either of the upper comb structures 231 or 232 closes with a fixed contact finger, the circuit connected to such fixed contact is grounded, whereas closure of any of the contacts included in the lower comb structures 231a and 232a function to supply a D-C potential to the circuit connected thereto. The electrical circuit connections for these switches is shown in FIGURES 22 through 26 and described below.

Upon rotation of the belt drive drum the resilient contacts 193 ride along the program belt 121 and enter into and move out of the perforations in the belt for making and breaking contacts with the conducting drum section 186. It will be apparent, however, that no rotation of the program belt is possible when a sensing pin 189 extends through a punch or perforation in the belt. The sensing pins 189 must be retracted whenever the program belt is to be rotated, and for this purpose a solenoid operated retracting mechanism is employed. The retracting mechanism (see FIGURE 14) includes a retracting member 241 comprising a pair of plates 242 and 243 secured together by any suitable means not shown. The retracting member 241 is supported within the cavity 219 (see FIGURE 10) on axially movable actuator rods 244 adjacent the four corners thereof. The rods 244 extend through holes 246 in the plates 242 and 243 (see FIGURE 14) with the plate 242 in abutting relation with a radial flange 247 adjacent one end of the rod. C-rings 245 engage grooves in the rods 244 adjacent plate 243 to fix the said plates 242 and 243 to the rods. The reduced diameter ends 212 of the sensing pins 189 slidably fit within through holes 248 formed in the retracting member.

The actuator rods 244 are slidably mounted in through holes 249 formed in the attached plates 218 and 224. Tension springs 251 are connected to one end of the actuator rods. They extend through holes 252 (see FIGURE 10) in the upright portion 201 of the casting 156 and are connected at the other end to said sensing head frame 201 through tabs 252a fixed thereto. It will be seen, therefore, that the retracting plate 241 is resiliently biased by the springs 251 into engagement with the guide plate 217. In this position, the sensing pins 189 are free to enter perforations in the program belt.

Referring to FIGURE 10, the other end of each actuator rod 244 is connected through a connecting link 253 to the armature 254 of a retracting magnet of solenoid 256. The solenoids 256 are mounted on L-shaped brackets 257 secured to the mounting plate 224 by screws 258. A tie rod 259 between the brackets provides added reinforcement thereto. When the solenoids are energized in a manner described hereinbelow, the actuating rods 244 and attached retractor member 241 are moved away from the drive drum in a direction radially therefrom. The plate 243 (FIGURE 14) thereupon engages the shoulder 261 formed on the sensing pins between the pin body portions 211 and 212 to thereby withdraw the sensing pins from the program belt. When the solenoids are deenergized, the springs 251 return the pin retractor mechanism to the illustrated position wherein the sensing pins are in operative relation with the program belt. It will here be mentioned that two switches 262 and 262a (only one of which is seen in FIGURE 14) are mounted on the inside of the cover plate 224 which switches include fixed and movable contacts 263 and 264, respectively. The movable contact 264 is adapted for actuation by the retracting member 241 whereby the normally open switch contacts are closed when the retracting member is moved to a retracted position. The second switch 262a (not shown in FIGURE 14) similarly includes a pair of normally open contacts which are closed when the retractor plate is retracted. The switches 262 and 262a are included in the control circuits described below.

Figure 15:
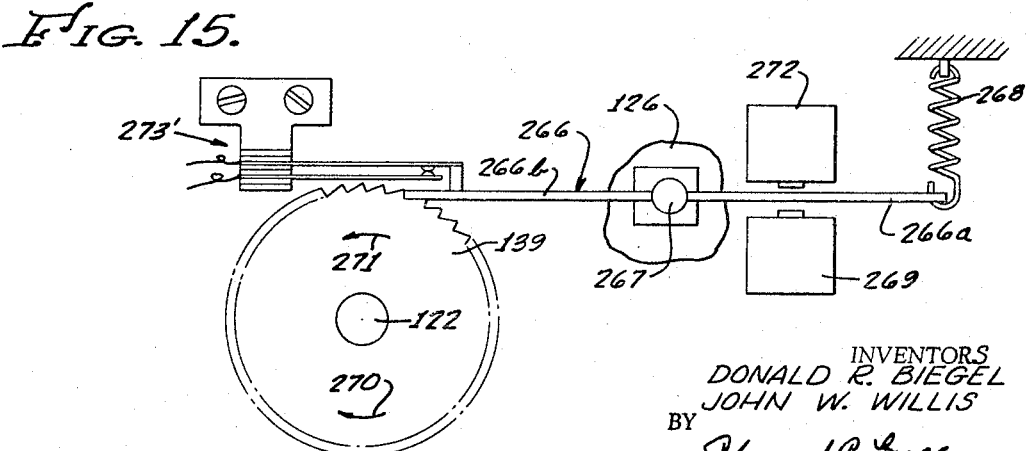
FIGURE 15 is an enlarged fragmentary cross sectional view taken on line 15—15 of FIGURE 11.

As mentioned above, the drive drums 118 for the program belts are provided with a latching or locking mechanism which in the latching condition prevents rotation thereof. The latching mechanism for the auxiliary or secondary drive drum 118′ is illustrated in FIGURE 15 of the drawings to which reference is made. It will here be understood that a similar latching mechanism is employed on the main drive drum 118; the only difference being that the arrangement for the main drive drum does not include a reverse delete magnet or solenoid described below. This difference will become readily apparent in the following description. The latching mechanism includes the ratchet wheel 139 attached to the shaft 122 upon which the belt drive drum is supported. A pawl 266 is fixed intermediate its ends to a pivot 267 carried on the base plate 126. A tension spring 268 at one end of the section 266a of the pawl resiliently biases the other end 266b into engagement with the ratchet wheel 139 to positively prevent forward rotation thereof in the direction of the arrow 270. A main pawl operating electromagnet or solenoid 269 is located at the other side of the pawl portion 266a opposite the spring 268. Energization of the solenoid 269 pivots the pawl clockwise about post 267 as viewed in FIGURE 15, against the action of the spring 268 to release the pawl from the ratchet wheel 139 thereby permitting drive actuation of the drum in either rotary direction. The latching mechanism for the auxiliary or secondary drive drum 118′ (but not the main drive drum 118) is also provided with a reverse delete magnet or solenoid 272 on the same side of the pawl section 266a as the spring 268. When the solenoid 272 is energized the magnetic attraction thereof on the pawl, together with the spring bias action of the spring 268 prevents unlatching of the pawl from the ratchet wheel when the main pawl operating solenoid 269 is energized. That is, the pawl 266 remains in latching condition with the ratchet 139 when the main solenoid 269 is energized if the reverse delete solenoid 272 is also energized. In the operation of the device, the reverse delete solenoid 272 is energized to prevent reverse rotation of the auxiliary drive drum in the direction of the arrow 271 and, in fact, the auxiliary drive drum is never driven in a reverse direction.

A switch 273′ having normally closed contacts is located adjacent the pawl 266, which switch is opened when the pawl 266 is disengaged from the ratchet 139. The switch 273′ is actuated by the pawl 266 for the auxiliary drive drum and is included in a drive circuit for the auxiliary program drive drum for stepping the auxiliary program belt 121′ one column. A similar switch 273 having normally open contacts is included on the main sensing head. The function of the switches will become apparent in the description of the electrical circuit hereinbelow.

Figure 24:
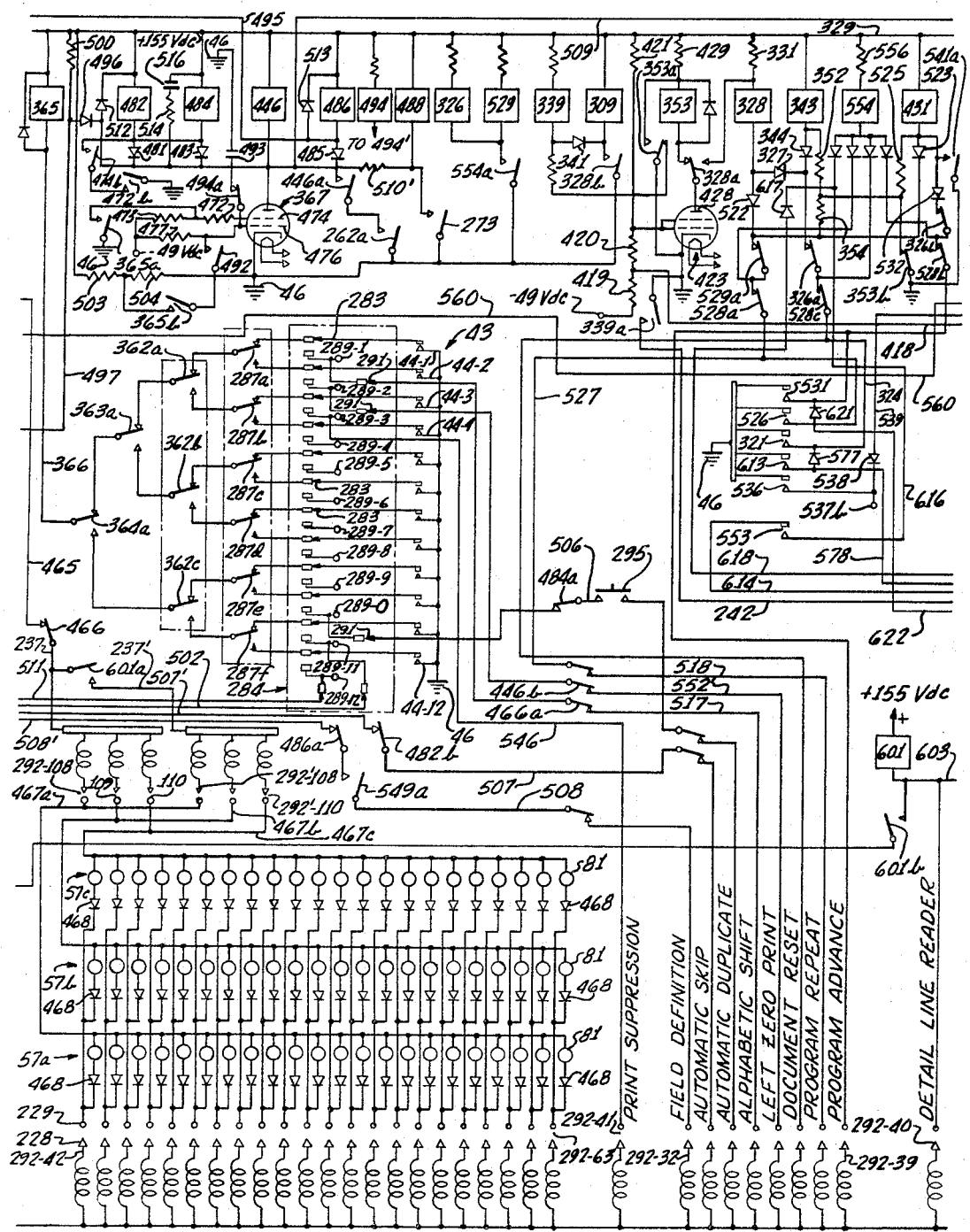

As mentioned above, the apparatus of this invention also includes an auxiliary control box 49 which includes a plurality of control switches for control of the apparatus. Reference is now made to FIGURES 22 through 26 wherein the schematic circuit diagram of the apparatus is shown. As mentioned above, there are twelve star wheel controlled switches 43 under control of the star wheel sensing mechanism 38 which operate in conjunction with the program card 37 on the drum 31 of the key punch machine. As seen in FIGURE 24, all of the fixed contacts 44 of the switches 43 are connected together and to the ground terminal 46. The movable contacts 45 are connected to twelve movable contacts 283 of a two position switch 284 included in the auxiliary box 49, which switch is movable between IBM and D.F. positions as shown in FIGURE 9. In the IBM position the key punch machine is adapted for operation without the apparatus of this invention, and in the D.F. position the apparatus of this invention is connected to the key punch machine for operation in conjunction therewith. In the illustrated D.F. position of the switch the twelve movable contacts 283 engage fixed contacts which are connected to fixed contacts of a relay 287. In the other switch position the twelve movable contacts 283 engage fixed contacts which are connected through terminals 289–1 through 289–12 and lead wires (not shown) to circuits in the key punch machine which ordinarily connect to the star wheel controlled switches 43. The switch 284 includes five other movable switch contacts designated 291 which in the illustrated D.F. switch position connect through fixed contacts to the terminals 289–1, 289–2, 289–0, 289–11 and 289–12 which, as mentioned above, are connected to circuits in the key punch machine. The movable contacts 291 are removed from contacts when the switch is moved to the IBM position. In brief, in the illustrated D.F. position of the switch 284 the apparatus of the present invention is connected to the key punch machine for use therewith, and in the IBM switch position (not illustrated) the apparatus of the invention is disconnected from the key punch machine and the machine is adapted for use in the normal manner without the apparatus of this invention.

In FIGURES 22 through 26 the switches comprising the fixed contacts 229 and movable contacts 228 which are under control of the sensing pins associated with the main program belt 121 are designated generally by the reference numeral 292. Forty-four of the switch contacts designated 292–64 through 292–107 of the switches 292 (see FIGURE 22) are connected to the commutator contacts C–1 through C–44 also shown in FIGURES 17 and 18. (In addition, the commutator contacts C–1 through C–44 are also connected to forty-four of the switch contacts designated 292′–64 through 292′–107 included in the auxiliary sensing head 119′ which contacts are under control of sensing pins which cooperate with the auxiliary program belt 121′.) Twenty-two of the switch contacts designated 292–42 through 292–63 (see FIGURE 24) are connected with lamps 81 of light bars 57a, 57b and 57c (which are also shown in FIGURES 4, 6 and 7). These lamps are referred to hereinafter as the "form lamps" and as "form lamp No. 1" (the first such lamp in a bar), "form lamp No. 2" (the second lamp in a bar), etc. Twelve switch contacts 202–15 through 292–26 of switch 292 (see FIGURE 26) are shown connected to column count lamps 293 which are also shown in FIGURES 1 and 8. These, column count lamps are referred to hereinafter as "column count lamp No. 1" (the first lamp in the first row in FIGURE 8), "column count lamp No. 2" (the second lamp), etc. Five of the switch contacts designated 292–27 through 292–31 are shown connected in FIGURE 26 with operator instruction lamps 294 which are also shown in FIGURES 1 and 8. The operator instruction lamps are referred to hereinafter as "operator instruction lamp No. 1," "operator instruction lamp No. 2," etc. Three of the switch contacts designated 292–108 through 292–110 (see FIG- URE 24) are associated with the individual light bars 57a, 57b and 57c for activation of the desired light bar. (In addition, the individual light bars 57a, 57b and 57c are connected to three switch contacts designated 292'–108 through 292'–110 included in the auxiliary sensing head 119' which contacts are under control of sensing pins 189 in cooperation with the auxiliary program belt 121. Six contacts of the switch 292 are connected to circuits in the key punch machine which circuits are normally under control of the star wheel control switches 43 when the key punch machine is operated without the apparatus of this invention, but are under control of the program belt when the apparatus of the invention is employed. As seen in FIGURE 24, these six switch contacts include: contacts 292–32 which control field definition; contacts 292–33 which control automatic skip; contacts 292–34 which control automatic duplication; contacts 292–35 which control alphabetic shift; contacts 292–36 in the left zero print control circuit; and contacts 292–41 which are in the print suppression circuit. It will here be understood that an "automatic skip" key is included on the keyboard 32 for manual control of the automatic skip function when desired in addition to belt control thereof. The auxiliary control box 51, as seen in FIGURE 9, includes an automatic duplication switch 295 which must be closed when belt control of the automatic duplication function is desired. In the illustrated arrangement as seen in FIGURE 24 the switch 295 is connected through normally closed relay contacts 484a whereby the automatic duplication function is effective only when the relay 484 is deenergized. In addition, both the automatic skip and the automatic duplicate functions are under control of one switch 290 included on the keyboard 32.

Three of the contacts ow switch 292 are in shunt with three of the manually operated push button switches in the auxiliary control box 49 whereby such functions may either be controlled by the switches in the auxiliary control box or may be automatically controlled by the program belt 121. These three switches, as seen in FIGURE 24, include switch contacts 292–37 for control of document reset; contacts 292–38 for the control of the program repeat and contacts 292–39 for program advance. Finally, one contact designated 292–40 (FIGURE 24) is included in the circuit for activation of the detailed line reader circuitry which includes that crcuitry assocated exclusvely with the auxiliary control belt and sensing head 121' and 119', respectively. It will here be recalled that the closure of any pair of switch contacts of the switch 292 is dependent upon the holes punched in the program belts 121 and 121', and therefore, the closure of any pair is independent of the closure of any other pair. As a result extreme versatility of operation of the apparatus is possible. In FIGURE 20 the one hundred and ten channels on the belt 121 for control of the contacts 193–1 through 193–14 and 292–15 through 292–110 are shown and labeled.

In FIGURES 22 through 26 all of the switches and contacts are shown in their normal off or deenergized state. The primary winding 296 (FIGURE 23) of the main power transformer 297 of the apparatus of this invention is connected to a conventional 110 volt A-C source through the following circuitry: the main key punch switch 298, for on-off control of both the key punch machine and said apparatus; a D.F. main line switch 299, located on the auxiliary control panel 51 of the control box 49; interlock switch 301 which are closed when the drawer 117' to the cabinet 117 is closed; and suitable fuses 302. Several other circuits are connected to the 110 volt A-C source through said switches which circuits inclued a full wave bridge rectifier 303 which is connected thereto through lines 304 and 306. In addition, lead wires 307 and 308 from the 110 volt source connect to the movable contacts 309a and 309b (FIGURE 23) of a relay 309 (FIGURE 24) which is included in a reversing circuit for the motor 131. The motor 131 (for drive actuation of the program belts 121 and 121') is a capacitor motor having a starting winding 310 connected to the power leads 307 and 308 through a capacitor 311. The connection of the power leads 307 and 308 through the main motor winding 312 may be reversed upon energization of the relay 309. In the illustrated deenergized condition of the relay 309, the upper end of the main winding 312 as viewed in FIGURE 23 is connected to the lead wire 307 while the lower end is connected to the lead wire 308. When the relay 309 is energized, the connections are reserved to reverse the direction of rotation of the motor 131. Thus, it will be seen that the motor 131 is continuously energized for rotation in one direction or the other depending upon the condition of the motor reversing relay 309. Before the program belts 121 or 121' are driven by the motor 131 however, it will be recalled that the main pawl operating solenoid 269 must be energized to retract the pawl 266 from the ratchet 139 on the drive drum, such mechanism having been described above and shown in FIGURE 15.

Figure 25:
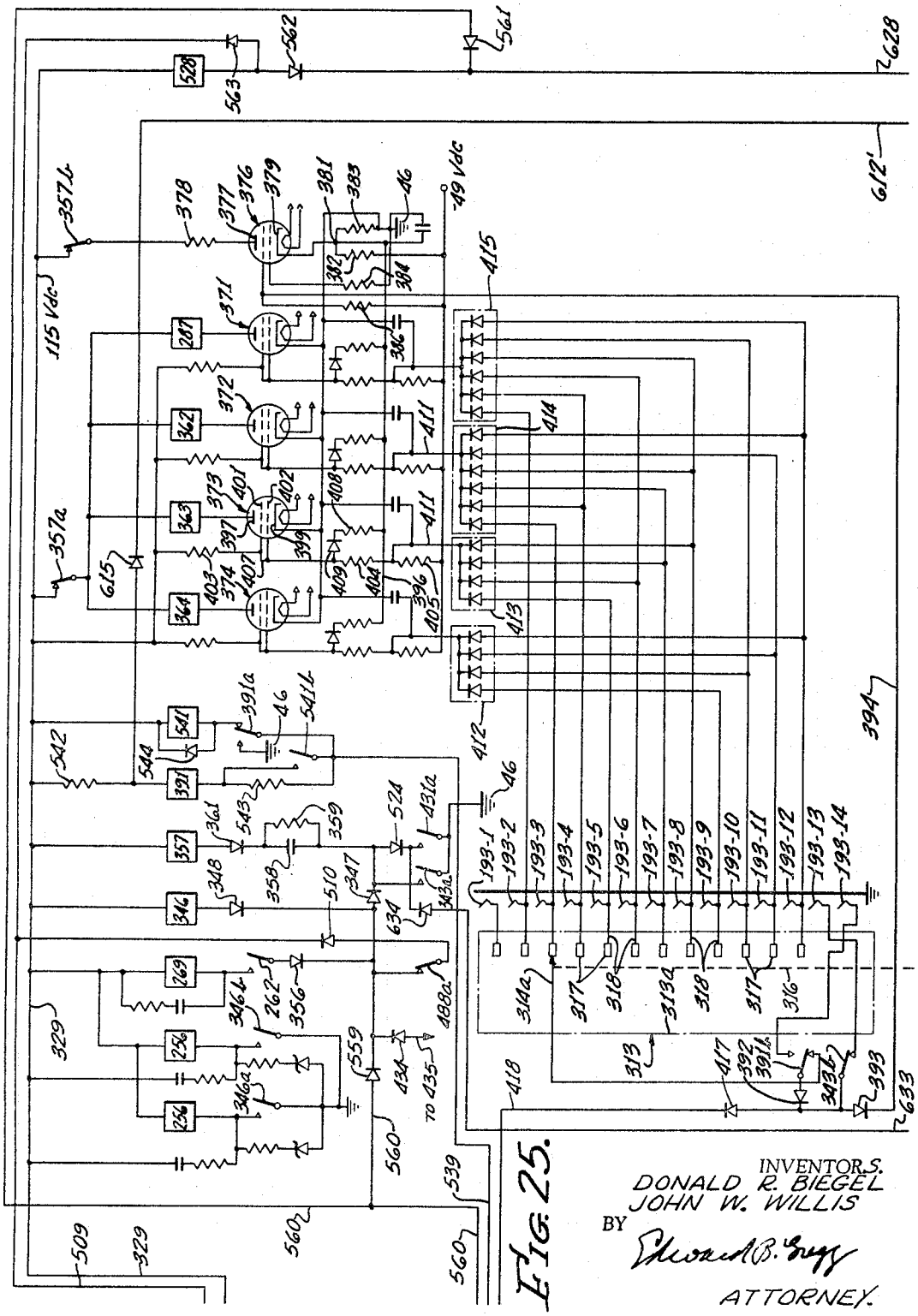
Figure 26:
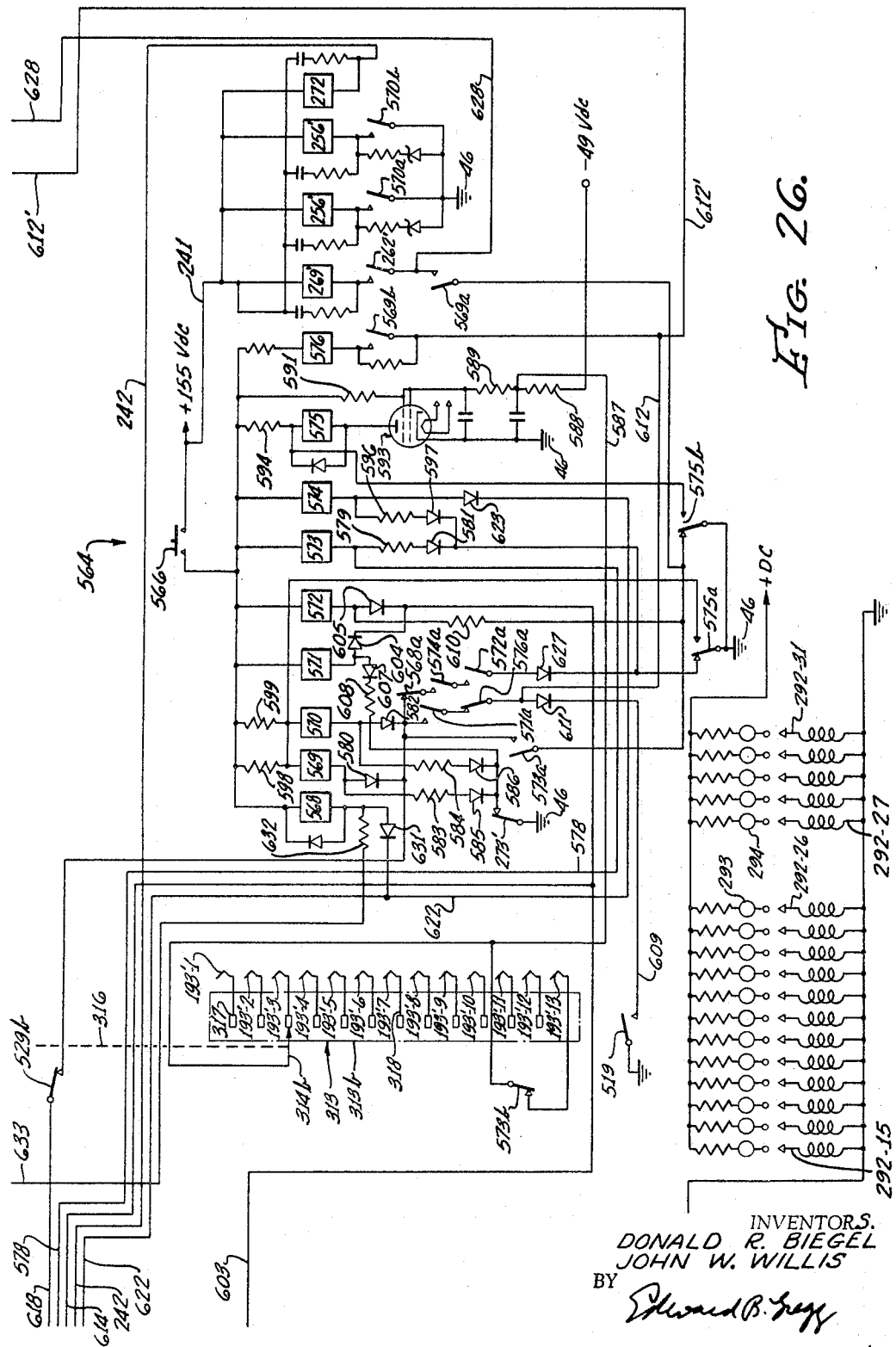

A twelve position, two wafer program selector switch 313 is mounted in the auxiliary control box 49, which switch comprises switch sections 313a and 313b shown in broken line boxes in FIGURES 25 and 26, respectively. The movable arms 314a and 314b of the switch sections are shown interconnected through a mechanical connection 316. The twelve fixed contacts 317 included in each of the switch sections 313a and 313b are connected through lead wires 318 to the upper twelve resilient switch arms 193 and 193' in the main and auxiliary sensing heads 119 and 119', respectively. As noted above in the description of the belt drive drum, the contacts 193 are connected to ground whenever they drop through a hole in the program belt and engage the drum contact 186. The ground connection is thereby carried through the lead wires 318 to the associated fixed contact 317. The switch 313 is set by the operator for initial selection of one of the twelve prime programs on the main program belt 121. The interconnected contact arms 314a and 314b are thereby connected with the desired program select switch contact 193 in the primary and auxiliary sensing head. In FIGURES 25 and 26 the program selector switch 313 is shown set to No. 3 program.

Assume the switch 284 is set to D.F. position for connection of the apparatus of this invention to the star wheel actuated switches 43 of the key punch machine. Assume also the switches 298, 299 and 301 are closed for energization of both the key punch machine and the apparatus of this invention. Assume also that an appropriately punched program card has been placed on the program drum 31, and that appropriately punched program belts 121 and 121' have been placed in the sensing heads for the drive rolls 118 and 118'. The program selector switch 313 as mentioned above is shown set at program No. 3. The operator will, in accordance with custom, depress the release button of the key punch machine to release a card to the punching station and will depresse the feed button of the key punch machine to activate the feeding cycle. These operations are well known and require no further description except to mention that the program drum 31 is driven to a start position for proper initial location of the punched card 37 thereon. Assuming the program belts 121 and 121' have been placed on the drive drums 118 and 118' in a random position, the next step is to rotate the main program belt 121 to position the same at the start of prime program No. 3 for subsequent in-step operation with the program card 37 on the program drum 31. This is accomplished by the operator pressing the document reset switch 321 (FIGURE 24) in the auxiliary control box 49. The one document reset contact is connected directly to ground 46 while the other switch contact is connected through a lead wire 324, normally closed relay contacts 528c and 326a, and through a blocking diode 327 to one end of the control winding of a relay 328. The other end of the relay winding connects to a positive 155 volt D.C. line designated 329 through a load resistor 331. Energization of relay 328 closes normally open relay contacts 328b thereby completing the circuit to relay 309 for the energization thereof; relay 309 being connected directly between the +155 volt D.C. line 329 and a ground 46 through the closed relay contacts 328b. As described above, relay contacts 309a and 309b for relay 309 are included in the reversing circuit for the program belt drive motor 131 for reverse rotation of the motor when the relay 309 is energized (see FIGURE 23). It will be recalled, however, that before the drive motor 131 can drive the punched program belt the drive drum for the said belt must first be released by energization of the main pawl operating solenoid 269.

It will here be noted that the positive 155 volt D-C supply is obtained by means of the full wave rectifier 303 (FIGURE 23) described above. The negative output terminal 332 of the rectifier is connected to ground 46 through a low resistance filter resistor 333, interlock switch 334 and the fuse 336, while the positive terminal 337 thereof is connected through a fuse 338 and another section of the interlock switch 334 to the line 329. The interlock switches 334 are included in the program assembly and are closed when the sensing heads are closed, and open when the sensing heads are open for replacement of the program belts thereon.

Not only are the relay contacts 328b included in the energization circuit for the reversing relay 309 for reverse control of the reader drive motor 131, but they are also in the energization circuit for a reverse delete control relay 339 through a blocking diode 341, whereby the relays 309 and 339 are substantially simultaneously energized upon closure of the relay contacts 328b. Upon energization of the reverse delete control relay 339, the normally open relay contacts 339a (FIGURE 24) are closed thereby completing the energization circuit for the reverse delete magnet or solenoid 272 (FIGURE 26) included in the latching arrangement for the auxiliary program belt. One terminal of the reverse delete magnet 272 is connected directly to the positive 155 volt D-C source through a lead wire 241 while the other terminal thereof is connected to ground 46 through a lead wire 242 and the now closed relay contacts 339a. As described above, energization of the reverse delete magnet 272 prevents reverse drive rotation of the auxiliary drum and auxiliary punched program belt (such reverse delete magnet being energized whenever the reversing relay 309 is energized for reverse energization of the reader drive motor 131). Thus, it will be understood that reverse rotation of the auxiliary program drive drum and program belt is prevented, and that only forward rotation thereof is permitted.

The lead wire 324 from the document reset switch 321 (FIGURE 24) also connects to one terminal of a relay 343 through the normally closed relay contacts 528c and 326a and a blocking diode 344 for connection of such terminal to ground. The other relay terminal is connected directly to the positive 155 volt D.C. source whereby the relay 343 is energized substantially simultaneously with relay 328. Upon energization of relay 343, the normally open relay contacts 343a (FIGURE 25) are closed thereby providing a ground connection to one terminal of a relay 346 through the now closed contacts and blocking diodes 347 and 348. The other terminal of the relay 346 is connected directly to the positive 155 volt D.C. source whereby the relay is energized upon closure of relay contacts 343a. The relay 346 has normally open contacts 346a and 346b included in the energization circuits for the retract magnets or solenoids 256. It will be recalled that there are four retracting magnets or solenoids 256, each block 256 in the diagram of FIGURE 25 representing two such solenoids or magnets in shunt connection. One terminals of the retractor magnets 256 is connected through the now closed relay contacts 246a and 246b to ground 46 while the other terminal of each of the retractor magnets is connected directly to the positive 155 volt D.C. source. As described above with particular reference to FIGURE 14, when the retractor magnets 256 are energized, the retractor plate 241 is actuated to withdraw the sensing pins 189 from the main program belt. (It will be noted that the retracting magnets 256' for the auxiliary extended or detail line reader, designated 564, shown in FIGURE 26 are under separate control and their operation is described hereinbelow in the description of the auxiliary control head.)

It will here be noted that the relays 328 and 343 (FIGURE 24) are each provided with a holding circuit which includes a connection to ground. The holding circuit for the relay 343 includes a resistor 352 and normally closed contacts 353b, whereas the holding circuit, for the relay 328 includes the diode 522, resistor 354 and the said normally closed contacts 353b. In the deenergized condition of the relays 343 and 328 the resistors 352 and 354 which are connected to ground 46 through the normally closed contacts 353b are of a sufficiently large value to limit the current flow through the said relay coils 343 and 328, respectively, to a sufficiently small values such that the relays remain unenergized. That is, the relays cannot be initially energized through the holding resistors. Once relay 328 and/or 343 is energized, however (as by closure of the document reset switch 321, for example) it will remain energized by the current flow through the resistor 354 and/or 352 when the document reset switch 321 is opened. They are deenergized when the holding circuit relay contacts 353b are opened upon energization of the relay 353.

When the retracting plate 241 is retracted upon energization of the magnets 256 the switches 262 and 262a described above with reference to FIGURE 14, are closed. The switch 262 (FIGURE 25) is shown included in the energization circuit for the main pawl operating solenoid 269 (shown in FIGURE 15 and described above). Thus, when the retracting plate has been fully retracted to remove the sensing pins 189 from the program belt, the switch contacts 262 are closed to complete the ground circuit for the main pawl operating solenoid 269 through the now closed contacts, a blocking diode 356, the blocking diode 347 and closed relay contacts 343a. The other terminal of the main pawl operating solenoid 269 is connected directly to the positive 155 volt D.C. source. When the main pawl operating solenoid 269 is energized the latching pawl 266 (FIGURE 15) is moved away from the ratchet wheel 139 thereby permitting rotation of the drive drum for the main drive belt 121. Since the reversing circuit relay 309 is also energized as above described, the main program belt is driven in a reverse direction.

Closure of the relay contacts 343a of relay 343 produces a momentary energization of a relay 357 which is shown connected to the contacts 343a through a shunt connected capacitor 358 and resistor 359 and series blocking diode 361. The other terminal of the relay is directly connected to the positive 155 volt D.C. source. When the relay contacts 343a initially close, a pulse of current flows through the relay winding 357 thereby energizing the relay for approximately ten to twelve milliseconds after which time the relay again deenergizes since the resistor 359 is sufficiently large to prevent a sustained energization of the relay. When the relay 357 is momentarily energized the relay contacts 357a and 357b momentarily open to open the positive D.C. supply source to thyratron circuits described hereinbelow to extinguish any of the thyratons which may have been conducting at the time the contacts opened.

With the program belt 121 being rotated (in a reverse direction) the switch arms 193 enter and leave the holes punched into the belt at channels 1 through 14 as the belt continues to rotate. The contacts or switch arms 193 are therefore momentarily grounded as they contact the grounded drum section 186 of the drive drum as the said drive drum is rotated. Such contacts for the main drive drum are shown schematically in FIGURE 25, and the movable arm 314a is shown set for connection to the third program select contact 193 on the main sensing head. The setting of the program select switch 313 (FIGURE 25) of any of the twelve program positions determines which of the twelve star wheel switches 43 (FIGURE 24) is connected to the circuit of the apparatus for end of field control. The connection of the star wheel controlled switches 43 through the two-position switch 284 to fixed contacts of relay 287 was described above. As seen in FIGURE 24 the contacts of the relay 287 are included in a tree circuit which includes also the contacts of relays 362, 363 and 364. A conductor 366 connects the movable contact of the relay 364 to the control winding of a relay 365. The other end of the relay winding is connected to the +155 volt D.C. source. The relay 365 has normally open relay contacts 365b and 365a in the control and condition circuits, respectively, of a thyratron 367. Whenever the selected star wheel controlled switch 43 is closed, the ground connection is carried through such closed switch, the switch 284, contacts of relays 287, 362, 363 and 364 and the lead wire 366 to the relay 365 to energize the same and close the contacts 365a and 365b. A ground connection is carried through the closed contacts 365a to the thyratron 367 placing the same in conditions to receive a control pulse to fire it. The thyratron 367 is included in a step control circuit for step control of the punched program belt 121 in a manner described below.

The relays 287, 362, 363 and 364 (see FIGURE 25) are included in the anode circuits of four thyratrons 371, 372, 373 and 374, respectively. Another thyratron 376, when fired, provides a "condition" signal to the thyratrons 287, 362, 363 and 364 by removal of a negative cut-off bias therefrom to place the same in condition to receive "control" pulses from the twelve prime program contacts 193-1 through 193-12 which ride the program belt 121. Considering first the circuit for the thyratron 376, it will be noted that the anode 377 thereof is connected through load resistor 378 and relay contacts 357b to the +155 volt D.C. line. The cathode 379 is connected to the junction, designated 381, between a pair of series voltage dividing resistors 382 and 383 which are connected between a —49 volt D.C. supply source (included in the key punch machine) and the ground terminal 46. The resistors 382 and 383 are of approximately equal value whereby the voltage at the junction 381 is approximately —24 volts when the thyratron 376 is cut-off.

The control grid of the thyratron 376 is connected to ground through a resistor 384, and the suppressor grid is connected to the —49 volt D.C. supply through a resistor 386 to normally keep the thyratron in a cut-off condition. The movable switch arm 314a of the program selector switch 313a is connected through contacts 391b of relay 391, blocking diodes 392 and 393, and conductor 394 to the suppressor grid of the thyratron. Thus, with the selector switch 313 set at program No. 3, and with the relay 391 in the illustrated unenergized condition, whenever the program select contact 193-3 for program No. 3 drops into a hole punched in the program belt 121, the ground connection made thereby is carried through the program select switch and the above mentioned relay contacts 391b, diodes 392 and 393, and conductor 394 to the suppressor grid of the thyratron 376. With zero potential on the control and suppressor grids and with about —24 volts D.C. on the cathode, the thyratron 376 fires. It will be noted that thyratron 376 fires when the conductor 394 is grounded and continues to conduct until relay 357 is energized to open contacts 357b in the anode circuit thereof. Therefore, subsequent removal of the ground signal from the conductor 394 fails to extinguish the thyratron. When the thyratron 376 fires, the cathode potential (and therefore point 381) goes from —24 volts to about zero volts. This potential is fed through a conductor 396 to the interconnected control and suppressor grids of the thyratrons 371 through 374 and supplies the "condition" signal thereto to place the same in condition to receive control pulses from the program select contacts 193, in a manner described hereinbelow. The presence of a "condition" signal alone at the thyratrons 371 through 374 will not fire the same.

The circuits for each of the thyratrons 371 through 374 are identical such that a description of one applies to each of them. The anodes 397 of these thyratrons are connected through the control windings of the relays 287, 362, 363 and 364 and the relay contacts 357a to the +155 volt D.C. supply. The cathodes 399 of the thyratrons are connected together and to the ground terminal 46. The suppressor and control grids 401 and 402, respectively, for each thyratron are connected together and to voltage divider networks each of which includes series connected resistors 403, 404 and 405 connected between the +155 volt D.C. source and the —49 volt D.C. supply; the junction 407 between the resistor 403 and 404 being directly connected to the interconnected grids of the thyratrons. Also, the conductor 396 from the junction 381 at the cathode 379 of the control thyratron 376 is connected to each of the junctions 407 through series connected resistors 408 and blocking diodes 409 for application of the condition signal to the thyratrons from the control thyratron 376 placing them in condition to accept a control pulse for firing the same.

Control pulses for each of the thyratrons 371 through 374 are supplied through conductors 411 which connect the junction between the resistors 404 and 405 to diode "or" gate circuits 412, 413, 414 and 415, respectively. Each of the diode circuits includes a plurality of diodes having cathode terminals connected together and to the conductors 411. The diode circuit 415 includes six diodes with anodes connected to six of the program select contacts 193-2, 193-4, 193-6, 193-8, 193-10 and 193-12. The diode circuit 414 also includes six diodes with anodes connected to contacts 193-3, 193-4, 193-7, 193-8, 193-11 and 193-12. The diode circuits 413 and 413 each include four diodes, with the anodes of diodes in the circuit 413 connected to contacts 193-5, 193-6, 193-7 and 193-8 while the anodes of the diodes of the circuit 412 are connected to the contacts 193-9, 193-10, 193-11 and 193-12. The first contact 193-1 is not connected to any of the diode circuits. It will be readily apparent to those skilled in this art that the output from the diode circuits 415, 414, 413 and 412 indicate in the usual 1, 2, 4 and 8 binary code form, which of the contacts 193-2 through 193-12 is closed. Closure of the first contact 193-1 is indicated by no input to the diode circuits and hence no output therefrom. Closure of contact 193-2 provides a single input to the "ones" unit 415 of the diode circuit; closure of the contacts 193-3 provides a single input to the "twos" unit 414; closure of the contact 193-5 provides a single input to the "fours" unit and closure of the contact 193-9 provides a single input to the "eights" unit. Inputs from other contacts 193 to combinations of the diode circuits uniquely identify the source of each such input (i.e., closure of the switch contacts 193).

So long as the thyratron 376 is cut-off, the thyratrons 371, 372, 373 and 374 are also cut-off by negative grid bias applied thereto by the connection of the cathode 379 of the thyratron 376 to the grids 401 and 402 of the thyratrons 371, 372, 373 and 374 through the series connected diode 408 and resistor 409 combinations. With no "condition" signal from the thyratron 376 the grids 401 and 402 are maintained at approximately —20 volts D.C. whereby the thyratrons are maintained in a cut-off condition. During this time as the program belt 121 is driven, the closure of the contacts 193 will not result in firing of the thyratrons 371 to 374. When the contacts 193 for the selected program (contacts 193-3 in the illustration) are closed, the ground connection is carried through conductor 394 to fire the thyratron 376 in the manner described above whereupon the potential at the suppressor and control grids 401 and 402 of the thyratrons 371 and 374 goes to about zero volts. The thyratrons 371 to 374 are then in condition to accept control pulses from the diode units 412 through 415. In the illustrated setting of the switch 313 the ground connection from the contacts 193–3 is carried through the diode circuits 414 to the junction between the resistors 404 and 405 in the grid circuit for the thyratron 372. The voltage on the grids of the thyratron 372 thereupon rises to about +8 volts D.C. whereupon the thryratron 372 fires thereby energizing relay 362.

With the relay 362 energized, the conductor 366 (FIGURE 23) may be traced back through relay contacts 364a and 363a in their normal position, relay contacts 362a in the now energized position, relay contacts 287b in the their normal position, and switch 284 to the contacts 44–3 of the third star wheel switch 43. Thus, the third star wheel controlled switch is selected for end of field control of the circuit in a manner described hereinbelow.

In the illustrated setting of the program select switch 313 (FIGURE 25) when the contact arm 193–3 enters a hole in the program belt 121 during reverse drive of the motor 131, the ground connection is carried through the movable arm 314a of the switch, relay contacts 391b, blocking diode 392, a blocking diode 417, and lead wire 418 to the junction between series connected resistors 419 and 420 (FIGURE 24). The resistors are connected in series with a third resistor 421 and the series combination is connected as a voltage divider between the +155 volt D.C. and the −49 volt D.C. supply sources. A thyratron 423 having interconnected suppressor and control grids connected to the junction between the resistors 420 and 421, is controlled by the grounding pulse from the contact 193–3 (FIGURE 25) through the conductor 418. The cathode of the thyratron 423 (FIGURE 24) is connected to ground 46 and the anode 428 is connected to the movable arm of relay contact 328a. In the illustrated deenergized condition of relay 328, the anode 428 connects through the switch contacts 328a, control winding of relay 353 and a load resistor 429 to the +155 volt D.C. supply. In the energized condition of relay 328, the anode 428 is switched to the junction between the resistor 331 and control winding of the relay 328.

With no grounding signal at the conductor 418, the thyratron 423 is cut-off by a bias of approximately −20 volt D.C. When the contact 193–3 enters a hole in the main program belt 121 to ground the line 418, the bias on the thyratron 423 rises to approximately +8 volt D.C. for firing the same. It will be recalled that relay 328 was energized substantially immediately upon closure of the push button document reset switch 321 and maintained in the energized state by a holding circuit described above. When thyratron 428 fires, therefore, and conducts through the resistor 331, the junction between the resistor 331 and control winding of the relay 328 drops to about zero potential whereupon the relay 328 deenergizes. The relay contacts 328b in the control circuit for relay 309 open thereby deenergizing the relay, whereupon the relay contacts 309a and 309b (FIGURE 23) switch back to the illustrated position for forward drive of the motor 131. That is, the motor 131 stops its reverse rotation and begins rotating in the forward direction when the reversing contacts 309a and 309b are returned to their normal illustrated position. It will be understood that normal time delays in the deenergization of the relays 328 and 309, and the inertia of the motor 131 rotating in the reverse direction results in the program belt 121 being driven past the contacts 193–3 (with the selector switch set at the illustrated program No. 3) whereby the contacts 193–3 reopen. The opening of the contacts 193–3 is only momentary since the belt 121 is now being driven in a forward direction and the contacts 193–3 again close. Upon reclosing, the grounding signals are again carried to the thyratron 376 through the lead wire 394, and to the thyratron 372 through the diode circuit 414. If either or both of the thyratrons 376 and 372 failed (for any reason) to fire during reverse drive of the program belt, another pulse is provided during forward drive of the belt to assure such firing.

During forward drive of the program belt 121, the ground pulse resulting from the reclosure of the program selector contact 193–3 is carried back through the conductor 418 to the grids of the thyratron 423 to refire the same. It will here be recalled that thyratron 423 fired upon receipt of the first pulse from the program belt controlled switch 193–3, but was extinguished immediately thereafter by the return movement of the relay contacts 328a to the illustrated position. This time, the relay 328 is in a deenergized condition and the contacts 328a are therefore, in the illustrated position. The relay 353 is thereby energized by the anode current of the thyratron 423 therethrough when the thyratron 423 refires upon forward drive of the program belt. In the energized condition of the relay 353, the relay contacts 353a are switched to connect the junction between the resistor 429 and control winding of the relay 353 to ground whereupon the thyratron 423 is again extinguished and the relay 353 is deenergized. The relay 353 is thereby momentarily energized, and when so energized the relay contacts 353b are momentarily opened to open the holding circuit to relays 328 and 343. (It will here be noted that the contacts 353b are also included in a holding circuit for the relay 431 described hereinbelow, whereby the relay 431, if in an energized condition, also is deenergized when the contacts 353b are momentarily opened.) The opening of the contact 353b removes the holding circuit ground connection from the control windings of the relays 328, 343 and 431 to deenergize those which are energized (which, in the condition of the apparatus immediately prior to the momentary energization of relay 353 was relay 343; the other relays 328 and 341 already being in the deenergized state). The opening of relay contacts 343a opens the energization circuit to the main pawl operating solenoid 269 to deenergize the same, whereupon the pawl 266 engages the ratchet 139 on the main drive drum to stop the forward rotation thereof. The timing of the latching mechanism and pin drive connection between the drive drum and program belt is such that the pawl 266 when released, stops the drive drum at a location where the program select contact 193–3 is again out of engagement with the hole punched in the program belt to thereby remove the ground connection from the movable arm 314a of the switch 313a. The thyratron 423 which was momentarily fired and then extinguished by energization of relay 353 therefore remains in the quenched condition. Opening of the relay contacts 343a (FIGURE 25) which opened the energization circuit for the main latching magnet 269, simultaneously opens the energization circuit for the relay 346, whereupon the relay contacts 346a and 346b reopen to deenergize the pin retracting magnets 256. Since retractor magnets 256 are slower to release than the main pawl operating solenoid 269, the movement of the main program belt is stopped before the retracting magnets are deenergized. With the retractor plate 241 returned to the position shown in FIGURE 14 and described above, the sensing pins 189 on the main sensing head are free to enter holes punched in the main belt for closure of switch contacts 292–15 through 292–110 associated therewith.

It will be readily apparent that the main program belt 121 may be punched for closure of any of the pin controlled contacts 292–15 through 292–110, as desired, and for purposes of explanation a closure of specified contacts will now be assumed. At this point in the operation of the apparatus (wherein the card 37 on the program drum 31 of the key punch machine is set at column No. 1 on the card, the circuit for the third star wheel controlled switch 43-3 is complete to the conductor 366 through the contacts of the relay matrix 287, 362, 363 and 364, and the main program belt is stopped at the first column of holes for the third program for sensing by the pins 189) assume that switch contacts 292-73, 292-44, 292-108 and 292-20 are closed by reason of their associated sensing pins 189 entering holes in the main program belt permitting the closure thereof, and that all the rest of the contacts 292 remain open. Assume further that the carriage 56 is in its topmost position shown in FIGURE 5, wherein each row of the light transmitting slots 78 of the light bars 57a, 57b and 57c will be in registry with line No. 1 of its third of a document D which has been placed in proper position for viewing on the panel 53. See FIGURE 1 for document D. (It will become apparent from the description hereinafter that although it is assumed arbitrarily that the carriage 56 is in its topmost position, such assumption makes no difference, and at the commencement of operation the carriage 56 may be in any position.)

It will be evident from an inspection of FIGURE 22 that reverse commutator brush 107 will be in contact with the first few commutator contacts; that prime brush 101 will be in contact with an adjacent commutator contact; and that A.C.-D.C. brush 102 will also be in contact with two of the commutator contacts. However, none of these brushes in yet in contact with commutator contact C-10, which is connected to ground 46 through the now closed contact 292-73.

The prime brush 101 (FIGURE 22) is shown connected through lead wire 432 and resistor 433 to the junction between a pair of interconnected blocking diodes 436 and 437 (FIGURE 23). The one diode 436 is connected to one terminal of the control winding of a relay 438, the other relay terminal of which is connected to the +155 volt D.C. supply. The other diode 437 is connected to one terminal of the control winding of a relay 457 the other terminal of which is connected to the +155 volt D.C. supply. The A.C.-D.C. brush 102 (FIGURE 22) is connected through lead wire 439 and resistor 440 directly to the relay 438 (FIGURE 23). The reverse commutator brush 107 (FIGURE 22) is connected through lead wire 442 and resistor 443 to one control winding terminal of a relay 444 (FIGURE 23) the other terminal of which is connected to the +155 volt D.C. source. Since none of the brushes 101, 102 and 107 are grounded because none are yet in contact with the commutator contact C-10, it will be seen that the relays 438, 444 and 457 remain deenergized. Therefore, the respective relay contacts 438a, 438b, 444a and 457b are in their normal positions shown in FIGURE 23. The motor 86, which drives the carriage 56 and which is a synchronous A.C. motor, is powered by A.C. current through a network which includes wires from the 110 volt A.C. supply, the relay contacts 444a and 438a a limit switch 448 and lead wire 449 to the one winding 451. The other winding 452 of the motor is connected through a series connected resistor 453 and capacitor 454 to the lead wire 449 to the one winding. The motor 86 thereby rotates continuously and in a predetermined direction, such being defined as the "forward direction" to move the carriage 56 downwardly (or forwardly) as viewed in FIGURE 5. That is, the motor shaft 84 and pulley 87 shown in FIGURE 5 are caused to rotate in a counterclockwise direction as viewed in that figure. When A.C.-D.C. brush 102 (FIGURE 22) comes into contact with the now grounded commutator contact C-10, the ground connection is carried through the lead wire 439 to the relay 438 to energize the same. Energization of the relay 438 causes relay contacts 438a and 438b to shift from the positions shown in FIGURE 23 to their alternate positions, thereby opening the A.C. energization circuit to the motor by reason of actuation of relay contact 438a.

The motor control circuit also includes a pair of relays 456 and 457 (FIGURE 23) connected as a multivibrator. One control winding terminal of each of the relays 456 and 457 is connected to the +155 volt D.C. source while the other terminals are connected to ground 46 through the contacts 457a and 456a, respectively. It will be seen that the contacts 456a and 457a will alternately open and close causing the relays 457 and 456 to alternately energize and deenergize. Relay contacts 457b, which form a part of the motor network, therefore oscillate between the two positions. As seen in FIGURE 23, the motor network includes also secondary windings 458 of the transformer 297, full wave rectifiers 459 and lead wires 461 to opposite fixed contacts of the relay contacts 457b. It will be apparent that under the stated conditions (wherein A.C. circuit to the motor is opened) a signal comprising alternate positive and negative square wave current pulses is supplied to the motor causing it to step incrementally in the forward direction; the pulsing square wave signal being supplied to the main winding 451 through the switch 448 and to the other winding 452 through a phase controlling capacitor 452'. The square wave signal supplied through multivibrator action has a lower frequency than the sixty cycle per second A.C. signal whereby the motor is stepped at a lower speed than when operated with the A.C. signal. This has the desirable effect of slowing down the operation of the motor near the end of its forward travel just before the prime brush 101 reaches the selected commutator contact, in this case contact C-10. This circuit permits rapid travel of the carriage 56 in the forward direction, with slow travel (to avoid overtravel and hunting) near the end of the intended travel. With this arrangement, accurate positioning of large inertial loads without overtravel or hunting is made possible.

The carriage is driven forward until the prime brush 101 makes contact with the grounded commutator contact C-10 thereby establishing a ground circuit for the relays 438 and 457 through the lead wire 432 and blocking diodes 436 and 437 to energize the same. Contact 457b will switch to the position shown in FIGURE 23 and contacts 438a and 438b will hold in the opposite position shown. Under these conditions, it will be apparent that a nonpulsing D.C. current is supplied to the winding 451 of the motor to lock the motor instantly and securely in place. This establishes the light bars 57a, 57b and 57c in registry with line 10 of its third of the document D. The limit switch 448 is located in such a position as to be opened at the extreme forward end of travel of the carriage to prevent overdriving of the mechanism in the event no grounding signal is supplied to the brush 101.

The energization circuits for the form lamps 81 (FIGURE 24) includes a secondary winding 462 of the transformer 297 and full wave rectifier 463 (FIGURE 23). The output from the rectifier 463 is connected through relay contacts 446b, light control rheostat 464, lead wire 465, interlock switch 466 (FIGURE 23) and lead wire 237 to the movable contact terminals of the three sensing pin controlled switches 292-108, 292-109 and 292-110. The fixed contacts terminals of the switches 292-108, 292-109, and 292-110 connect with common leads 467a, 467b and 467c to all of the lamps in the respective light bars 57a, 57b and 57c. The corresponding form lamps in each of the light bars (i.e., the three form lamps No. 1, the three form lamps No. 2, etc.) are connected through individual blocking diodes 468 to the individual sensing pin controlled switches 292-42 through 292-63, respectively. In the above illustration it was assumed that switches 292-44 and 292-108 were closed when the main program belt stopped rotating and the associated sensing pins 189 entered holes in the belt. Therefore, it will be seen that the D.C. energization circuit for form lamp No. 3 of light bar 57a is completed for energization thereof. The operator's attention is thereby directed to a position on the document D identified as column 3, line 10 in the top third of the document by illumination of a form lamp thereat.

It will be recalled that it was further assumed that sensing pin controlled switch 292-20 (FIGURE 25) also closed when the main program belt 121 stopped rotating and the associated sensing pin 189 entered a hole in the belt. This switch is included in the energization circuit of a column count lamp. It will be seen that the column count lamps 293 have a common lead connected to a source of D.C. power. When contacts 292-20 close, the circuit for column count lamp No. 6 is completed for energization thereof. The illumination of this lamp signifies to the operator that there are six digits in the first program field.

Directing her attention to the illuminated portion of the document, the operator enters six digits therefrom in the key punch machine. With each actuation of a key, the pawl 34 (see FIGURE 19) is released by energization of a magnet 471 included in the escapement mechanism of the key punch machine, thereby permitting the ratchet 36 to rotate the distance of one notch or tooth. As mentioned above the program drive drum is connected to the ratchet and is thereby driven with the same stepping motion. Initially, when the release key of the key punch machine was pressed, the program card 32 and the program drum was rotated to a position wherein the star wheels 42 contacted column No. 1 of the typical 80 column program card. Therefore, when the operator enters the first digit by pressing a key on the keyboard, the program card steps one column wherein the star wheel mechanisms 42 engage column No. 2 of the card. It will be recalled that with the program selector switch 313 (FIGURE 25) set at program No. 3, the third star wheel controlled switch 43-3 is connected to the conductor 366 through a relay matrix. Attention is directed to FIGURE 3 wherein the program card is shown punched at column No. 6, row or line No. 3. Therefore, when the operator enters the fifth digit or bit of data in the key punch machine, the No. 3 star wheel falls into this end-of-field hole thereby closing the switch 43-3. The ground connection from the switch 43-3 (as seen in FIGURE 24) is carried through the relay transfer tree (i.e., relay contacts 287b, 362a, 363a and 364a) and lead wire 366 to the relay 365 to energize the same. The relay contacts 365a are closed whereby the ground connection is carried therethrough to the junction between a pair of series connected resistors 472 and 473.

The resistors 472 and 473 are connected between the suppressor grid 474 of the thyratron 367 and a −49 volt D.C. source of supply. The control grid 476 of the thyratron is also connected to the −49 volt D.C. source of supply through a resistor 477. The bias supplied by the −49 volt D.C. source to either grid is sufficient to maintain the thyratron in the cutoff condition. The thyratron cathode is connected to ground and the anode is connected to the +155 volt D.C. source through shunt paths which include: blocking diode 481 and series relay 482; blocking diode 483 and series relay 484; relay 466; diode 512; blocking diode 485 in series with shunt connected relay 486 and diode 513; and series connected resistor 514 and capacitor 516. When the star wheel controlled switch 43-3 closes to energize relay 365, the −49 volt D.C. source is removed from the suppressor grid 474, by closure of relay contacts 365a thereby placing the thyratron in condition to fire upon receipt of a control signal at the control grid 476. The relay contacts 365b in the control grid circuit of the thyratron 367 also close upon energization of the relay 365.

A control signal for the control grid 476 of the thyratron is derived through the series connected relay contacts 365b and switch contacts 492, which contacts are connected between said grid 476 and a +8 volt D.C. source supplied by a voltage divider comprising resistors 503 and 504 connected between the +155 volt D.C. supply and ground. The switch 492 as shown in FIGURE 19 is mounted on a bracket 505 associated with the escapement mechanism for the program drum 31 in the key punch machine. The switch has normally open contacts which are closed whenever the escapement magnet 471 is pulsed to permit the ratchet to rotate the distance of one tooth. When the switch contacts 492 (and relay contacts 365b) are closed, the +8 volt D.C. control signal is supplied to the control grid and if the control signal coincides with a condition signal the thyratron fires.

The timing between the "condition" and "control" signals for the thyratron 367 will now be described. As mentioned above, the solenoid 471 is energized with each actuation of a key on the keyboard 32 to release the pawl 34 and permit the ratchet 36 to rotate the distance of one notch or tooth. The program card 37 on the program drum is thereby driven one step and the switch 492 is momentarily closed by the pawl 34. However, if the selected star wheel controlled switch remains open, neither a "condition" nor a "control" signal is supplied to the thyratron since the contacts 365a and 365b in the suppressor and control grid circuits remain open. If, when the program drum is stepped, the selected star wheel 42 enters a hole punched in the program card 37 (as in column 6, row 3 of FIGURE 3) the associated star wheel controlled switch 43 is closed for energization of relay 365 and closure of relay contacts 365a and 365b. During the step which the star wheel mechanism first enters a hole in the program card, the switch 492 closes and reopens before the selected star wheel controlled switch closes. Therefore, no control signal is supplied to the control grid 476 during this step since the closure of switch contacts 492 does not coincide with the closure of the relay contacts 365a and 365b. The program drum stops with the selected star wheel controlled switch in the closed condition. When the operator enters the next digit, or bit of information, on the keyboard, the switch contacts 492 are again momentarily closed and the program drum is stepped forward one step. The selected star wheel controlled switch remains closed for at least a portion of this step such that closure of the switch contacts 492 occurs while the said selected star wheel controlled switch remains closed. The "condition" signal (provided by closure of relay contacts 365a) coincides with a "control" signal (provided by closure of both the switch contacts 492 and relay contacts 365b) whereupon the thyratron 367 is fired. If column No. 7, row 3 of the program card is not punched, the star wheel controlled mechanism will then open switch 43-3. If, however, there is a punch at column No. 7, row 3 the switch 43-3 remains closed and does not open during travel between adjacent punches and the thyratron is fired on consecutive steps of the escapement. In this case, a six column field would be followed by a field one column in length.

The control signal (which is produced when both the switch 492 and relay contacts 365b are closed) is normally delayed by a capacitor 493 which connects the control grid of the thyratron to ground through normally closed relay contacts 494a of relay 494. With the relay contacts 494a closed, the capacitor 493 is normally charged to the −49 volt D.C. level. When the contacts 492 and 365b are closed, the capacitor 493 must first discharge therethrough before the control grid rises to a level to fire the thyratron. One terminal of the control winding of the relay 494 is connected to the +155 volt D.C. source while the other terminal thereof is connected to the "skip" relay in the IBM key punch machine (through terminal 494' shown in FIGURE 23) and is energized therewith. Whenever the relay contacts 494a are opened by energization of relay 494, the capacitor 493 is removed from the circuit and timing of control pulses is advanced.

When thyratron 367 (FIGURE 24) fires, relays 446, 482, 484 and 486 are all energized. Contacts of relays 484 and 486 and the contact 482b of the relay 482 open upon energization of the relays to prevent the feeding of automatic control signals to the key punch machine when the program belt is being stepped to prevent spurious operation of the machine. Thus, when the above relays are energized, the relay contacts 482b (FIGURE 24) open the conductor 507 to the automatic-skip control switch 292–33; contacts 484a (FIGURE 24) open the conductor 506 from the automatic duplicate switch 295 and contacts 292–34; contacts 484b (FIGURE 23) open the circuit for the manual duplication key in the key punch machine; contacts 486a (FIGURE 24) open the conductor 508 to the field definition switch 292–32; and contacts 486b (FIGURE 23) open the release circuit in the key punch machine. Normally open contacts 482a (FIGURE 23) close to complete the energization circuit of relays 438 and 457. With relays 438 and 457 energized the motor 86 is locked in position. Spurious movement of the carriage during drive actuation of the program belt is thereby prevented. The contacts 482a also connect through a resistor 490 and lead wire 495 (from FIGURE 23 to FIGURE 24) to the relay 486 to form a holding circuit therefor. The ground signal through the closed contacts 482a is also fed through a blocking diode and terminal 435 to the keyboard restore magnets in the card punch machine to lock the keyboard. With the keyboard locked, actuation of the card punch machine by the keys is prevented. As seen in FIGURE 25, the keyboard restore magnets are also connected through terminal 435, blocking diodes 434 and 347, and the relay contacts 343a and 431a to ground whereby the keyboard is also locked when the relays 343 or 431 are energized. Contacts 446b (FIGURE 23) open the circuit to the light bars 57a and 57b and 57c to prevent arcing of form light contacts 292–42 through 292–63. In addition, a blocking diode 496 and conductor 497 connects the grounded side of the energization circuit for relays 446, 482, 484 and 486 to the anode circuit of a control tube 498 (FIGURE 22) included in the automatic skip and field definition circuits of the apparatus to disable the same during stepping of the program belt. The automatic skip and field definition circuits are described in detail hereinbelow.

The thyratron 367 is also included in an energization circuit for the relay 346 (FIGURE 25). When the thyratron 367 fires, the ground connection from the cathode thereof may be traced therethrough and through a conductor 509 (from FIGURE 24 to FIGURE 25) and a blocking diode 510, normally closed relay contacts 488a and the blocking diode 348 to the relay 346 for the energization thereof. It will be seen that a portion of this circuit is in shunt with the contacts 343a through diode 347. The blocking diode 347 prevents energization of the relay 357 and opening of the relay contacts 357a and 357b which are in the energization circuits for the relays 287, 362, 363 and 364 and the thyratron 376. Therefore, no change is made in the relay tree circuit for the star wheel controlled switches 43 when the thyratron 367 fires. Aside from this difference, the firing of the thyratron 367 results in initiating the same sequence of events which result from the closure of contacts 343a, described above. Briefly, when thyratron 367 fires the relay 346 is energized thereby closing its contacts and completing the circuit for the retractor magnets 256 to withdraw the sensing pins 189 from the main program belt 121. Switches 262 and 262a are closed upon retraction of the retractor plate 241, and the main pawl operating solenoid 269 is energized through the closed contacts 262 and a relay holding circuit is completed through the closed contacts 262a.

As seen in FIGURE 24, relay contacts 446a and retractor plate actuated contacts 262a are connected in series and are included in a holding circuit for the relays 446, 482, 484 and 486 such that when these contacts are closed, the relays are connected to ground therethrough to hold the relays in the energized condition. Simultaneously, when both of the contacts 446a and 262a are closed, the anode of the thyratron 367 is connected to ground to extinguish the same. As described above contacts 446a are closed when the thyratron 367 fires and energizes the relay 446, and switch contacts 262a are closed upon retraction of the retracting plate 241.

When the pawl 266 is moved to its unlatched position upon energization of the main pawl operating relay 269 (see also FIGURE 15) the following occurs: (1) the main drive drum 118 is driven in a forward direction by the motor 131 and (2) the normally open contacts of the switch 273 are closed to complete the energization circuit for the relay 488 (FIGURE 24). A holding circuit for the relay 488 is provided through a resistor 510' and the series relay contacts 446a and switch contacts 262a whereby the relay 488 will remain energized after the contacts 273 reopen.

When relay 488 energizes, the relay contacts 488a (FIGURE 25) are opened to open the energization circuit for the relay 346 and main pawl operating solenoid 269. The main pawl operating solenoid 269 is thereupon deenergized and the pawl 266 (FIGURE 15) engages the ratchet wheel 139 to stop the rotation thereof and the attached main drive drum. The energization of the main pawl operating solenoid (by closure of the contacts 262 following the firing of the thyratron 367) and the deenergization thereof (by opening of the relay contacts 488a) occur in a very short time interval whereby the ratchet 139 is permitted to move forward one step. The main program belt 121 is thereby likewise moved one step for alignment of the sensing pins 189 with the second column of holes at program No. 3 on the belt.

When relay 346 deenergizes the energization circuit for the retractor magnets 256 is opened by opening of the relay contacts 346a and 346b. The retractor plate 241 is returned to normal position and the retractor plate actuated switch contacts 262 and 262a reopen. Opening of the contacts 262 has no effect upon the operation since the energization circuit for the main pawl operating solenoid was opened by opening of the relay contacts 488a. Opening of the switch contacts 262a opens the holding circuit for the relays 446, 482, 484, 486 and 488 whereupon the relays deenergize. The diodes 512 and 513, and the series arc suppressing resistor 514 and capacitor 516, all in shunt with the relays, conduct momentarily when the energization circuit to the relays is opened and the magnetic flux field of the relays collapses, thereby delaying the deenergization thereof. The momentary delay helps prevent premature application of voltage to the reader sensing pin controlled switches 292. Thus, the sensing pin controlled contacts 292 will be made before the above mentioned relays deenergize placing the circuit in operative condition. Therefore, arcing of the contacts 292 upon closure thereof is prevented.

With the main program belt 121 stepped one column, the pins 189 which enter holes punched in the belt at the second column will permit closure of the associated contacts 292. Again, holes may be punched in the belt for closure of any of the contacts 292–15 through 292–110, as desired. Assume therefore that switch contacts 292–83, 292–51, 292–35, 292–26, 292–27 and 292–109 are closed by reason of their associated sensing pins 189 entering holes in the main program belt and that the remainder of the switches are open. The control circuit for the motor is energized in the same manner described above to move the carriage 56 to a position wherein the prime brush contact 101 engages the commutator contact C–20 connected to the now closed contacts 292–83. In this position the light bar 57b registers with the line 20 of the middle third of the document D.

It will also be seen that closure of contacts 292–109 (FIGURE 24) completes the circuit from the full wave rectifier 463 (FIGURE 23) to the lead wire 467b connected to all the lamps in light bar 57b. Form lamp No. 10 of light bar 57b is connected to ground through a blocking diode and the now closed contacts 292–51 for energization thereof. The operator's attention is thereby directed to column 10, line 20 in the middle third of the document by the illumination of a form lamp thereat. It will be understood that where the information on the document extends for a length greater than the length of a slit in the shield of a form lamp, a plurality of form lamps may be illuminated by closure of a plurality of contacts 292 connected to adjacent lamps by including appropriate punches in the main program belt.

From the previous discussion it will be apparent that column count lamp No. 30 (FIGURE 26) will be energized inasmuch as contacts 292–26 are closed to supply the ground connection thereto indicating to the operator that 30 bits of information must be entered on the key punch machine to complete the field.

In addition, an operator instruction lamp No. 1, (FIGURE 26) is energized through closure of contacts 292–27, signifying to the opertor that the information is in alpha form. Further, the key punch machine is automatically shifted to alphabetic operation by closure of the alphabetic shift contacts 292–35 (FIGURE 24). As mentioned above the contacts 292–35 are connected to the alphabetic shift circuit of the key punch machine through a lead wire 517, interlock switch 466a, one of the contacts 291 of the switch 284 and the terminal 298–1. When a program card is in the machine and the star wheel sensing mechanism lowered to contact the card, the machine is normally in numeric shift. To punch a letter the keyboard must be shifted for alphabetic punching. This may be done manually by pressing an "alpha" key on the keyboard or automatically by completing the ground circuit to terminal 289–1 which terminal is connected to the alphabetic shift circuit of the key punch machine to shift the machine into alpha operation. Therefore, when this field is indicated, the operator may proceed to punch the alpha information contained on the document into the card without first actuating the alphabetic shift button on the key punch machine since the shift is automatically made when the contact 292–35 closes.

When the 30 bits of information have been entered in the key punch machine, the end of field "condition" signal (provided by the star wheel No. 3 falling into a hole in the punched program card for energization of the relay 365 and closure of relay contact 365a) will coincide with a "control" pulse (provided by closure of the switch 492 and relay contacts 365b) and the program belt will be advanced one step to column No. 3 of program No. 3 in the manner described above. When the belt stops and the sensing pins are released the closure of switches 292 will again depend upon the location of punches in the main program belt and, for purposes of explanation it will be assumed that contacts 292–75, 292–49, 292–21 and 292–110 are closed.

Contacts 292–75 in the motor control circuit are connected to commutator contact C–12 which is above the commutator contact C–20 (the contact which the prime brush 101 engaged during entry of information from field. No. 2). The motor 86 must therefore be operated in reverse to a position wherein the prime brush 101 contacts the commutator contact C–12. When the contacts 272–75 are first closed, one of the elements of the reverse brush 107 is in contact with the commutator contact C–12. A circuit is therefore established through lead wire 442 to reverse relay 444 thereby energizing the same. Upon energization, relay contacts 444a move from the normal position shown in FIGURE 23 to the alternate position. Power is supplied to the motor windings 451 and 452 of the motor 86 from the A.C. source through the contacts 444a and contacts 438b to cause the motor to operate in reverse. Such operation will, of course, cause the carriage 56 to move upwardly and it will continue to move until the last element of the reverse brush 107 has lost contact with the grounded commutator contact C–12. During the brief interval of time after the reverse brush 107 loses contact with the commutator contact No. 12 and the prime brush 101 establishes contact therewith, relay 444 is deenergized and the contacts 444a resume their normal position shown in FIGURE 23. The connection of the A.C. current to the motor windings 451 and 452 is now reversed and acts as a brake to bring the motor quickly to a halt. The momentum of the motor is sufficient to carry the prime brush 101 into contact with the commutator contact No. 12. At this instant the motor 86 is locked in position in the manner described above.

Closure of contacts 292–110 (as assumed above) completes the circuit from the full wave rectifier 463 to the lead 467c connected to the form lamps in light bar 57c. Form lamp No. 8 of the light bar 57c is connected to ground through a blocking diode and the now closed contacts 292–49 for energization thereof, and the operators attention is therefore directed to column 8, line 12 in the lower third of the document by the illumination of the form lamp No. 8 thereat. Also column count lamp No. 7 is illuminated upon closure of contacts 292–21 to indicate that the third field is seven digits long.

Programming for any number of fields, as required, may be included on the program belt for each of the twelve programs provided by the star wheel controlled switches. For each field the desired portion of the document may be illuminated and the appropriate column count lamp energized. Other instruction for the operator may be provided by illumination of the appropriate operator instruction lamp such as the alpha indicator lamp as described above.

When the IBM punch card has been completed by punching (or skipping where desired) all 80 columns of the card, a cam embodied in the key punch machine functions at the end of the card to automatically reset the key punch machine (i.e., turn the program drum 31 to column No. 1 on the program card 37), ejeet the completed card, transfer the same to the reading position, bring down another card from the hopper into proper position at the punching station, and perform other operations. Depending upon the setting of certain switches and programming contained on the belts, the apparatus will proceed to the next program (i.e., program No. 4 in the above illustration) or will return to program No. 3 to repeat the same.

After punching a card using program No. 3, assume it is desired to shift to the next program on the belt (i.e., program No. 4) for any desired purpose. The apparatus may be shifted from the program No. 3 to program No. 4 by turning the program select switch 313 to the new program and then depressing document reset switch 321. The main program belt would then drive first in reverse and then forward to set up the program No. 4 in the same manner described above with reference to the setting up of program No. 3, except this time program select contact 193–4 would function in setting up the No. 4 program.

As an alternative method of shifting to program No. 4, the operator may, after selecting the program No. 4 by the switch 313, press the program advance switch 531 (FIGURE 24) in the auxiliary control box 49. Relay 431 is thereby energized through contacts 528b, 326b and blocking diode 532. When relay 431 energizes, relay contacts 431a (FIGURE 25) close to complete circuits to the relays 357 and 346. The sequence of events which occur upon closure of relays 357 and 346 have been described above. Briefly, when relays 357 and 346 are energized the retractor magnets 256 are energized and the sensing pins 189 withdrawn from the main program belt. The main latching solenoid 269 is energized to release the main belt drive drum for rotation thereof in the forward direction by motor 131. When the program select contact 193–4 for the next prime program (i.e., program No. 4) falls in a hole in the belt the thyratrons 371 and 372 (which had been quenched upon the momentary energization of relay 357) are fired to set up the relay matrix for No. 4 star wheel actuated switch 43, and the main program belt is stopped at the beginning of the fourth program, that is, at column No. 1 of program No. 4 on the program belt. The pin retracting plate is released and those sensing pins engaging holes in the program belt permit closure of the associated contacts 292. The carriage 56 is positioned and form lights illuminated as provided by the holes punched in column No. 1 of the fourth program. If the key punch machine is not set at the start position, the release key is pressed to properly position the machine whereby both the apparatus and the key punch machine are in position for operation. This time the end of field control is provided by star wheel mechanism 43-4 and the location of holes in the main program belt for program No. 4 will determine the programming for the apparatus. The operation of the apparatus is therefore the same as described above with reference to program No. 3, but this time the program No. 4 controls the operation. It will be noted that the apparatus was advanced to the next prime program by first turning the program selector switch 313 from program No. 3 to program No. 4. However, since the program advance switch 531 was depressed, and not the document reset switch 321, the belt was advanced directly to program No. 4 without first being driven in a reverse direction.

The program advance switch 531 (FIGURE 24) is in shunt with the program advance switch 292-39 which is under control of the associated sensing pin 189 for channel 39 whereby a program advance function may be programmed on the main program belt, if desired. If it is desired to automatically advance the program belt to another program (as for example, from program No. 3 to program No. 4) through the use of the belt controlled contacts 292-39, an end of field signal would be programmed on the program card 37 at the end of the last field of program No. 3 in order to step the program belt forward one step. At this additional step of the belt, a hole would be punched in channel 39 to permit closure of contacts 292-39. With these contacts closed, relay 431 is energized and the belt is then driven forward. In order to stop at program No. 4, it is necessary to include a punch in the main program belt at channel 13 in the same column as the punch for channel 4. When contacts 193-4 and 193-13 enter the punches in channels 4 and 13, respectively, during forward drive of the belt, grounding of contacts 193-4 provide control signals to the thyratrons 371 to 374 through the diode matrix. Simultaneous grounding of the contacts 193-13 provides a condition signal to the thyratrons 371 to 374 whereupon the relay matrix of relays 287, 362, 363 and 364 is set up for selection of star wheel controlled switch No. 4. Simultaneously, the grounding signal from contacts 193-13 is carried through relay contacts 343b, diode 417 and lead wire 418 to thyratron 423 to fire the same. Since relay 328 has not been energized, thyratron 423 will conduct through relay contacts 328a and the control winding of relay 353 to energize the same. As described above, relay 353 is energized momentarily and the thyratron 423 is extinguished when the relay energizes. Momentary energization of relay 353 opens the holding circuit for relay 431 thereby opening the circuit to the latching solenoid 269 to stop the belt. Also, the retracting plate is returned to normal position whereupon the sensing pins 189 engage the main program belt 121 along the first column of the fourth program. It will be noted that the apparatus was advanced to the next prime program automatically without first turning the selector switch 313 to the next program. That is, the apparatus is now set up for program No. 4 while the switch 313 remains set to program No. 3. As described above, such automatic advance is made possible by use of the channel 13 contacts 292-13 in conjunction with one of the program contacts of channels 1 through 12. In order to return to program No. 3 it would only be necessary for the operator to press the document reset switch 321 and the apparatus would reset thereto in the manner described above.

Often, it is desired to repeat the same program and, typically, the same program is repeated where the operator obtains information from documents of the same type, such as all sales invoices. For example, if for each source document an IBM card is to be punched with information obtained from the same fields in the same order or sequence, the apparatus of this invention may be made to automatically repeat the program. For automatic program repeat, the program repeat switch contacts 292-38 (which are in shunt with the program repeat switch 526) are employed, and the program repeat function is programmed on the main program belt by inclusion of a hole at channel 38 to permit closure of said contacts 292-38. The channel 38 punch is programmed on the belt following the last programmed card field. If, for example, all 80 columns of a punch card are to be filled for program No. 4, the program card would be provided with a punch at column 80, program No. 4, to signify the end of the program thereat. When the program card stepped ahead following the punching of column 80 in the punch card, the thyratron 367 (FIGURE 24) would be energized to step the main program belt forward one step in the manner described above. At this next step on the belt the belt would be punched at channel 38 for closure of the program repeat contacts 292-38. When these contacts are made the ground connection provided by such closure is carried through a conductor 518, relay contacts 528a and 529a, and blocking diode 522 to the relay 328 for the energization thereof. From the above description it will be recalled that relay contacts 328b are included in the energization circuit to the motor reversing relay 309 whereupon the motor 131 proceeds to operate in reverse when the sensing pin controlled contacts 292-38 are closed.

The ground connection from the contacts 292-38 is also carried through the contacts 528a and 529a and the blocking diode 523 to the relay 431 (FIGURE 24) for the energization thereof. A holding circuit including a resistor 525 and the normally closed contacts 353b of relay 353 maintain the relay 431 in an energized state. Relay contacts 431a (FIGURE 25) are in series with a blocking diode 524 and the combination is in shunt with the relay contacts 343a. Therefore, the same sequence of events is initiated upon closure of the contacts 431a as when the contacts 343a are closed as described above. Briefly, when contacts 431a are closed, relay 357 is momentarily energized to quench the thyratrons 371, 372, 373, 374 and 376. The relay 346 is also energized through diode 347 thereby closing its contacts and completing the circuit for the retraction magnets 256 to withdraw the sensing pins from the main program belt. Switches 262 and 262a are closed upon retraction of the plate 241 whereupon the main pawl operating solenoid 269 is energized through the closed contact 262 permitting the motor 131 to drive the main program drum and associated main program belt 21 in the reverse direction. Under the assumed conditions (wherein an automatic program advance function is followed by an automatic program repeat function) during the automatic program repeat, the main program belt 21 is driven in reverse to a position wherein the contacts 193-4 and 193-13 simultaneously close. From contacts 193-13, a control signal is supplied to the thyratron 376 to fire the same whereupon a condition signal is applied to the thyratrons 371 through 374. At the same time, a control signal is derived upon closure of contacts 193-4 (from the channel 4 perforation) and fed to the thyratrons 371 and 372 to fire the same and energize relays 287 and 362 to reset the tree circuit for selection of star wheel controlled switch 43 for program No. 4. Also, when contacts 193-13 close, the ground signal is carried back to the thyratron 423. In the manner described above, the reverse drive of the belt is thereby stopped and the belt is driven forward and again stopped at the first column in program No. 4. During forward drive of the belt, when the thyratron 423 conducts through relay 353, to momentarily energize the same, the relay contacts 353b are momentarily opened to open the holding circuit for the relays 328, 343 and 431. (Relay 328 was previously de-energized upon conduction of the thyratron 423 through relay contacts 328a when the thyratron was fired upon reverse drive of the main program belt. Relay 343 was not energized so the opening of the holding circuit 353b has no effect thereon.) When contacts 353b open to deenergize the relay 431 the contacts 431a reopen to deenergize relay 346 and the main pawl operating solenoid 269.

As described above, opening of the main pawl operating solenoid circuit stops the main program belt and opening of the relay 346 opens the energization circuit to the retracting solenoids 256 to permit the retracting plate to return the normal position wherein the sensing pins 189 again engage the main program belt at the first column of the fourth program. Thus, it will be seen that by use of the contacts 292-38 the apparatus is automatically returned to the start of the prior program at the completion of each card. Also, as described above, the card punch machine is automatically reset at the completion of punching a card whereby both the apparatus and the key punch machine are in condition for the operator to begin punching another punch card using the same program No. 4.

A push button program repeat switch 526 (FIGURE 24) is included in the auxiliary control box 49 with one switch contact connected to ground. The switch is connected in shunt with the belt controlled program repeat contacts 292-38 through a conductor 527. Therefore, the manual program repeat switch 526 provides for manual control of the program repeat function. Anytime the operator presses the program repeat switch the apparatus will return to the start of the program. If not already in a start position, the key puch machine must be restored to the start position as by pressing the release key thereon before proceeding to punch a new card.

ALTERNATE PROGRAM

The apparatus of this invention provides for the inclusion of one or more alternate programs for each of the twelve prime programs on the main program belt. Programs which are seldom or rarely used are best programmed as "alternate" programs. An alternate program switch 536 is included in the auxiliary control box 49, which switch must be pressed for selection of an alternate program. If the card punch machine is provided with an alternate program unit the keyboard 32 will include an "alternate program" key which may be connected in shunt with the switch 536 through the interconnection of terminals 537a and 537b in FIGURES 23 and 24, respectively. In this case, alternate program may be selected by depressing either the keyboard switch or the switch 536 in the auxiliary control box.

The alternate program may be used for either a complete card, or for the remainder of a partially punched card. Once an alternate program switch is depressed, the apparatus remains on alternate program to the end of the card. That is, it is not possible to return to a prime program in the same card cycle. However, when the card is completed in alternate program, the apparatus will return to a prime program and not to the beginning of the alternate program. Thus, the belt may be advanced to the next prime program or returned to the prime program depending upon whether a program advance or program repeat is programmed on the belt at the end of the alternate program. These functions of program repeat and program advance have been described above and need not be repeated in the following description of the alternate program function.

Before describing the alternate program circuitry in detail, it will here be recalled that in the illustrated arrangement end of field signals are only provided by the twelve star wheel controlled switches 43-1 through 43-12. Therefore, the alternate program must employ one of the twelve end of field programs provided on the program card. However, all of the other functions which are under control of switches 292-15 through 292-110 may be independently selected by the programming contained on the belt and need not correspond in any manner to the belt punching for the prime programs.

Assume, for purposes of illustration, that program No. 3 on the main program belt is followed by an alternate program. As will become apparent hereinbelow, when the alternate program switch is depressed, the main program belt is driven forward to the first alternate program encountered on the belt, at which point it is stopped. In order to stop the belt at the alternate program a punch in the program belt is provided in the first column of the alternate program at channel 14, the alternate program channel. Also, the desired end of field program is selected by including (in addition to the channel 14 punch) a punch in the first column of the alternate program channel at one of the prime program channels (channels 1 through 12). In programming the belt 121, alternate program No. 3 would preferably be located immediately after prime program No. 3 on the program belt. Therefore, channel 4 would be punched in the first column of the alternate program No. 3 for selection of star wheel controlled switch 43-4.

Assume, therefore, that channels 4 and 14 are punched in the first column of the alternate program No. 3. Any of the other channels 15 through 110, as required, may be punched in the first column, and subsequent columns of the alternate program for control of the column count lights, form lights, carriage, light bars, and any of the other automatic functions mentioned above. For purposes of describing the alternate program function no particular punching of these channels need be considered. Assume further that the program selector switch 313 is set at program No. 3, that a card has been punched using program No. 3, and that now the operator desires to punch a card utilizing alternate program No. 3. The operator would depress the alternate program switch 536 (FIGURE 24) in the auxiliary control box 49, or the alternate program key on the keyboard 32. As seen in FIGURE 24, one switch terminal is connected to ground 46, therefore, when the switch is closed the ground connection is carried through blocking diode 538, conductor 539, and relay contacts 391b (FIGURE 25) to the control winding of relay 541. The other end of the relay winding is connected directly to the +155 volt D.C. supply whereby the relay 541 is energized when the alternate program switch 536 is closed. Contacts 541b in the energization circuit for relay 391 are thereby closed whereupon relay 391 is energized through a load resistor 542 and the now closed contacts 541b. The relay contacts 391a are switched to the ground terminal 46 whereby a holding circuit for the relay 391 is completed through a resistor 543 and the now switched contacts 391a. When the energization circuit for the relay 541 is broken by the switching of the contacts 391a to the energized position, deenergization of the relay 541 is delayed by current flow through a diode 544 in shunt therewith, the current flow being produced by the collapsing magnetic flux field of the relay winding. Energization of relay 391 and closure of the holding circuit contacts 391a are thereby assured before the relay contacts 541b reopen.

Relay 541 also has relay contacts 541a (FIGURE 24) which are in the energization circuit for relay 431 whereupon relay 431 is energized through the contacts 541a when relay 541 is momentarily energized. Relay 431 is maintained in the energized condition through the holding circuit comprising the resistor 525 and relay contacts 353b. It will here be recalled from the description of the program advance function that relay 431 was also energized by closure of the manual program advance switch 531 or automatically by closure of belt controlled switch contacts 292-39 for forward drive of the main program belt. The main program belt is thereby driven forward in the manner described above, and such description will not here be repeated.

With the relay 391 energized, the relay contacts 391b (FIGURE 25) are switched from the switch arm 314a of the program selector switch 313 to the alternate program channel contact 193-14. It will be apparent, therefore, that when the main program belt is driven forward to a position wherein the alternate program contacts 193–14 are closed, the ground signal therefrom is carried back through the now energized contacts 391b, diodes 392 and 417, and lead wire 418 to the thyratron 423 to fire the same. The thyratron thereupon conducts through relay 353 to open the holding circuit for relay 431, deenergizing the same. When the relay 431 deenergizes the contacts 431a reopen to open the energization circuits to the relay 346 and the pawl operating solenoid 269 whereupon the forward drive of the belt 121 is stopped and the sensing pins 189 returned to operative position with the main program belt at column No. 1 of the alternate program No. 3.

As mentioned above, it was assumed that the main program belt included a punch at channel 4 in the first column of alternate program No. 3 (and, therefore, in vertical alignment with the alternate program channel 14 punch). Therefore, at the same time that a ground signal is carried back through the contacts 193–14, relay contacts 391b, diodes 392 and 393, and lead wire 394 to the thyratron 376 to fire the same, a control signal is supplied through the contacts 193–4 and diode gates 415 and 414 to the thyratrons 371 and 372. The thyratrons 371 and 372 are thereby fired to energize relays 287 and 362 to switch the tree circuit for connection of star wheel controlled switch 43–4 (FIGURE 24) to the relay 365 for end of field control of the thyratron 367. It will be seen therefore that alternate program No. 3 is provided with the same end of field program as prime program No. 4. The programming on the main program belt for prime program No. 4 and alternate program No. 3, however, depends only upon the punching of the main program belt, and obviously, the programming may be different.

After punching the alternate program card, the main program belt 121 may be programmed to automatically advance to the next prime program, return to the prior prime program on the belt, or reset to the header, or first, program, as desired, by including a punch in the program advance channel 39, program repeat channel 38 or document reset channel 37, respectively. As a further alternative, none of the automatic function channels may be punched whereby the main program belt will merely stop at the last column of the alternative program. The operator would then have to make a decision as to which program to select next. The fact that a decision is required by the operator may be programmed on the main belt by the inclusion of punches in certain of the channels 42–63 and 108–110 for illumination of lamps 81 at areas of the document containing no information. For example, if no information is contained at line one, column one in the upper third of the source document, the belt may contain punches at channels 42 and 108 at the end of the alternate program for illumination of the source document in this area thereby indicating to the operator that a decision as to the next step to be taken is required. Obviously, "decision" signals are not limited to use at the end of alternate programs. A decision signal may be programmed anywhere on the belt, as desired. For example, use thereof may be made at the end of a program or during the course of punching a card, to indicate to the operator that an alternate program is available and a decision to go into alternate program or not should be made at this time.

PRINT SUPPRESSION

Some card punch machines 25 not only include means for punching holes in the cards 37, but may also include means for printing the characters on the cards as they are punched. A "print" switch is generally included on the keyboard 32 by which the machine may be made to print or not print, as desired, by manual control thereof. Even when the print switch is on, printing can be prevented by grounding terminal 289–3, shown in FIGURE 24. (The printing and print suppresion functions are well known functions of card punch machines and require no further description herein.) With the device of this invention, print suppression is simply programmed on the main program belt by including a punch in channel 41. When contacts 292–41 are closed, the ground 46 connection is carried through conductor 546 to contact 289–3 to prevent printing while punching that field.

AUTO SKIP AND AUTO DUP

As is well understood, the keyboard 32 of the card punch machine 25 includes an on-off switch 290 for control of the automatic skip and automatic duplication functions. When the card punch machine is used without the apparatus of this invention, and 11 punched in the first column of any field of the program card automatically starts a skip, whereas a zero punched in the first column thereof automatically starts duplication, if the auto skip and auto dup switch 290 is in the "on" position. The automatic skip and automatic duplication functions are continued over that field by 12's punched in the remaining columns of the field. When the apparatus of the invention is used in conjunction with the card punch machine, the switch 290 is similarly used for control of the automatic duplicate and skip functions. In addition the switch 295, mentioned above, may be used for control of the automatic duplication function.

A punch in the automatic duplicate channel 34 permits closure of contacts 292–34 (FIGURE 24) and the ground connection is carried through the closed contact 292–34, switch 295, conductor 506 and relay contacts 484a to terminal 289–0. If the switch 295 is in the "on" position, i.e., closed, the ground connection is carried therethrough for automatic duplication. No closure of the field definition contacts 292–32 is required to continue the automatic duplication through the entire field.

A punch in the automatic skip channel 33 permits closure of contacts 292–33 (FIGURE 24). The ground connection is carried through the closed contacts 292–33, conductor 507, relay contacts 482b and conductor 507' (from FIGURE 24 to FIGURE 22) to the control grid of one section 498A of the tube 498. The anodes of the two section tube are connected through individual resistors 499A and 499B and a common resistor 500 to the +155 volt D.C. supply. The cathode of the one tube section 498A is connected through a resistor 501A, a lead wire 502 (from FIGURE 22 to FIGURE 24) and one of the switch contacts 291 to the terminal 289–11 which terminal, as mentioned above, is connected to the skip circuit of the key punch machine through means not shown. The grids of the tube 498 are connected to a −49 volt D.C. source though grid resistors whereby the tube sections are normally cut off. When the automatic skip channel contacts 292–34 close, the grid of tube section 498A is grounded and the tube section conducts through resistor 501A for energization of the automatic skip circuit in the key punch machine.

It will be seen that the field definition contacts 292–32 (FIGURE 24) are connected through conductor 508, relay contacts 549a, relay contacts 486a and lead wire 508' (from FIGURE 24 to FIGURE 22) to the control grid of the tube section 498B. The cathode of the tube section 498B is connected through a resistor 501B, lead wire 511 (from FIGURE 22 to FIGURE 24) and one of the switch contacts 291 to the terminal 289–12 which terminal, as mentioned above, is connected to the field definition circuit of the key punch machine through means not shown. When the field definition contacts 292–32 close, the field definition circuit in the key punch machine is energized through the conducting tube section 498B. The relay contacts 549a (FIGURE 24) in the field definition control circuit are under control of relay 549 (FIGURE 23) having one terminal directly connected to the +155 volt D.C. supply and the other terminal connected through conductor 551 to the IBM card ready relay terminal 552. If the IBM machine is in condition for punching, the relay 549 is energized to close the circuit to the field definition contacts 292–32. It will here be noted that a punch in the field definition channel 32 is required to automatically carry the automatic skip through the entire field to be skipped. Failure to include this punch causes the card punch machine to space each column when in release mode and to space but one column for each closure of the contacts 292–33, and for each depression of either the skip or skip X key on the keyboard 32. Whenever the relays 446, 482, 484 and 486 are energized, the tube 498 is disabled by connection of the anode circuits to ground through the diode 496. The automatic skip and field definition functions are thereby disabled during advance of the program belt one step.

ALPHABETIC SHIFT

With card punch machines equipped with a combination keyboard for punching either letters or numbers, the machine is normally in condition for punching numeric information. Therefore, to punch letters the keyboard must be shifted for alphabetic punching. Changing to alphabetic shift may be done either manually by pressing an alphabetic-shift key on the keyboard 32 or automatically by including a punch in channel 35 of the belt 121. As seen in FIGURE 24, the contact 292–35 (under control of channel 35 punches) is connected through conductor 517, interlock switch 466a, and contacts of switch 284 to terminal 289–1 which terminal, as mentioned above, is connected to th ealphabetic shift circuit of the card punch machine. Thus, whenever the contacts 292–35 are closed by inclusion of a punch in the program belt, the key punch machine is adapted for alphabetic punching.

With card punch machines equipped with a numeric keyboard only (i.e., with no alphabetic keys) the only function of closure of channel 35 contacts 292–35 is to permit spacing over blank columns when duplicating. As is understood by those skilled in this art, a channel 35 punch serves the same purpose as a zone 1 punch in the normal program card when the card punch machine is used without the apparatus of this invention.

LEFT ZERO PRINT CONTROL

During automatic duplication, it is sometimes desired to print zeros to the left of the first significant digit in a numeric field. For example, if a five digit field to be duplicated includes the numbers 00062, the zeros preceeding the 6 are printed on the duplicated card only if a "left zero print" punch is programmed on the belt 121 at channel 36. (Zeros to the left of the first significant digit are automatically suppressed if the channel is not punched.) As seen in FIGURE 24, the contacts 292–36 are connected through a conductor 552, an interlock switch 446b, and switch 284 to terminal 289–2 which, as mentioned above, is connected to the left zero print circuit of the card punch machine. Therefore, whenever the contacts 292–36 are closed by inclusion of a punch in the belt 121 at channel 36, the key punch machine prints the zeros to the left of the first significant digit in a numeric field. The channel 36 punch serves the same purpose as a zone 2 punch in the normal program card when the card punch machine is used without the apparatus of this invention.

As seen in FIGURE 24, whenever a program advance, program repeat or document reset function is provided (either manually by closure of switches 531, 526 or 321 or automatically by closure of contacts 292–39, 292–38 or 292–37) or whenever the detail line advance switch, designated 553 is closed, a relay 554 is energized through a load resistor 556 of about 10K ohms resistance, and one of four blocking diodes. The large resistance 556 delays the energization of the relay 554 for a short interval after closure of one of the above-mentioned switches. When relay 554 energizes, relay contacts 554a (FIGURE 24) close thereby completing the energization circuit to relays 326 and 529 through resistors which are also of about 10K ohms resistance. After a short delay following closure of the contacts 554a, the relays 326 and 529 are energized. The normally closed contacts of relays 326 and 529 are included in the above-mentioned program advance, program repeat, document reset and detail line advance energization circuits whereby such energization circuits are opened when the relays 326 and 529 are energized. (Contacts 326a and 326b are shown in FIGURE 24 in the document reset and program advance energization circuits, contact 529a is shown in FIGURE 24 in the program repeat energization circuit, and contact 529b is shown in FIGURE 26 in the detail line advance energization circuit.) When the contacts 326a, 326b, 529a, and 529b open no further energization signals may be supplied to the circuits connected thereto.

Whenever relay 343 or 431 (FIGURE 24) is energized for drive actuation of the main program belt 121 during document reset, program advance, program repeat, stepping of the belt, or the like the ground connection provided by closure of the contacts 343a or 431a (FIGURE 25) is carried back through blocking diode 559, conductor 560 (from FIGURE 25 through FIGURE 24 to FIGURE 23) and blocking diodes 436 and 437 to the relays 438 and 457 for energization thereof to lock the carriage drive motor 86. Also, whenever the anode of the thyratron 367 (FIGURE 24) is grounded (as, for example, by closure of relay contacts 446a and switch contacts 262a) this ground connection is carried through conductor 509 (which may be traced from FIGURE 24 to FIGURE 25) and blocking diode 563 to the relay 528. When relay 528 energizes, the contacts 528a, 528b and 528c open to open the control circuits for program repeat, program advance and document reset to disable the same when the apparatus is in the process of repeating, advancing or resetting. Therefore, actuation of the program advance switch 531, program repeat switch 526 or document reset switch 321, for example, during the time the apparatus is advancing, repeating or resetting will have no effect on the operation.

It will be seen that the apparatus of this invention as described thus far provides means to illuminate the source document fields as the cards are punched, inform the operator of the number of columns to be punched in each card field, inform the operator by means of the indicator lights of necessary key punching instructions and to control the print suppression, automatic skip, automatic duplicate, alphabetic shift and left zero print functions of the card punch machine.

DETAIL LINE READER

As an optional feature, the apparatus may also include a detail line reader unit, designated 564 as shown in FIGURE 26. The detail line reader includes the auxiliary program belt 121' and auxiliary sensing head comprising the contacts 193' and pin controlled contacts 292'–64 through 292'–110. The contact 193'–14 and contacts 292'–15 through 292'–63 in the detail line reader are not employed since the corresponding contacts in the main sensing head may be utilized during operation of said detail line reader as required.

It will here be understood that the apparatus of this invention is capable of operation without the detail line reader and is, in fact, often used without it. The detail line reader is, however, particularly useful where a number of separate punch cards are to be prepared from a single source document, where each of the cards is to include some common information (which may be duplicated after punching a first or header card), and some unique information. When the unique information for each such card is derived from different lines on the source document, the detail line reader may be employed for stepping the carriage once for every card punched to the desired line for punching the "detail cards."

A detailed description of the detail line reader 564 will first be given which will then be followed by a description of the operation thereof in punching detail cards from the source document illustrated in FIGURE 27. A detail line reader on-off switch 566 is included in the auxiliary control box 51 (FIGURE 9), which switch must be closed to place the reader in condition for operation. As seen in FIGURE 26, the switch 566 is in the line from the +155 volt D.C. source of supply to a plurality of relays 568, 569, 570, 571, 572, 573, 574, 575 and 576. The retracting magnets 256', the pawl operating magnet 269' for the auxiliary sensing head and the reverse delete solenoid 272 are directly connected to the +155 volt D.C. source. In the above description of the main program reading head, it was assumed that the program select switch 313 was first set to program No. 3 and that the document reset switch 321 was pressed whereupon the main program belt was driven to the start of prime program No. 3. Now, assume further that the detail line reader on-off switch 566 was closed at the time that the document reset switch 321 was closed. As seen in FIGURE 24, the ground connection from the closed contacts of switch 321 is carried through a blocking diode 577, and conductor 578 (from FIGURE 24 to FIGURE 26) to the relay 573 for the energization thereof. A holding circuit through a series connected resistor 579, blocking diode 581 and normally closed relay contacts 575a is established to maintain the relay 573 in the energized condition after the switch 321 is released.

With the relay 573 energized, the normally closed relay contacts 573b are opened to prevent sensing of a subprime signal from contacts 193'-13 during rotation of the auxiliary drive drum. Also when the relay 573 is energized, the normally open relay contacts 573a are closed thereby completing the energization circuit to the relays 569 and 570. The energization circuit for the relay 569 may be traced from the +155 volt D.C. source through a resistor 598, the relay winding, a blocking diode 580, the now closed contacts 573a, and the relay contacts 575b to ground. The energization circuit for the relay 570 may be traced through a load resistor 599, the relay winding, a blocking diode 582, and said contacts 573a and 575b to ground. Holding circuits for the relays 569 and 570 are provided by the connection thereof to ground through the respective series connected resistor 583 and diode 585, series connected resistor 584 and diode 586, and the normally closed contacts 273' which are under control of the escapement mechanism for the detail line reader drive drum. The relays 569 and 570 will thereupon remain energized so long as the switch 273' is closed or the relay 575 remains deenergized.

With relay 570 energized the normally open relay contacts 570a and 570b are closed thereby completing the energization circuit to the retractor plate magnets 256' through the now closed contacts 570a and 570b to ground. As described above with reference to FIGURE 10 there are four retractor plate magnets, with each block 256' (in FIGURE 26) representing two such magnets in shunt connection. When the retractor magnets 256' are energized, the retractor plate 241' is actuated to withdraw the sensing pins 189' from the auxiliary program belt 121'.

When the detail line reader retracting plate 241' is retracted upon energization of the magnets 256' the switch 262' is closed by said plate as described above with reference to FIGURE 14. The switch 262', FIGURE 26, and the relay contacts 569a are included in the energization circuit for the pawl operating solenoid 269' for the detail line reader drive drum, and said solenoid is energized through the now closed switch contacts 262', now closed relay contacts 569a and the relay contacts 575b. As shown in FIGURE 15 and described above, if the reverse delete magnet 272 is energized, energization of the pawl operating solenoid 269' will not function to release the pawl 266 from the ratchet 139 and the drive drum for the detail line reader will remain locked against reverse rotation. As noted above in the description of the operation of the main program belt when the reversing circuit for the program belt drive motor 131 is deenergized, the reverse delete magnet 272 is also deenergized. When the reverse delete magnet 272 deenergizes, the pawl 266 for the detail line reader is actuated by the pawl operating solenoid 269' to release the drive drum 118' whereupon the auxiliary program belt 121' is rotated in a forward direction. (It will here be noted that when the pawl 266' is actuated to release the auxiliary drive drum 118', the switch contacts 273' in the holding circuit for relays 569 and 570 are opened. The relays 569 and 570 remain energized, however, through the closed relay contacts 573a and the contacts 575b.)

When the pawl for the drive drum 118' is released, the auxiliary program belt 121' is driven in a forward direction until the contact arm 193' selected by the program select switch 313 enters a hole in the auxiliary program belt. In the illustrated position of the apparatus, the program select switch arm 314b is set to contact switch contact 193'-3 for selection of auxiliary program No. 3. When contact 193'-3 enters a hole in the auxiliary program belt, the ground connection is carried through the movable arm 314b and conductor 587 to the junction between a pair of series connected resistors 588 and 589. The resistors are connected in series with a third resistor 591 and the series combination is connected as a voltage divider between the +155 volt D.C. and the −49 volt D.C. supply source. A thyratron 593 having interconnected suppressor and control grids connected to the junction between the resistors 589 and 591 is controlled by the grounding pulse from the contact 193-3. The cathode of the thyratron is connected to ground 46 and the anode is connected through the control winding of the relay 575 and a series resistor 594 to the +155 volt D.C. supply.

With no grounding signal at the conductor 587 the thyratron 593 is cut-off by a bias of approximately −20 volts D.C. When the contact 193'-3 enters a hole in the auxiliary program belt 121' to ground the line 587, the grid bias on the thyratron 593 rises to approximately +8 volts D.C. to fire the same.

When the thyratron 593 fires, it conducts through the relay 575 to energize the same. When relay 575 energizes, the contacts 575a and 575b switch to the opposite position. With the contacts 575b in the opposite position, a ground connection is applied to the junction between load resistor 594 and relay 575 through the switched contacts 575b whereupon the thyratron 593 is extinguished and the relay 575 deenergized. It will be seen, therefore, that the thyratron 593 and relay 575 are only momentarily energized. When contacts 575a switch to the actuated position, the junction between the resistor 598 and relay 569 and the junction between the resistor 599 and relay 570 are connected to ground through the actuated relay contacts 575a whereupon said relays 569 and 570 are deenergized. Also, the momentary actuation of the contacts 575a removes the ground connection for the holding circuit for relay 573 whereupon the relay 573 deenergizes. (It will here be noted that the contacts 575a are also included in a holding circuit for the relay 574, which holding circuit includes also a series connected resistor 596 and blocking diode 597. If energized, the relay 574 also would be deenergized upon actuation of the contacts 575a.) Relay contacts 573a are opened thereby preventing reenergization of the relays 569 and 570 when the contacts 575b return to the illustrated normal position.

When contacts 575b momentarily switch to the actuated position, the energization circuit through such switch contacts, the relay contacts 569a and the switch 262' to the pawl operating solenoid 269' is opened. The pawl 266 for the auxiliary drive drum 118' thereupon returns to the latched position to stop the forward rotation of the drum. As with the main drive drum, the timing of the latching mechanism and pin drive connection between the drive drum 118' and auxiliary program belt 121' is such that the pawl 266 when released, stops the drive drum at a location where the program select contact 193'-3 is again out of engagement with the hole in the auxiliary program belt thereby removing the ground connection from the movable arm 314b of the switch section 313b. The thyratron 593 which was momentarily fired and then extinguished therefore remains in the quenched condition.

During the momentary switching of the contact 575b, the relay contacts 569a are returned to their normal open position by the deenergization of the relay 569. Reenergization of the pawl operating solenoid 269' when the contacts 575b return to the illustrated position is thereby prevented.

When the contacts 570a and 570b of relay 570 reopen upon deenergization of the relay 570, the retracting magnets 256' are deenergized and the retractor plate 241' returned to normal position wherein the sensing pins 189' engage the auxiliary program belt 121' of the detail line reader. The retractor plate controlled switch 262' reopens to open the circuit to the pawl operating magnet 269'. With the retractor plate 241' returned to normal position, the sensing pins 189' on the auxiliary sensing belt 121' are free to enter holes punched in the first column of auxiliary program No. 3 of the auxiliary belt for closure of switch contacts 292'-64 through 292'-110 associated therewith.

Closure of any of the switch contacts 292'-64 through 292'-110 will have no effect upon the operation of the apparatus of this invention unless contacts 292-40 associated with the main program belt are closed. Thus, it will be seen that with the switch 566 closed, the operation of the detail line reader 564 is under control of the main program belt controlled switch contacts 292-40 (see FIGURE 24). When a punch in channel 40 of the main program belt is encountered, the contacts 292-40 are closed thereby completing the energization circuit of a relay 601. When the relay 601 energizes the normally open contacts 601a and 601b are closed thereby completing the energization circuit for the light bar switches 292'-108, 292'-109 and 292'-110 through the lead wire 237', and the ground circuit for the auxiliary belt controlled switches 292'-64 through 292'-107, through a blocking diode 602 (FIGURE 22). It will be apparent that the auxiliary program belt 121' for the detail line reader may be punched for closure of any of the pin controlled contacts 292'-64 through 292'-110. When a punch is included in channel 40 of the main program belt 121, none of the main program belt channels 64 through 110 thereof will be punched. Instead, the auxiliary program belt 121' will include a punch in one of the channels 292'-64 through 292'-107 (for control of the carriage position) and a punch in one of the channels 292'-108 through 292'-110 (for energization of one of the light bars). The remainder of the main program belt channels 15 through 63 are punched, as desired, for control of the form lamps, column count lamps, alphabetic shift and like functions described above.

The main program belt may be punched for closure of the channel 40 contacts and energization of the detail line reader 564 for any desired number of punch card fields. For example, fields Nos. 2 and 4 of a punch card which is six fields in length could be punched at channel 40 on the main program belt for actuation of the detail line reader during the second and fourth fields of the program. In this case, the carriage and light bars would be under control of the auxiliary control belt while punching the second and fourth fields.

When the main program belt controlled switch contacts 292-40 close, the ground connection is carried through conductor 603 (FIGURE 24 to FIGURE 26) to the relays 571 and 572 through blocking diodes 604 and 605, respectively, for the energization thereof. The relay 571 is provided with a holding circuit which includes a blocking diode 607, resistor 608 and the normally closed escapement controlled contacts 273' for the auxiliary drive drum (see also FIGURE 15). Therefore, once relay 571 is energized, it remains energized so long as either the contacts 292-40 or the contacts 273' remain closed. The relay 572 is provided with a holding circuit which includes a resistor 610 and the relay contacts 575b in their normal position. Therefore, once relay 572 is energized, it remains energized so long as either the contacts 292-40 remain closed or the contacts 575b remain in the illustrated normal position. When relays 571 and 572 are energized, the relay contacts 571a and 572a in the energization circuit for the relays 569 and 570 are colsed, however, the relays 569 and 570 may remain deenergized since other relay contacts and switches are included in series therewith, which contacts or switches must also be closed to complete the energization circuit.

Assume that during the course of punching a card that the channel 40 contacts were closed for energization of the detail line reader and that, therefore, the relay 571 is energized through its holding circuit (diode 607, resistor 608 and contacts 273'). When the punching of the card is completed, "end of card" contacts 519 (FIGURE 26) are closed as the program cam of the key punch machine signals the end of a punch card. The ground connection is carried through the contacts 519, a conductor 609, a blocking diode 611, normally closed relay contacts 576a, now closed contacts 571a, and blocking diodes 580 and 582 to the respective relays 569 and 570 for the energization thereof. The relays 569 and 570 are maintained in the energized state through the holding circuit which includes the resistors 583 and 584, diodes 585 and 586 and contacts 273'.

The operation of the apparatus when relays 569 and 570 are energized by a document reset signal through relay 573 was described above. When relays 569 and 570 are energized the retractor plate magnets 256' are energized through the closed relay contacts 570a and 570b for actuation of the retracting plate 241' and withdrawal of the sensing pins from the auxiliary program belt. The contacts 262' are closed by the retracting plane 241' upon actuation thereof for completion of the energization circuit to the pawl operating magnet 269' through the contacts 262' and relay contacts 569a. If the reverse delete magnet 272 is not energized, the drive drum 118' for the auxiliary program belt 121' is driven in a forward direction upon actuation of the pawl 266' (FIGURE 15) by the pawl operating magnet 269'. The switch 273' is opened by the pawl 266' upon movement of the pawl to the unlatched position, thereby opening the holding circuit for the relays 569 and 570. The relays 569 and 570 are deenergized, whereupon the energization circuits to the latching magnet 269' and retracting magnets 256' are reopened. As with the main program unit, the latching magnet 269' releases faster than the retracting magnets 256' whereby the drive drum is stopped before the sensing pins 189' are released. The auxiliary program belt is thereby stepped forward one column when the operator finishes punching a card. It will be readily apparent that the next column on the auxiliary program belt may be punched differently than the first column thereof. Therefore, if the channel 40 contacts 292-40 are closed during one or more fields while punching the next card, the light carriage and energization of the light bars will be under control of punches in the second column of the auxiliary program belt, which control is entirely independent of the first column punches.

In the above description of the stepping of the auxiliary program belt at the end of a card upon closure of the end of card contacts 519 (FIGURE 26) it was assumed that the contacts 519 reopened prior to the opening of the contacts 273' to permit deenergization of the relays 569 and 570 upon opening of the contacts 273'. In practice, the drive drum 118' drives the belt 121' forward one column in about 20 milliseconds whereas the end of card contacts 519 remain closed for about 50 milliseconds. It will be apparent that the belt would be driven for approximately three columns if the ground signal from the end of field contacts 519 energized the relays 569 and 570 for the full time that the contacts are closed. To shorten the pulse from the contacts 519, the relay 576 is included in the detail line reader, which relay has normally closed contacts 576a in the energization circuit from the contacts 519 to the relays 569 and 570. Also, the relay 569 has normally open contacts 569b in the energization circuit to the relay 576. The energization circuit for the relay 576 includes the end of card contacts 519, conductor 609, blocking diode 611, a conductor 612 and, as mentioned above, the relay contacts 569b. In operation, when the relays 569 and 570 are energized upon closure of the contacts 519, the relay contacts 569b are closed to complete the energization circuit to the relay 576. Upon energization of relay 576 the relay contacts 576a open thereby opening the energization circuit to the relays 569 and 570 from the "end of card" contacts 519. The holding circuits for the relays 569 and 570 (i.e., resistors 583 and 584, diodes 585 and 586 and pawl controlled contacts 273') maintain them in the energized condition until the contacts 273' are opened by movement of the pawl 266'. The drive drum thereby steps the auxiliary program belt forward one step. When the contacts 273' open, the holding circuit for the relay 571 is also opened whereupon the relay contacts 571a in the energization circuit to the relays 569 and 570 from the end of card contacts 519 is opened thereby preventing additional stepping of the belt.

From the above description, it is seen when the detail line reader has been energized during the course of punching a card (by closure of channel 40 contacts 292–40) the auxiliary program belt is stepped forward one column upon closure of the end of card contacts 519. If the detail line reader had not been activated by closure of the contacts 292–40, the closure of the end of card contacts 519 would have no effect upon the operation thereof since the contacts 571a would be open when the end of card ground signal is produced.

The ground connection provided by closure of the "end of card" contacts 519 is carried through the blocking diode 111, conductor 612, conductor 612' (FIGURE 26 to FIGURE 25) and a blocking diode 615 to the relay 391 to disable the same and prevent the selection of an alternate program on the main program belt during the period the "end of card" contacts 519 are closed.

Manual control of the detail line reader 564 is provided by the detail line advance switch 553 and a detail line reset switch 613, both of which are included in the auxiliary control box 49 (FIGURE 9). As seen in FIGURE 24, the detail line reset switch 613 is connected in shunt with the document reset switch 321 through the blocking diode 577. Therefore, closure of the detail line reset switch 613 will function to reset the detail line reader to the start of the selected program in the same manner as closure of the switch 321 as described above.

Actuation of the detail line advance switch 553 serves to step the auxiliary program belt 121' forward one column if the detail line reader is actuated by closure of channel 40 contacts 292–40. With contacts 292–40 closed, a ground connection is carried through the closed contacts, conductor 603 and diodes 604 and 605 to relays 571 and 572 for the energization thereof in the manner described above. The conductor 603 is connected to one terminal of the detail line advance switch 553 through a conductor 614 (from FIGURE 26 to FIGURE 24) thereby providing a ground connection at the switch 553 when the contacts 272–40 are closed.

When the detail line advance switch 553 (FIGURE 24) is closed by manual operation thereof the ground connection is carried through a conductor 616 and a blocking diode to the relay 554 for the energization thereof. The conductor 616 also connects through a blocking diode 617, conductor 618 (from FIGURE 24 to FIGURE 26) relay contacts 529b and blocking diodes 580 and 582 to the relays 569 and 570 for the energization thereof. As described above, when relays 569 and 570 are energized, the auxiliary program belt is stepped forward one column.

The ground connection to the relays 569 and 570 from the switch 553 is opened about 11 milliseconds after closure of the switch 553 by opening of the relay contacts 529b to prevent drive actuation of the program belt beyond one column. As mentioned above, the ground connection from the switch 553 is carried to the relay 554 for energization thereof when the switch 553 is closed. It will be recalled that relay 529 is energized upon energization of relay 554 for opening of said contacts 529b. The contacts 529b will remain open until the switch 553 is reopened. Opening of the relay contacts 529b thereby controls the length of the grounding signal from the switch 553 to limit the movement of the auxiliary program belt to one step upon closure of the switch 553.

As mentioned above, closure of the program advance switch 531, or closure of the program advance contacts 292–39, advances the main program belt to the next program. If the relays 571 and 572 have been energized by closure of the channel 40 contacts 292–40, the detail line reader belt is also advanced to the next program after the main program belt has advanced and stopped. As seen in FIGURE 24, the program advance switch 531 is connected through a blocking diode 621, a conductor 622 (from FIGURE 24 to FIGURE 26) and a blocking diode 623 to the relay 574 for the energization thereof when the switch 531 is closed. The conductor 622 also connects through a blocking diode 631 to the relay 568 for substantially simultaneous energization of the relay 568. Upon energization of the relays 568 and 574, the normally closed relay contacts 568a break before the normally open relay contacts 574a make. Therefore, even though the contacts 574a are closed, the energization circuit for relays 569 and 570 (through contacts 575a, diode 627, contacts 572a, 574a and 568a and diode 582) remains open because of the opening of contacts 568a before the closing of contacts 574a. Relay 574 is provided with a holding circuit through resistor 596, diode 597 and the contacts 575a to ground. Relay 568 is also provided with a holding circuit through a resistor 632, conductor 633 (from FIGURE 26 to FIGURE 25) blocking diode 634 and relay contacts 431a to ground. Therefore, once energized, the relays 568 and 574 will remain energized until the respective holding circuit contacts 431a and 575a are opened. It will be recalled that relay 431 is energized to close the contacts 431a when the program advance switch 531 is closed, and remains energized until the main program belt has completed its advance to the next program. As soon as relay 431 deenergizes, the holding circuit for relay 568 is opened by opening of the contacts 431a whereupon the contacts 568a reclose to complete the energization circuit for the relays 569 and 570. In the manner described above, when relays 569 and 570 energize, the magnets 256' are energized to retract the retractor plate 241' whereupon the switch 262' is closed and the pawl operating solenoid 269' is energized. The drive drum 118' is thereby released and the auxiliary program belt is advanced to a position wherein the contacts 193'–13 close upon encountering a channel 13 punch in the auxiliary program belt. In the illustration wherein the program selector switch 313 is set to program No. 3, the main program belt 121 will be advanced to program No. 4 upon actuation of the program advance switch (if a channel 13 punch is included in the same column as the channel 4 punch) and the auxiliary program belt 121' will be advanced to the next channel 13 punch in said auxiliary program belt. When the channel 13 punch in the auxiliary program belt is encountered, the ground connection is carried through the closed contacts 193'–13, relay contacts 573b and lead wire 587 to the control circuit for the thyratron 593 to fire the same. As described above, when the thyratron fires, the relay 575 is momentarily energized to deenergize the relays 569 and 570. Actuation of the contacts 575a also opens the holding circuit for relay 574 whereby said relay deenergizes. When relays 569 and 570 are deenergized, the pawl 266' for the auxiliary drive drum 118' returns to latched position and the program belt is stopped at the first column of the next program (program No. 4) on the belt. A channel 4 punch would ordinarily be included in line with the channel 13 punch to permit selection of the auxiliary channel No. 4 program by the switch 313. However, with the switch 313 set to program No. 3, a channel 4 punch in the auxiliary control belt will have no effect on the operation of the detail line reader.

It will here be noted that when the relay 569 is energized and relay 575 is deenergized, a ground connection is carried through relay contacts 575b and 569a, a conductor 628 (FIGURE 26 to FIGURE 25) and the blocking diode 562 to the relay 528 for energization thereof. As described above, when relay 528 is energized, the control circuits for program advance, program repeat and document reset are opened. The same ground connection from conductor 628 is carried through blocking diode 561, conductor 560 (from FIGURE 25 through FIGURE 24 to FIGURE 23) and blocking diodes 436 and 437 to relays 438 and 457 to energize the same and lock the carriage motor 86.

When relays 572 and 574 are energized during a program advance function, the relay contacts 572b and 574b (FIGURE 24) are closed to complete an energization circuit to relays 482 and 484. As described above, when the relays 482 and 484 are energized, the circuits to the automatic skip and automatic duplicate switches are opened to prevent such automatic functions during program advance.

SAMPLE INVOICE

A simple example of the use of the apparatus of this invention in the punching of cards from a source document will serve to illustrate many of the advantages of the invention. Referring to FIGURE 27, a source document D is there shown having both "header" and "detail" or "line" information. The information is to be entered in three different punch cards of the type shown in FIGURE 28. Each punch card includes seven fields as follows: field No. 1 invoice number; field No. 2, customer's name; field No. 3, date; field No. 4, quantity; field No. 5, part name; field No. 6, price and field No. 7, salesman code. The "header" information (i.e., the same information which will be punched in each of the cards) is contained in field Nos. 1, 2, 3 and 7, whereas field Nos. 4, 5 and 6 will contain "detail" or "line" information. When referring to the source document, the first line of detail information for field Nos. 4, 5 and 6 are designated field No. 4, field No. 5 and field No. 6; the second line as fields 4a, 5a and 6a, and the third line as fields 4b, 5b and 6b.

The apparatus of the present invention can be programmed to scan, during the punching of the first (or header) punch card, all seven fields, i.e., fields Nos. 1, 2, 3, 4, 5, 6 and 7. When punching the subsequent cards the header information (i.e., field Nos. 1, 2, 3 and 7) may be automatically duplicated by programming the apparatus for automatic duplication of such information. Therefore, in punching the second punch card, the apparatus of the invention can be programmed to automatically duplicate field Nos. 1, 2, 3 and 7, and to scan fields 4a, 5a and 6a. Similarly, when punching the third card, the information for field Nos. 1, 2, 3 and 7 may again be automatically duplicated and the fields 4b, 5b and 6b scanned by proper programming of the apparatus.

In FIGURE 29 there is shown a program card which is suitably punched to provide the necessary end-of-field signals for punching the three punch cards. The header (i.e., first) card is punched using program No. 1 and the two detail line cards are punched using program No. 2. (It will here be noted that all of the cards could be punched using only program No. 1. However, since three adjacent fields (field Nos. 1, 2 and 3) are to be automatically duplicated in punching the detail line cards, these fields are combined into a single field in program No. 2.) Since only two out of twelve possible programs are employed to program the apparatus for punching the cards, the ten remaining program zones are available for programming the punching of other cards.

Because detail line information is to be obtained from the source document, both the main and auxiliary program belts will be employed. The main and auxiliary program belts 121 and 121' are punched as shown in FIGURES 30 and 31, respectively, and inserted in the reader heads 119 and 119' (FIGURE 10). The program card shown in FIGURE 29 is fastened to the program drum 31 (FIGURES 1 and 2) and inserted in the card punch machine. Punch cards of the type shown in FIGURE 28 are placed in the hopper 26 (FIGURE 1) and the source document D shown in FIGURE 27 is placed on the transparent panel 53. The main line switch 298 and D.F. switch 299 (FIGURE 23) are turned on; the switch 284 (FIGURE 9) is turned to the D.F. position; and the program selector switch 313 is set to program No. 1. The detail line reader switch 566 (FIGURE 9) is turned on; and the automatic dup switch 295 is turned on. In accordance with usual procedures, the release key (not shown) of the card punch machine is pressed to rotate the program drum to the start position, and the document reset key 321 is pressed for rotation of the main and auxiliary program belts 121 and 121' to column No. 1 of program No. 1 (as determined by having set the switch 313 to program No. 1). The belts 121 and 121' are stopped at program No. 1 by reason of the punch in channel No. 1 of the belts as seen in FIGURES 30 and 31. When the belts stop, the sensing pins 189 for the main program belt enter holes punched in channels 19, 49, 65 and 108 for closure of the associated switch contacts 292–19, 292–49, 292–65 and 292–101, respectively. (Some auxiliary program belt controlled contacts are also closed but have no effect on the operation of the apparatus since the main program belt controlled contacts 292–40 for activation of the detail line reader remain open at this time.) Consequently, the light bar 57a is registered with line 2 at the upper third of the document (by closure of contacts 292–65), and the form lamp No. 8 in light bar 57a is illuminated (by closure of contacts 292–49 and 101–108) for illumination of field No. 1 (FIGURE 27). Also, column count lamp No. 5 is illuminated by closure of contacts 292–19 to indicate to the operator that field No. 1 is five columns in length. A chart of the main and auxiliary belt programming for use in punching cards from the source document of FIGURE 27 is hereinbelow shown and may be referred to for convenience during the course of the following description.

| Col. No. | Main program belt | | Col. No. | Auxiliary program belt | |
|---|---|---|---|---|---|
| | Field No. | Channel punches | | Field No. | Channel punches |
| 1 | 1 | 1, 19, 49, 65, 108. | 1 | | 1, 93, 108. |
| 2 | 2 | 19, 25, 27, 35, 54, 55, 56, 83, 108. | 1 | | 1, 93, 108. |
| | | | 1 | | 1, 93, 108. |
| 3 | 3 | 20, 61, 68, 108. | 1 | 4 | 1, 93, 108. |
| 4 | 4 | 19, 40, 46. | 1 | 5 | 1, 93, 108. |
| 5 | 5 | 16, 26, 27, 35, 40, 51. | 1 | 6 | 1, 93, 108. |
| 6 | 6 | 19, 40, 63. | 1 | | 1, 93, 108. |
| 7 | 7 | 16, 58, 98, 110. | 1 | | 1, 93, 108. |
| 8 | | 39. | 2 | | 13, 64, 109. |
| 9 | 1, 2, 3 | 2, 13, 34. | 2 | 4a | 13, 64, 109. |
| 10 | 4a | 19, 40, 46. | 2 | 5a | 13, 64, 109. |
| 11 | 5a | 16, 26, 27, 35, 40, 51. | 2 | 6a | 13, 64, 109. |
| 12 | 6a | 19, 40, 63. | 2 | | 13, 64, 109. |
| 13 | 7 | 34. | 3 | | 13, 78, 109. |
| 14 | | 38. | 3 | | 13, 78, 109. |
| 9 | 1, 2, 3 | 2, 13, 34. | 3 | 4b | 13, 78, 109. |
| 10 | 4b | 19, 40, 46. | 3 | 5b | 13, 78, 109. |
| 11 | 5b | 16, 26, 27, 35, 40, 51. | 3 | 6b | 13, 78, 109. |
| 12 | 6b | 19, 40, 63. | 3 | | 13, 78, 109. |
| 13 | 7 | 34. | 3 | | 13, 78, 109. |
| 14 | | 38. | | | |

The operator will note from the illuminated source document there are a total of three digits (1, 2 and 3) to be entered in the first field which is five digits in length (as indicated by the illumination of column count lamp No. 5). The operator will, therefore, enter two zeros before punching the three invoice digits. When the fourth digit is entered, the program card (FIGURE 29) is stepped to column No. 5. A punch is located in the program card at program No. 1 column No. 5 as seen in FIGURE 29, whereupon the star wheel controlled contacts 44–1 (FIGURE 24) are closed. When the fifth digit is entered, the ground connection provided by closure of contacts 44–1 provides a "condition" pulse which coincides with a "control" pulse from contacts 492 to fire the thyratron 367 (FIGURE 24). As described above, the main program belt is advanced one step to column No. 2 of program No. 1 when the thyratron 367 fires.

The main program 121 as seen in FIGURE 30, is programmed at column No. 2 of program No. 1 for closure of contacts 292–19, 292–25, 292–27, 292–35, 292–54, 292–54, 292–56, 292–83 and 292–108 by inclusion of punches in the associated channels. The light bar 57a is thereupon moved to register with line 20 at the upper third of the document (by closure of contacts 292–83), and the form lamp Nos. 13, 14 and 15 are illuminated (by closure of contacts 292–54, 292–55, 292–56 and 292–108) for the illumination of field No. 2 of the document shown in FIGURE 27. Column count lamps No. 5 and No. 20 are illuminated (by closure of contacts 292–19 and 25) to indicate to the operator that field No. 2 is 25 (5+20) columns in length. The "alpha" operating instruction lamp No. 1 is illuminated by closure of contacts 292–27 to indicate that alphabetic information is to be punched, and the keyboard is changed from numeric shift to alphabetic shift by closure of the contacts 292–35. The operator thereupon commences punching field No. 2, the name of the customer, on the alphabetic keys of the keyboard. Since the length of field is indicated, the operator may quickly ascertain if the number of characters in the name exceeds the length of field available. If it does, the operator may appropriately abbreviate to fit the name in the available space. If the name is shorter than the field, the remaining columns may be skipped by actuation of the skip key on the keyboard after the name is entered.

After finishing punching field No. 2, the main program belt is advanced one step to column No. 3, in the manner described above (by closure of star wheel controlled switch 44–1 and the escapement controlled switch 492) in preparation for punching of field No. 3. Column 3 of the main program belt includes punches at channels 20, 61, 68 and 108 for closure of contacts 292–20, 292–61, 292–68 and 292–108, respectively. (See the above chart.) The apparatus is thereupon set for illumination of field No. 3, on the source document and the column count lamp No. 6 is illuminated. The six digits of field No. 3 are punched by the operator and the main program belt steps to column 4 (by closure of star wheel controlled switch 44–1 and the escapement controlled contacts 492) in preparation for punching of field No. 4.

Since field No. 4 is a detail line field, the main program belt (at column 4 of program No. 1) includes a punch in channel 40 for activation of the detail line reader 564. As seen in FIGURE 30, the main program belt also includes punches at channels 19 and 46. No line position or light bar channel punches are included in the main program belt since these functions are now controlled by the auxiliary program belt in the detail line reader. As seen in FIGURE 31, the auxiliary program belt 121′ includes, in column No. 1 of program No. 1, punches in channels 1, 93 and 108. (It will be recalled that the auxiliary program belt was set to column No. 1 of program No. 1 by selection of program No. 1 on the switch 313, and the actuation of the document reset switch 321.)

With the above mentioned programming of the main and auxiliary program belts, the contacts 292–19, 292–40, 292–46, 292′–93 and 292′–108 are closed. The light bar 57a is thereupon moved to register with line 30 at the upper third of the domument (by closure of contacts 292′–93), and the form lamp No. 5 is illuminated in light bar 57a by closure of contacts 292–46 and 292′–108. Column count lamp No. 5 is illuminated (by closure of contacts 292–19) to indicate to the operator that field No. 4 is five columns in length. Since only one digit (the digit No. "one") is shown on the source document (FIGURE 27) at field No. 4, the operator will either skip the first four columns or insert zeros therein before punching the "ones" key.

When the operator has finished the fourth field, the star wheel controlled contacts 44–1 are again closed and the main program belt is advanced one step to column No. 5 of main program No. 1, while the auxiliary program belt remains stationary at column No. 1 of auxiliary program No. 1. The auxiliary belt controlled contacts 292′–93 and 292′–108 therefore remain closed. As seen in FIGURE 30, punches are included at channels 16, 26, 27, 35, 40 and 51 of the main program for closure of contacts 292–16, 292–26, 292–27, 292–35, 292–40 and 292–51 when the belt stops at field No. 5. This time the light bar is not moved because the same contacts 292′–30 which controlled the carriage motor at field No. 4 again control the same for field No. 5. For this field, however, the form lamp No. 10 for the light bar 57a is illuminated by closure of contacts 292–51 and 292′–108. The alpha operating instructor light is illuminated by closure of contacts 292–27 and the card punch machine is shifted to alpha-betic mode by closure of contacts 292–35 for punching the name of the parts. Also, column count lamps 2 and 30 are illuminated by closure of contacts 292–16 and 292–26 to indicate to the operator that the field is 32 columns in length.

When the operator finishes punching field No. 5, the star wheel controlled switch 44–1 again closes, and the main program belt advances one step while the auxiliary program belt again remains stationary. Main belt programming for field No. 6 is shown in FIGURE 30 at column No. 6 of program No. 1. The detail line reader is again energized and, this time, field No. 6 (FIGURE 27) of the source document is illuminated and the No. 5 column count lamp is energized to indicate a field length of five columns. When field No. 6 has been punched, the main program belt is stepped to column No. 7 (by reason of closure of star wheel controlled contacts 44–1). Since no punch is included in channel 40 of the main program belt, the detail line reader remains in a deactivated condition, and the apparatus is again under sole control of the main program belt for punching of field No. 7. Field No. 7 of the document (FIGURE 27) is illuminated, the column count lamp No. 2 is energized and the last field is punched by the operator.

When the last column of the card has been punched, the punch card moves from the punching station 27 to the reading station 28 (FIGURE 1); the program drum 31 is rotated to reset the program card to the first column thereof; and the end-of-card contacts 519 (FIGURE 26) are momentarily closed, all of which functions are well understood by those skilled in the card punch machine art. The star wheel controlled contacts 44–1 are also closed at the end of the program card (by the inclusion of a punch in column 80, program No. 1, of the program card shown in FIGURE 29) whereupon the main program belt is again advanced one step to column No. 8. As seen in FIGURE 30, column 8 of program No. 1 includes a punch at channel 39 (the program advance channel) for closure of contacts 292–39. This initiates a forward drive rotation of the main program belt and the punch at column No. 9, channel 13 of the main program belt is sensed to stop the belt thereat. As seen in FIGURE 30, a channel 2 punch is also include at column No. 9 of the main program belt whereupon the relay matrix (of relays 287, 362, 363 and 365) is energized such that the star wheel controlled contacts 44–2 are connected by the tree circuit and contacts of relay 365 to the thyratron 376 (FIGURE 24) for end of field control. It will be apparent, therefore, that program No. 2 of the program card shown in FIGURE 29 will now provide the end-of-field control.

Simultaneously, upon receipt of a ground signal from the "end of card" contacts 519 the auxiliary program belt is driven forward one step to the first channel 13 punch to be encountered in the belt in the manner explained above. Since a channel 13 punch is included at column No. 2, the auxiliary program belt is positioned at column No. 2 of the first program. In brief, the main program belt (FIGURE 30) is now positioned at program No. 1, column No. 9; the auxiliary program belt (FIGURE 3) is stopped at the program No. 1, column No. 2; and the program card (FIGURE 29) is back at the start position (column No. 1) in preparation for punching the first detail line card.

In addition to the channel 2 and channel 13 punches at column No. 9, the main program belt includes a channel 34 punch (FIGURE 30) for closure of the automatic duplicate contacts 292–34. As seen in FIGURE 24, the ground connection from the closed contacts 292–34 is carried through switch 284 to terminal 389–0 which, in turn, is connected to the automatic duplicate circuit (not shown) of the card punch machine. As is well understood, the card punch will then begin to automatically duplicate information punched in the card located at the reading station. As seen in FIGURE 29, the first end-of-field punch in the program card for program No. 2 is located at column 36. Therefore, all of the information contained in field Nos. 1, 2 and 3 of the punch card at the reading station will be duplicated. When the information in column 36 of the punch card at the reading station is duplicated, the "condition" signal supplied by the star wheel controlled switch 44–2 will coincide with a "control" pulse through the switch 492 (FIGURE 24) to advance the main program belt forward one step to column No. 10 of program No. 1.

As seen in FIGURE 30, the main program belt (at column No. 10 of program No. 1) includes punches at channels 19, 40 and 46, while the auxiliary program belt (at column No. 2 of program No. 1) includes punches at channels 64 and 109. With this programming of the main and auxiliary program belts, the contacts 292–19, 292–40, 292–46, 292′–64 and 292′–109 are closed. Closure of contacts 292–40 activates the detail line reader whereupon the light bar 57b is moved to register with line 1 at the middle third of the document (by closure of contacts 292′–64), and the form lamp No. 5 is illuminated in the light bar 57b by closure of contacts 292–46 and 292′–109. It will be apparent, therefore, that field No. 4a is illuminated (see FIGURE 27). Also column count lamp No. 5 is illuminated (by closure of contacts 292–19) to indicate that field No. 4a is a five column field. The operator will then punch field No. 4a. It will be seen that the operation of the apparatus of this invention for fields 4a, 5a and 6a is similar to the above described operation for fields 4, 5 and 6, except that the carriage is stopped with the light bar 57b at line one in the middle third of the document, and the middle light bar 57b is energized. No further explanation of the operation of the apparatus as the main program belt is stepped through column Nos. 10, 11 and 12 for punching of fields 4a, 5a and 6a is believed necessary.

After punching field 6a on the first detail card, the main program belt is automatically stepped to column No. 13 where a channel 34 punch is included. As described above, when automatic duplicate contacts 292–34 are closed, the information in the punch card at the reading station is duplicated. Here, the two columns of field No. 7 of the header punch card (see FIGURE 28) are duplicated in the first detail card.

When field No. 7 has been duplicated, the end of the first detail line card is reached whereupon the card punch machine functions to advance said card to the reading station and a new punch card is fed to the punch station. The program drum 31 is rotated to reset the program card to column No. 1, the main program belt is advanced one step by reason of the inclusion of a channel 80 punch in the program card 37, and the auxiliary program belt is advanced one step by reason of closure of the "end of card" contacts 519, all in the manner described above. The main program belt (FIGURE 30) is thereby rotated to column 14 and the auxiliary program belt (FIGURE 31) is rotated to column No. 3.

It will be noted that the main program belt is provided with a channel 38 punch at column No. 14 for closure of the program repeat contacts 292–38. When the program repeat contacts are closed, the main program belt is driven in the reverse direction to the prior prime, on subprime contact. With the illustrated programming, the main program belt is driven back from column No. 14 to column No. 9. When column No. 9 is reached, the channel 13 punch will be sensed for closure of the contacts 193–13. In the manner described above the belt is first driven past the channel 13 punch in the reverse direction where it is stopped and then driven forward for reclosure and reopening of the contacts 193–13 before stopping at column No. 9.

As described above, a punch is included in the automatic duplication channel 34 of the main program belt at column No. 9 whereupon the first three fields of the first detail line punch card at the reading station 28 are automatically duplicated in the second detail line card now at the punching station 27. The stepping of the main program belt through to column No. 14 during the punching of the first detail line card has been described above and will not here be repeated in the description of the punching of the second detail line card. It will, however, here be noted that column No. 3 of the auxiliary program belt is provided with punches at channels 78 and 109 for closure of contacts 292′–78 and 292′–109 while punching the detail fields 4b, 5b and 6b of the second detail line card. With contacts 292′–78 closed, the light bar 57b registers with line 15 in the middle third of the document (FIGURE 27) and the middle light bar 57b is activated by closure of contacts 292′–109.

After punching the second detail line card, the apparatus will again function to return the main program belt to column No. 9 from column No. 14, and the auxiliary program belt will be advanced one step. It will be apparent that for source documents containing additional detail line information, the apparatus could easily be programmed to scan the same by proper programming of the auxiliary program belt.

When all of the detail line information required from the source document has been punched, the apparatus of this invention may be reset by actuation of the document reset switch 321 to return the main and auxiliary program belts to column No. 1 of field No. 1 (the program selector switch 313 being set at program No. 1) in preparation for punching similar source documents.

If cards are to be punched using either a different punching routine or a different type of source document, the program advance switch may be pressed after the last detail card has been punched to advance the main and auxiliary program belts to the next program, i.e., to a position wherein the next channel 13 punches are sensed. Any desired programming may be included on the program belts at the next program.

It will be apparent that with twelve different card formats provided by the twelve rows or positions on the program card, many different card punching procedures may be established. Further, the program card and program belts are easily removed and replaced, whereby an unlimited number of punching procedures are possible.

Often, it is desirable to include a key punching instruction sheet to which the operator may refer when punching cards. Such instructions are particularly useful where a difficult punching procedure is employed or a new or inexperienced operator is being trained to punch an unfamiliar procedure. With the apparatus of this invention, the instruction sheet I, as seen in FIGURE 32, may be placed on the translucent panel 53 adjacent the source document D, and the apparatus may be programmed to simultaneously scan both the source document and instruction sheet. For example, an instruction sheet may be prepared for the source document shown in FIGURE 27 and placed adjacent thereto on the translucent panel as seen in FIGURE 33. For example, when field No. 7 is illuminated, an instruction on the sheet I could also be illuminated. An appropriate instruction may be, "If blank, punch 11." In this manner the operator would be instructed to punch 11 in the salesman code field if no number is shown on the source document. Similarly, instructions for punching other fields may be included on the sheet I. Such programming of the instruction sheet eliminates many errors and greatly aids in the instruction of the operator.

Some data processing and computing equipment is adapted for use with punch cards having variable, rather than fixed, length fields. In punching such variable field length cards, it is common practice to modify the key punch machine to place the end of field function under control of a key on the keyboard rather than the star wheel controlled switches 44 associated with the program drum. Assuming the ampersand is to be used to control the end of field function, a connection would be made between the ampersand energization circuit and the thyratron 367 to control the firing thereof whenever the ampersand key is actuated. (The thyratron circuit would be modified to place the thyratron under the exclusive control of the ampersand key.) The apparatus of this invention could be programmed in the same manner as described above; the only difference in the operation thereof being that the end of field signals are now provided by actuation of the ampersand key rather than being under control of the star wheel controlled switches 44 and the switch 492. It will be apparent, therefore, that the apparatus of this invention is not limited to use for punching fixed field length cards, but may also be used in punching variable field length cards.

The invention having been described in detail in accordance with the requirements of the patent statutes, various other change and modifications will suggest themselves to those skilled in this art. For example, it is known that once the operator reads a limited field of information she can retain the information and punch it accurately on the card punch machine after the apparatus of this invention has proceeded to underscore information for the next field. The scanning operation of the apparatus is advanced by simply punching the end-of-field holes in the program card one or more card columns ahead. Normally an advance of two card columns is adequate. (Of course, single column fields and automatic functions such as automatic skip or duplicate cannot be advanced.) It is intended that such changes and modifications may be made without departing from the spirit and scope of the invention as recited in the following claims.

We claim:
1. In combination in a data processing apparatus:
   a keyboard to transpose data from a source document to secondary documents,
   means for duplicating data entered on a preceding secondary document,
   means for skipping fields of data on a secondary document,
   programming apparatus connected to the duplicating means and skipping means for control thereof, said programming apparatus comprising a rotary drive member, a flexible belt forming a closed loop fitted around said drive member with at least a portion of the loop engaging said member, said belt being adapted to be formed with a pattern of programming perforations, means for rotating said rotary member and thereby driving said belt, and sensing means including a plurality of sensing members adapted and biased to contact a surface of said belt and to drop into perforations in the belt as the sensing members are brought into registry therewith.

2. In combination in a data processing apparatus:
   a combination keyboard to transpose either alpha or numeric data from a source document to secondary documents,
   means for shifting the combination keyboard for alpha or numeric operation,
   programming apparatus connected to said shifting means for control thereof, said programming apparatus comprising a rotary drive member, a flexible belt forming a closed loop fitted around said drive member with a portion of the loop engaging said member and a substantially larger portion projecting from said rotary member, said belt being adapted to be formed with a pattern of programming perforations, means for rotating said rotary member in either rotary direction, means formed on said rotary member and said belt whereby the rotary member drives the belt in a direction dependent upon the direction of rotation of the rotary member, sensing means including a plurality of sensing members adapted and biased to contact a surface of said belt and to drop into perforations in the belt as the sensing members are brought into registry therewith, and circuit means controlled by said sensing members to effect a predetermined programming in accordance with the pattern of perforations in said belt.

3. Programming apparatus comprising a rotary drive member, a flexible belt forming a closed loop fitted around said drive member with a portion of the loop engaging said member and a substantially larger portion projecting from said rotary member, said belt being adapted to be formed with a pattern of programming perforations, means for rotating said rotary member in either rotary direction, means formed on said rotary member and said belt whereby the rotary member drives the belt in either rotary direction, sensing means including a plurality of sensing members normally contacting a surface of said belt and adapted to drop into perforations in the belt as the sensing members are brought into registry therewith (and means for automatically retracting said sensing members from their normal positions while said rotary member is rotating)
   means for stopping the belt at any one of a plurality of adjacent positions, and
   means for alternately driving the belt in either rotary direction and stopping the belt at any of said stopped positions including a position remote from the preceding stopped position.

4. A programming assembly comprising a rotary cylinder, a drive for said cylinder comprising an electric motor capable of continuous operation and a friction clutch operably connecting the motor to the cylinder to rotate the latter continuously whenever the clutch is engaged, said clutch having a driving member operated continuously by the motor and a driven member frictionally driven by said driving member unless restrained, electrically actuated means for restraining said driven member, a punched closed loop belt having a minor portion partially wraped about said cylinder and a major portion projecting beyond the cylinder, the punching of said belt forming a pattern corresponding to a predetermined program, a sensing head movable toward and away from said belt between a first position closer to and a second position more remote from said belt, a plurality of sensing members carried by said head, contacting said belt when the head is in its first position and urged into punched perforations in the belt, a circuit for actuating said restraining means to restrain said driven clutch member whenever said circuit is in a first state and to release the driven clutch member when the circuit is in a second state, and means for moving said head to its second position when said driven member commences operation and to hold the same in such second position during such operation.

5. Apparatus for selectively energizing a plurality of control means which are adapted to be energized upon simultaneous receipt of control and condition signals applied thereto, said apparatus including a program belt having information recorded thereon as spaced perforations across the belt, drive means for driving the belt, a plurality of sensing means for sensing information in the belt perforations as the belt is driven, a plurality of "or" gate circuits, means connecting the sensing means to said control means through said gate circuits for supplying control signals to said control means as said belt is driven, switch selector means for selectively connecting to one of said sensing means, and means including said switch selector means for supplying a condition signal to each of said control means when the sensing means selected by said switch selector means senses a perforation in said belt.

6. The apparatus as recited in claim 5 including means connected to said switch selector means for stopping said program belt after the selected sensing means senses a perforation in said belt.

7. The apparatus as recited in claim 6 wherein said belt is stopped with the sensing means out of engagement with the belt perforations.

8. The apparatus as recited in claim 7 including relays associated with and controlled by said control means, means connecting the contacts of said relays in a tree circuit, and means including said tree circuit for subsequent step advance control of said program belt after said belt is stopped adjacent the selected perforation.

9. The apparatus as recited in claim 6 including sensing members normally engaging a surface of said belt and adapted to drop into perforations in the belt when the belt is stopped, and means retracting said sensing members while the belt is being driven.

10. Apparatus for controlling the drive actuation of a program belt having information recorded thereon as spaced perforations in the belt, belt drive means including a cylinder and a motor connected to the cylinder through a friction coupling, said cylinder being in drive relation with said belt, releasable means restraining rotation of said cylinder, means energizing said restraining means to release said cylinder and initiate drive actuation of said belt, sensing means for sensing the information in the belt as the belt is driven, and means connected to said sensing means for deenergizing said releasable restraining means to stop said belt after the sensing means senses a perforation in said belt, the belt being stopped with the sensing means out of engagement with the sensed belt perforation.

11. The apparatus as recited in claim 10 wherein said belt is provided with a plurality of channels of information recorded as spaced perforations across the belt, the apparatus including a plurality of sensing means for sensing the individual channels of information in the belt as the belt is driven, said means connected to said sensing means including a selector switch for selectively connecting to any one of said sensing means whereby said belt is stopped after the selected sensing means senses a perforation in said belt.

12. In data processing apparatus including a machine operated by a keyboard and adapted to record data on a data-recording element in response to operation of such keyboard, and wherein data visually recorded on a source document are read by a human operator who operates such keyboard in accordance with such visual data, such document reading and keyboard operation being carried out in accordance with a predetermined program requiring a plurality of steps some one or more of which require instruction to the operator as to matters other than the sequence of steps, the improvement of which comprises:

(a) instruction means including at least one instruction signal visible to such operator while reading such source document and operating such keyboard said signal having an "on" state visually signifying an instruction and an "off" state signifying no instruction, (b) programming means for operating said instruction means to automatically specify the same in accordance with a predetermined program, (c) means for connecting such machine operated by a keyboard to said programming means, and (d) means for controlling the programming means as data is recorded on the data recording element in response to operation of the keyboard.

13. The apparatus as defined in claim 12 wherein said instruction signal designates the length of field on the data recording element allocated for the datum being recorded thereon.

14. The apparatus as defined in claim 12 wherein the data processing apparatus includes a combination keyboard shiftable between alpha and numeric conditions for transposing either alpha or numeric data from the source document,
said instruction signal designating at least one of said alpha and numeric conditions of the keyboard.

15. The apparatus as defined in claim 12 wherein said programming means includes at least three programs, and
said means for controlling the programming means includes a program selector switch for selecting one of said programs.

16. The apparatus as defined in claim 12 wherein said programming means comprise,
a rotary drive member,
a flexible belt adapted to be formed with a pattern of programming perforations and driven by said rotary drive means, and
sensing means for sensing perforations in said belt.

17. The apparatus as defined in claim 16 wherein said rotary drive member is rotatable in either rotary direction for driving the flexible belt in either rotary direction.

18. In data pocessing apparatus including a machine operated by a keyboard and adapted to record data on a secondary document in response to operation of such keyboard, and wherein data visually recorded on a source document are read by a human operator who operates such keyboard in accordance with such visual data, such document reading and keyboard operation being carried out in accordance with a predetermined program requiring a plurality of steps some one or more of which require information other than the data on the source document; the improvement which comprises:

(a) signal means visible to such operator while reading such source document and operating such keyboard, (b) an energization circuit connected to said signal means for energizing the same, and (c) means controlled by said keyboard operated machine and connected to said energization circuit for automatically opening and closing said energization circuit in accordance with a predetermined program.

19. The apparatus as defined in claim 18 wherein said signal means comprise lamps which are illuminated to designate the length of field on the secondary document allocated for the datum being recorded thereon.

20. The apparatus as defined in claim 18 wherein the data processing apparatus includes a combination keyboard shiftable between alpha and numeric conditions for recording either alpha or numeric data from the source document,
said signal means designating at least one of said alpha and numeric conditions of the keyboard.

21. In data processing apparatus including a machine operated by a keyboard and adapted to record data in different length fields on a data recording element in response to operation of such keyboard, and whereby data visually recorded on a source document are read by a human operator who operates such keyboard in accordance with such visual data, the improvement comprising,
- indicating means visible to such operator while reading such source document and operating such keyboard for indicating different-length fields on the data recording element, and
- means controlled by the keyboard operated machine and connected to said indicating means for energizing said indicating means in accordance with the length of the field on the data recording document in which field datum is to be entered from the source document.

22. In data processing apparatus including a keyboard to transpose data from a source document to secondary documents, wherein data visually recorded on a source document are read by a human operator who operates such keyboard in accordance with such visual data for preparation of three or more secondary documents from a single primary document, said apparatus also including means for duplicating data entered on the preceding secondary document and means for skipping fields of data on said secondary documents, the improvement comprising:
- automatic control means connected to the data processing apparatus and controlled thereby, and
- means including said automatic control means for automatically controlling said means for duplicating and means for skipping during keyboard operation in the preparation of said three or more secondary documents of different format obtained from said single source document.

23. The apparatus as defined in claim 22 including means including said automatic control means for automatically repeating the control of the duplicating and skipping means for transposing data from a similar succeeding source document to three or more succeeding secondary documents.

24. In data processing apparatus including a combination key for transposing either alpha or numeric data from a source document to secondary documents, wherein data visually recorded on a source document are read by a human operator who operates such keyboard in accordance with such visual data for preparation of three or more secondary documents from a single primary document, said apparatus also including means for shifting the combination keyboard for alpha or numeric operation, the improvement comprising:
- automatic control means connected to the data processing apparatus and controlled thereby, and
- means including said automatic control means for automatically controlling said keyboard shifting means for shifting between alpha and numeric data during keyboard operation in the preparation of said three or more secondary documents of different format obtained from said single source document.

25. The apparatus as defined in claim 24 including means including said automatic control means for automatically repeating the control of the shifting means for transposing data from a similar succeeding source document to three or more succeeding secondary documents.

References Cited

UNITED STATES PATENTS

| | | | |
|---|---|---|---|
| 2,569,840 | 10/1951 | Whalen et al. | 235—61.11 |
| 3,049,598 | 8/1962 | Lannan et al. | 200—46 |

DARYL W. COOK, *Primary Examiner.*